US006925109B2

(12) United States Patent
Richards et al.

(10) Patent No.: US 6,925,109 B2
(45) Date of Patent: **\*Aug. 2, 2005**

(54) METHOD AND SYSTEM FOR FAST ACQUISITION OF ULTRA-WIDEBAND SIGNALS

(75) Inventors: James L. Richards, Fayetteville, TN (US); Mark D. Roberts, Huntsville, AL (US)

(73) Assignee: Alereon Inc., Austin, TX (US)

( * ) Notice: Subject to any disclaimer, the term of this patent is extended or adjusted under 35 U.S.C. 154(b) by 118 days.

This patent is subject to a terminal disclaimer.

(21) Appl. No.: 10/356,995

(22) Filed: Feb. 3, 2003

(65) Prior Publication Data

US 2003/0147480 A1 Aug. 7, 2003

Related U.S. Application Data

(63) Continuation-in-part of application No. 09/538,292, filed on Mar. 29, 2000, now Pat. No. 6,556,621.

(51) Int. Cl.[7] .................................................. H04B 1/69
(52) U.S. Cl. ........................ 375/150; 375/256; 375/325
(58) Field of Search ................................ 375/150, 325, 375/256, 365, 367, 368

(56) References Cited

U.S. PATENT DOCUMENTS

| | | |
|---|---|---|
| 4,641,317 A | 2/1987 | Fullerton |
| 4,743,906 A | 5/1988 | Fullerton |
| 4,813,057 A | 3/1989 | Fullerton |
| 4,979,186 A | 12/1990 | Fullerton |
| 5,337,054 A | 8/1994 | Ross et al. |
| 5,363,108 A | 11/1994 | Fullerton |
| 5,420,850 A | 5/1995 | Umeda et al. |
| 5,644,591 A | 7/1997 | Sutton |
| 5,677,927 A | 10/1997 | Fullerton et al. |
| 5,687,169 A | 11/1997 | Fullerton |
| 5,832,035 A | 11/1998 | Fullerton |
| 5,901,172 A | 5/1999 | Fontana et al. |
| 5,952,954 A | 9/1999 | Beckner |
| 5,952,956 A | 9/1999 | Fullerton |
| 5,966,090 A | 10/1999 | McEwan |
| 6,026,125 A | 2/2000 | Larrick, Jr. et al. |
| 6,239,741 B1 | 5/2001 | Fontana et al. |

OTHER PUBLICATIONS

J.J. Stiffler, "Synchropization Techniques," In Digital Communications with Space Applications, edited by S.W. Golomb, 1964, pp. 135–160.
Marvin K. Simon et al., "Spread Spectrum Communications Handbook" McGraw–Hill, Inc., 1994, pp. 751–900.
M.Z. Win et al., "Impulse Radio: How It Works", IEEE Communications Letters, vol. 2, No. Feb. 1998, pp. 36–38.
A Petroff et al., "Time Modulated Ultra–Wideband (TM–UWB) Overview", Wireless Symposium/Portable by Design Feb. 25, 2000, Abstract,pp. 1–10.
U.S. Appl. No. 09/537,264, filed Mar. 29, 2000.
U.S. Appl. No. 09/537,692, filed Mar. 29, 2000.
U.S. Appl. No. 09/538,519, filed Mar. 29, 2000.
U.S. Appl. No. 09/146,524, filed Sep. 3, 1998.
U.S. Appl. No. 09/356,384, filed Jul. 16, 1999.
U.S. Appl. No. 09/209,460, McCoride et al.

*Primary Examiner*—Dac V. Ha
(74) *Attorney, Agent, or Firm*—Sprinkle IP Law Group

(57) ABSTRACT

A system and method are provided that can detect any part of a multipath impulse radio signal. More specifically, the method compares a template pulse train and the multipath impulse radio signal to obtain a comparison result. The system performs a threshold check on the comparison result. If the comparison result passes the threshold check, the system locks onto any part of the multipath impulse radio signal including a direct path part and at least one multipath reflection part. The system may also perform a quick check, a sychronization check, and/or a command check of the multipath impulse radio signal.

34 Claims, 43 Drawing Sheets

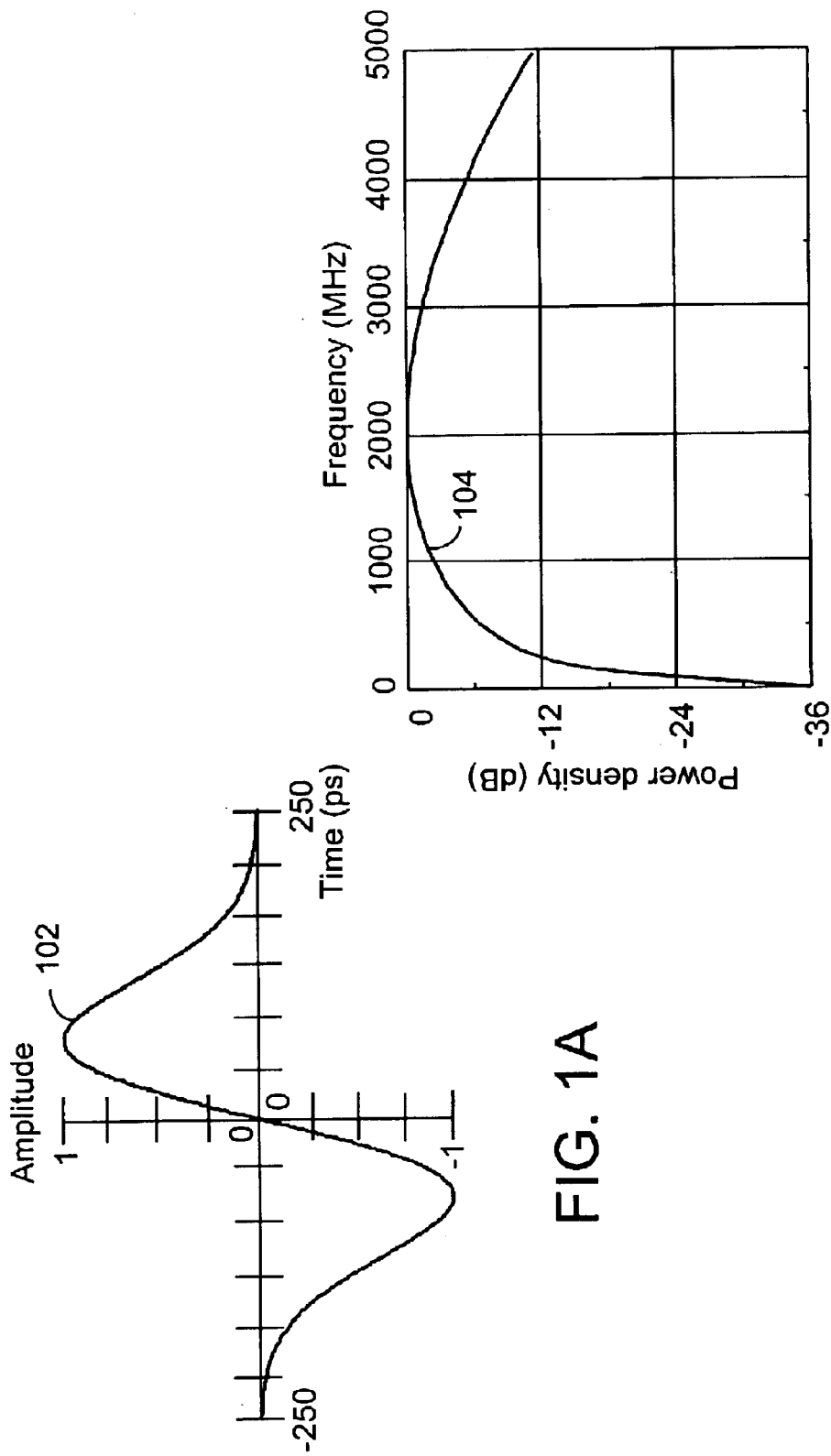

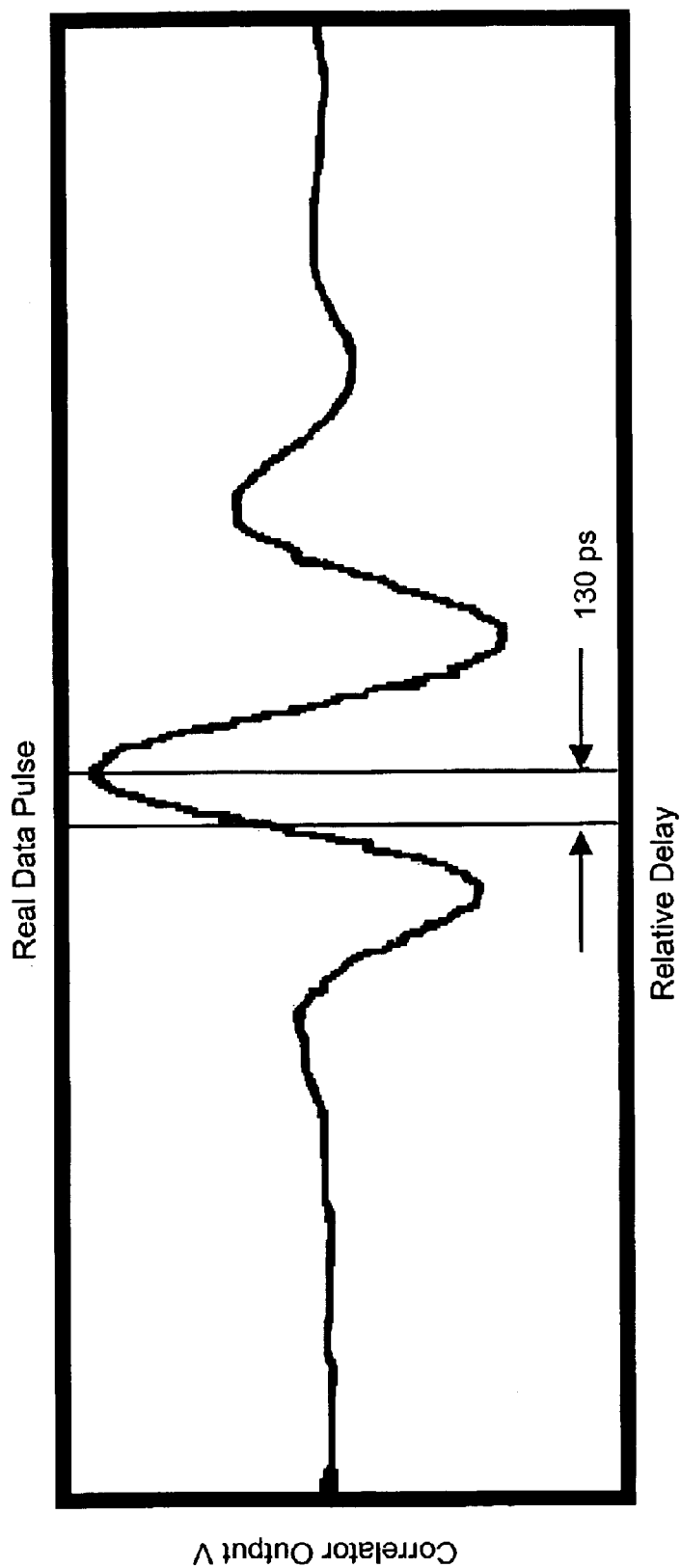

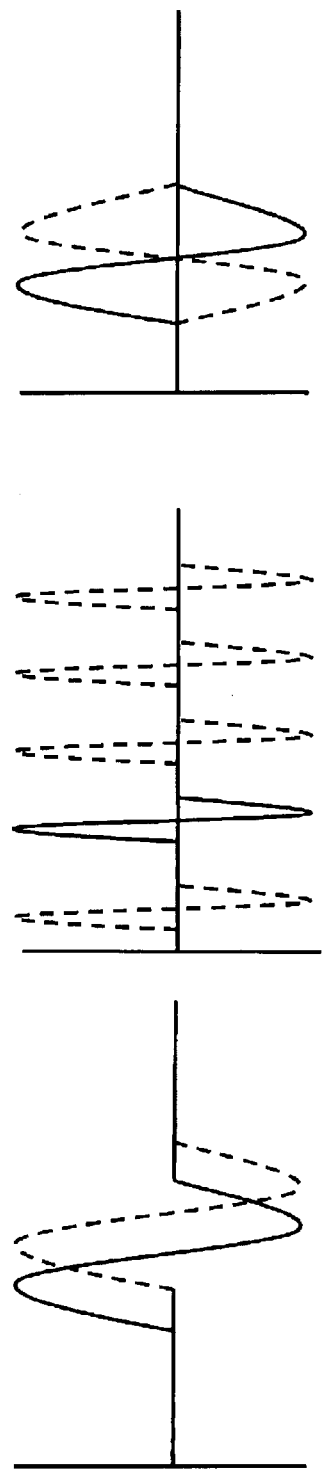
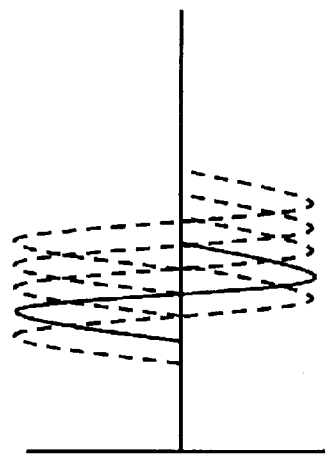
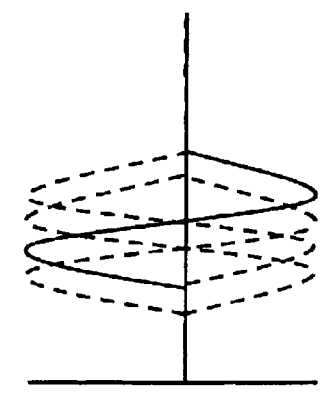

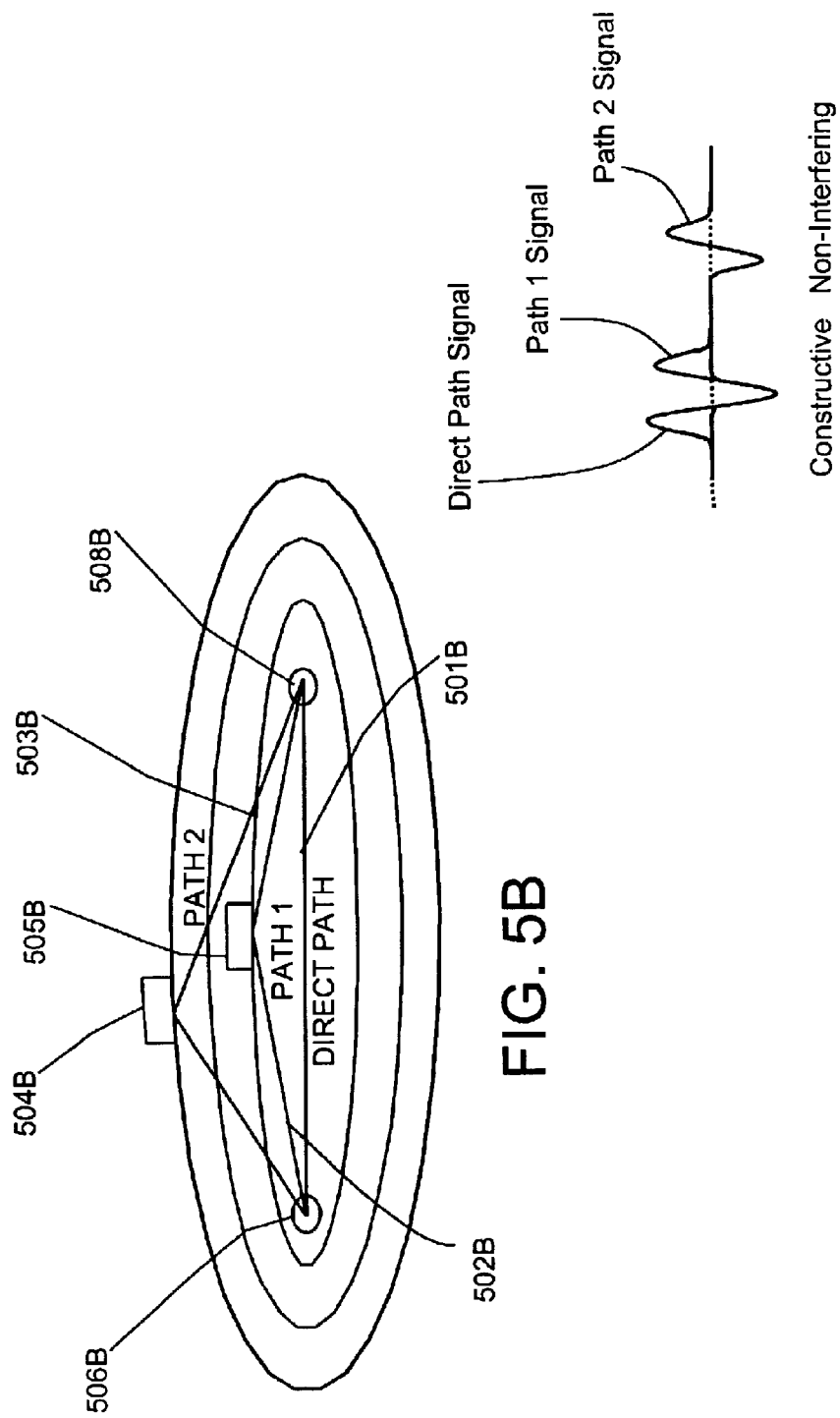

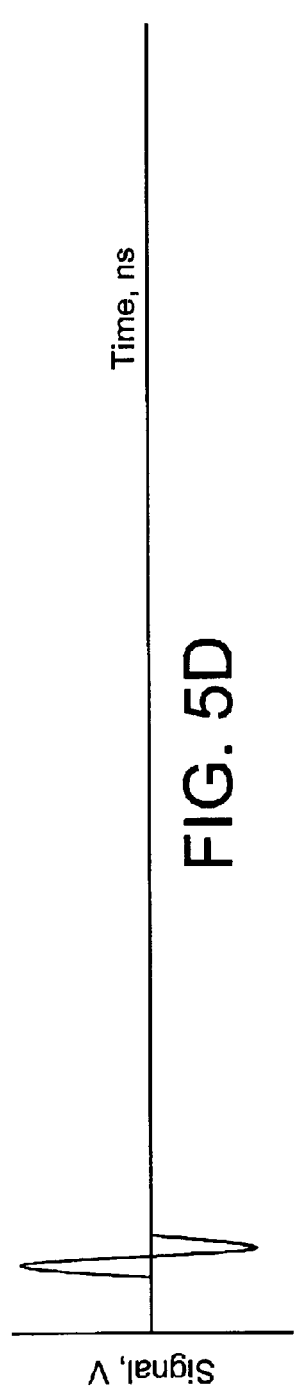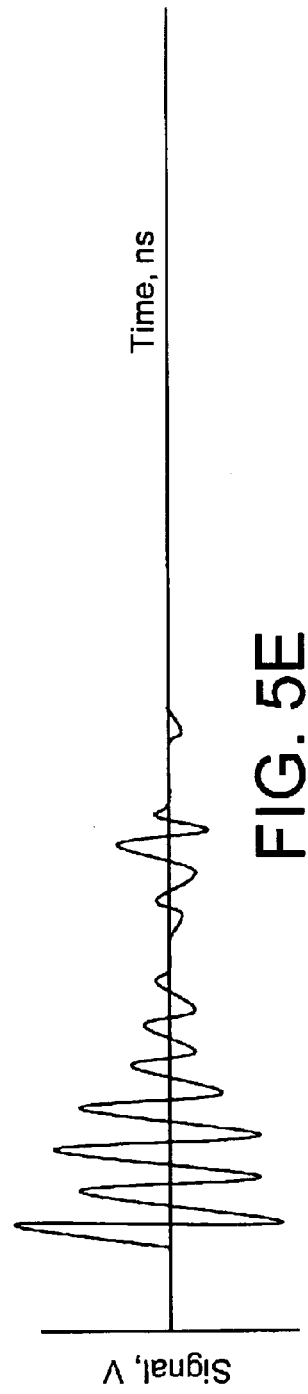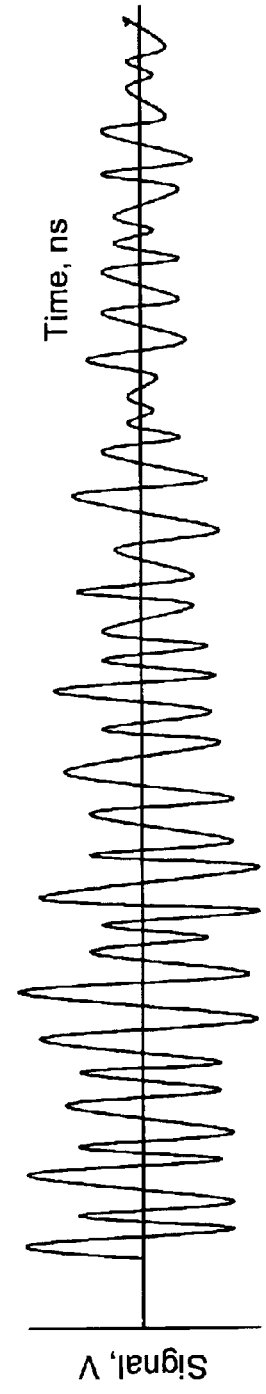

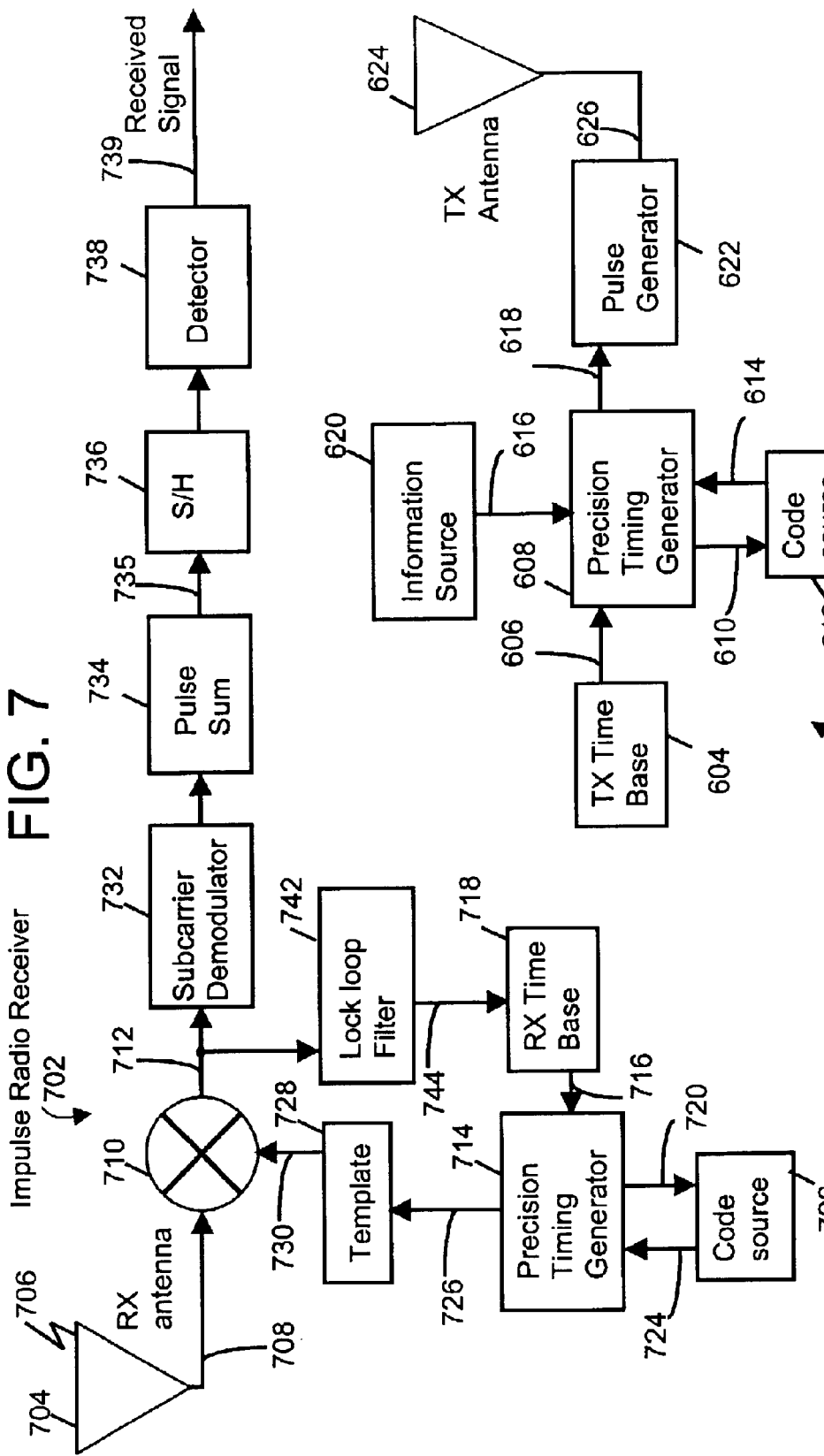

METHOD AND SYSTEM FOR FAST ACQUISITION OF ULTRA-WIDEBAND SIGNALS

CROSS REFERENCE TO COPENDING APPLICATIONS

This application is a Continuation-In-Part to U.S. application Ser. No. 09/538,292 that was filed on Mar. 29, 2000 now U.S. Pat. No. 6,556,621 and entitled "SYSTEM FOR FAST LOCK AND ACQUISITION OF ULTRA-WIDEBAND SIGNALS" which is hereby incorporated by reference herein.

BACKGROUND OF THE INVENTION

1. Field of the Invention

The invention relates in general to the communications field and, more particularly, to a system and method capable of locking onto ultra-wideband signals in a multipath environment.

2. Description of Related Art

Recent advances in communications technology have enabled an emerging and revolutionary ultra-wideband technology (UWB) called impulse radio communications systems (hereinafter called impulse radio). Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain, and interference suppression.

Generally speaking, an impulse radio receiver is a direct conversion receiver with a cross-correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. As an option, the impulse radio receiver can integrate multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods.

When receiving an ultra-wideband signal as part of a one-way communication system (e.g., a pager) or a two-way communication system (e.g., a wireless telephone), a problem exists as to how to detect the transmitted impulse radio signal, and more particularly, how to acquire and lock onto the impulse radio signal being transmitted. This problem exists independent of how the received ultra-wideband signal is used, such as in a one-way or two-way communication system.

Previous approaches to solving this problem are discussed in the following commonly owned patents, which are incorporated by reference: U.S. Pat. No. 5,832,035, issued Nov. 3, 1998 to Fullerton, and U.S. Pat. No. 5,677,927, issued Oct. 14, 1997. The present invention presents another approach to solving this problem.

BRIEF DESCRIPTION OF THE INVENTION

An aspect of the invention is to provide a system and method for detecting an impulse radio signal.

Another aspect of the invention is to provide a system and method for locking onto any part of a received multipath impulse radio signal including one or more of a direct path part and at least one multipath reflection part.

The above aspects and advantages of the present invention are achieved by a method and system for fast lock and acquisition of ultra-wideband signals.

In one embodiment of the present invention, a system and method are provided that can detect any part of a multipath impulse radio signal. More specifically, the method compares a template pulse train and the multipath impulse radio signal to obtain a comparison result. The system performs a threshold check on the comparison result. If the comparison result passes the threshold check, the system locks onto any part of the multipath impulse radio signal including a direct path part and at least one multipath reflection part. The system may also perform a quick check, a sychronization check, and/or a command check of the multipath impulse radio signal.

BRIEF DESCRIPTION OF THE DRAWINGS

The present invention is described with reference to the accompanying drawings. In the drawings, like reference numbers indicate identical or functionally similar elements.

FIG. 1A illustrates a representative Gaussian Monocycle waveform in the time domain, which is the first derivative of a Gaussian pulse;

FIG. 1B illustrates the frequency domain amplitude of the Gaussian Monocycle of FIG. 1A;

FIG. 1E represents the Correlator Output vs. the Relative Delay of a measured pulse signal;

FIGS. 4A–4E illustrate five modulation techniques to include: Early-Late Modulation; One of Many Modulation; Flip Modulation; Quad Flip Modulation; and Vector Modulation;

FIG. 5B depicts a typical geometrical configuration giving rise to multipath received signals;

FIG. 5C illustrates exemplary multipath signals in the time domain;

FIG. 5D represents a signal plot of an idealized UWB received pulse with no multipath;

FIG. 5E represents a signal plot of an idealized UWB received pulse in moderate multipath;

FIG. 5F represents a signal plot of an idealized UWB received pulse in severe multipath;

FIG. 6 illustrates a representative impulse radio transmitter functional diagram;

FIG. 7 illustrates a representative impulse radio receiver functional diagram;

FIG. 11O illustrates a mixer-based inverting pulse summation apparatus in accordance with one embodiment of the invention;

DETAILED DESCRIPTION OF THE INVENTION

Overview of the Invention

Figures 1C, 1D:
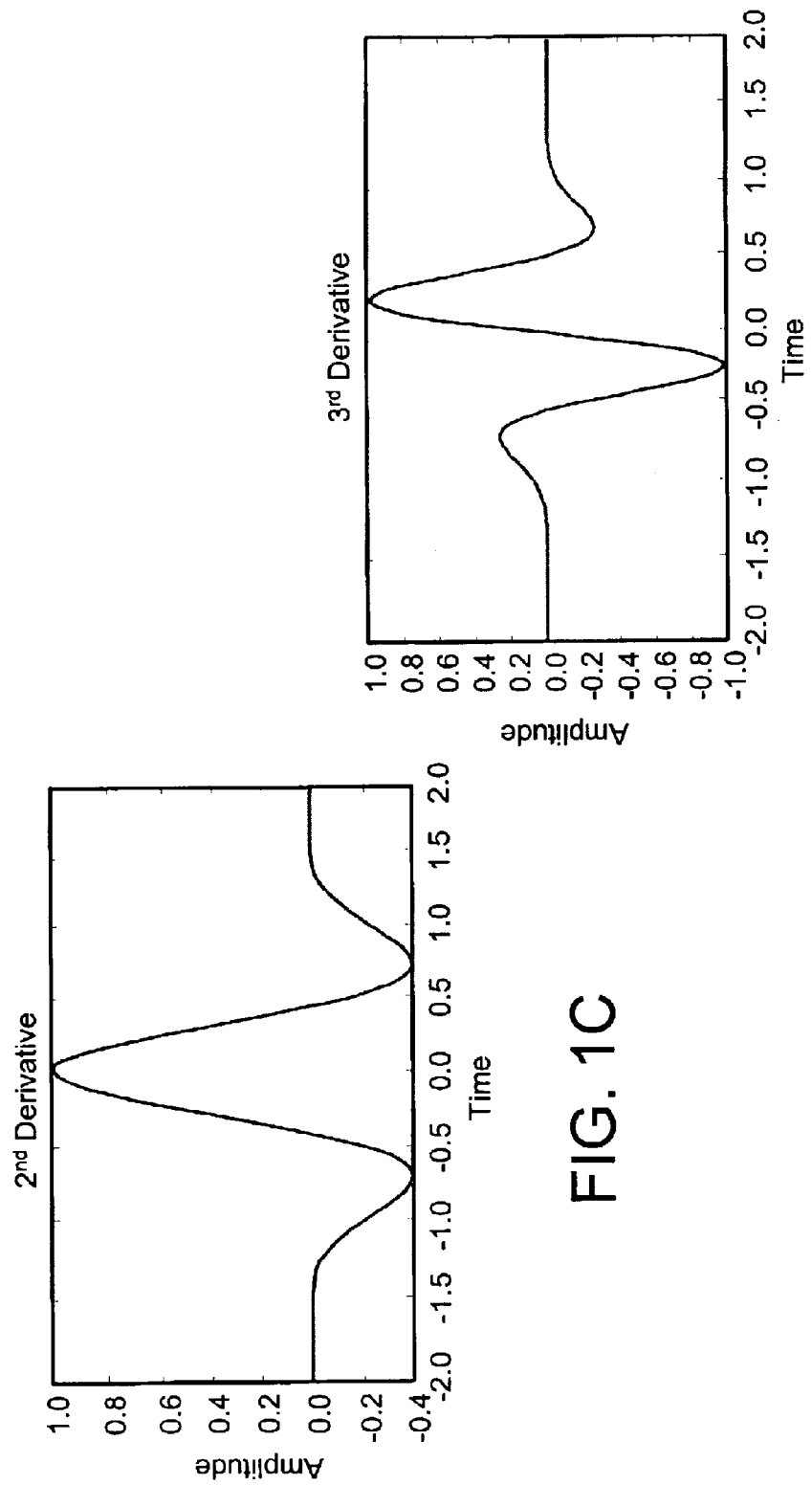
FIG. 1C represents the second derivative of the Gaussian pulse.
FIG. 1D represents the third derivative of the Gaussian pulse.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Ultra Wideband Technology Overview

Ultra Wideband is an emerging RF technology with significant benefits in communications, radar, positioning and sensing applications. Earlier this year (2002), the Federal Communications Commission (FCC) recognized these potential benefits to the consumer and issued the first rulemaking enabling the commercial sale and use of products based on Ultra Wideband technology in the United States of America. The FCC adopted a definition of Ultra Wideband to be a signal that occupies a fractional bandwidth of at least 0.25, or 0.5 GHz bandwidth at any center frequency. The 0.25 fractional bandwidth is more precisely defined as:

$$FBW = \frac{2(f_h - f_l)}{f_h + f_l},$$

where FBW is the fractional bandwidth, $f_h$ is the upper band edge and $f_l$ is the lower band edge, the band edges being defined as the 10 dB down point in spectral density.

There are many approaches to UWB including impulse radio, direct sequence CDMA, ultra wideband noise radio, direct modulation of ultra high-speed data, and other methods. The present invention has its origin in ultra wideband impulse radio and will have significant application there, but it has potential benefit and application beyond impulse radio to other forms of ultra wideband and beyond ultra wideband to conventional radio systems as well. Nonetheless, it is useful to describe the invention in relation to impulse radio to understand the basics and then expand the description to the extensions of the technology.

The following is an overview of impulse radio as an aid in understanding the benefits of the present invention.

Impulse radio has been described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), U.S. Pat. No. 5,832,035 (issued Nov. 3, 1998), and U.S. Pat. No. 5,969,663 (issued Oct. 19, 1999) to Fullerton et al, and U.S. Pat. No. 5,812,081 (issued Sep. 22, 1998), and U.S. Pat. No. 5,952,956 (issued Sep. 14, 1999) to Fullerton, which are incorporated herein by reference.

Uses of impulse radio systems are described in U.S. Pat. No. 6,177,903 (issued Jan. 23, 2001) titled, "System and Method for Intrusion Detection using a Time Domain Radar Array" and U.S. Pat. No. 6,218,979 (issued Apr. 17, 2001) titled "Wide Area Time Domain Radar Array", both of which are assigned to the assignee of the present invention, and are incorporated herein by reference.

This section provides an overview of impulse radio technology and relevant aspects of communications theory. It is provided to assist the reader with understanding the present invention and should not be used to limit the scope of the present invention. It should be understood that the terminology 'impulse radio' is used primarily for historical convenience and that the terminology can be generally interchanged with the terminology 'impulse communications system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, wide bandwidth pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation (including frequency shape and wave shape modulation), time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Impulse transmission systems are based on short, wide band pulses. Different pulse waveforms, or pulse types, may be employed to accommodate requirements of various applications. Typical ideal pulse types used in analysis include a Gaussian pulse doublet (also referred to as a Gaussian monocycle), pulse triplet, and pulse quadlet as depicted in FIGS. 1A through 1D. An actual received waveform that closely resembles the theoretical pulse quadlet is shown in FIG. 1E. A pulse type may also be a wavelet set produced by combining two or more pulse waveforms (e.g., a doublet/triplet wavelet set), or families of orthogonal wavelets. Additional pulse designs include chirped pulses and pulses with multiple zero crossings, or bursts of cycles. These different pulse types may be produced by methods described in the patent documents referenced above or by other methods understood by one skilled in the art.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where σ is a time scaling parameter, t is time, and e is the natural logarithm base.

Figure 1F:
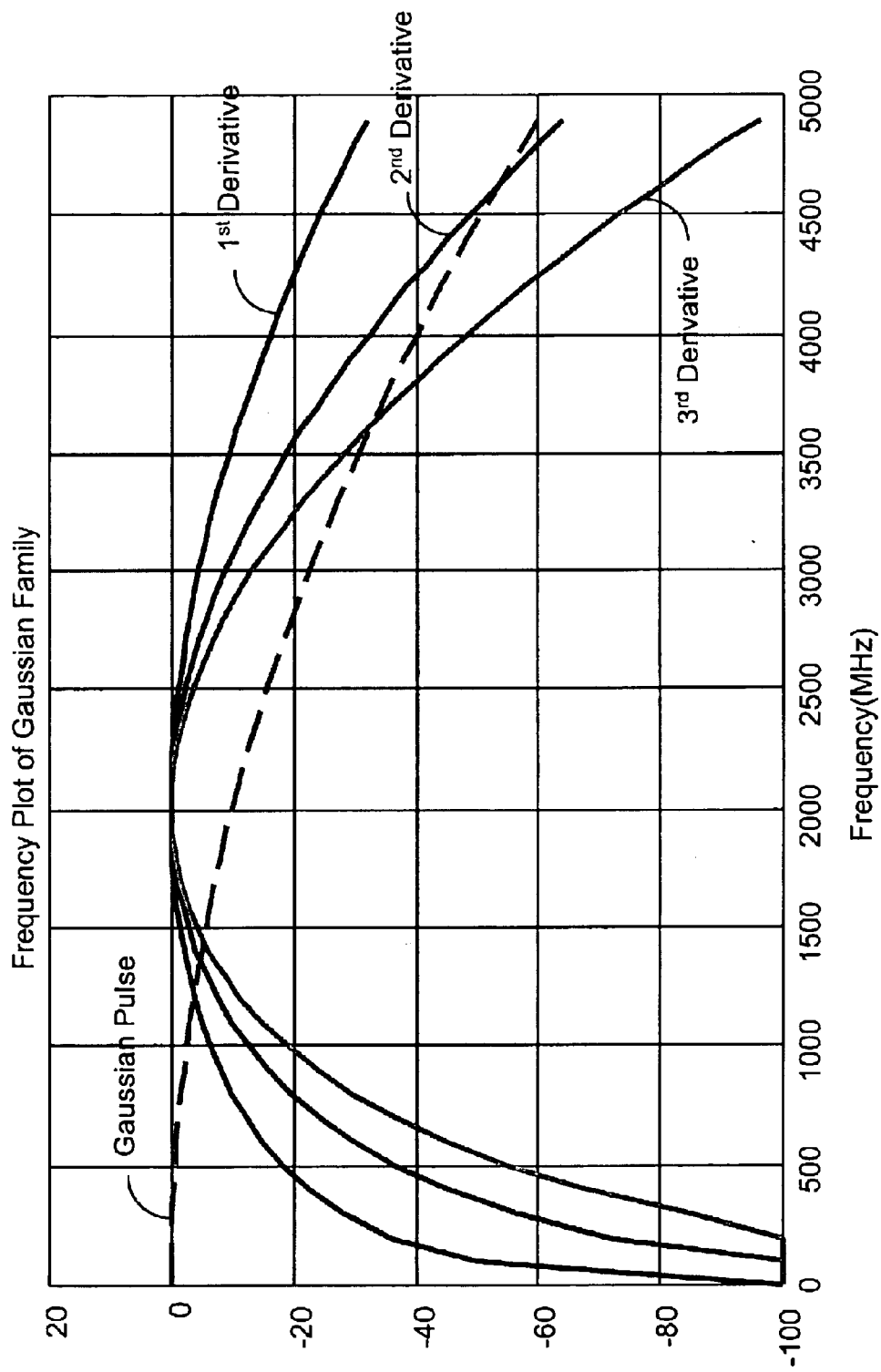
FIG. 1F depicts the frequency domain amplitude of the Gaussian family of the Gaussian Pulse and the first, second, and third derivative.

FIG. 1F shows the power spectral density of the Gaussian pulse, doublet, triplet, and quadlet normalized to a peak density of 1. The normalized doublet (monocycle) is as follows:

$$F_{mono}(f) = j(2\pi)\sqrt{e}\sigma f e^{-2(\pi\sigma f)^2}$$

Where $F_{mono}(\ )$ is the Fourier transform of $f_{mono}(\ )$ f is frequency, and j is the imaginary unit. The center frequency ($f_c$), or frequency of peak spectral density, of the Gaussian monocycle is:

$$f_c = \frac{1}{2\pi\sigma}$$

Pulse Trains

Figure 2A:
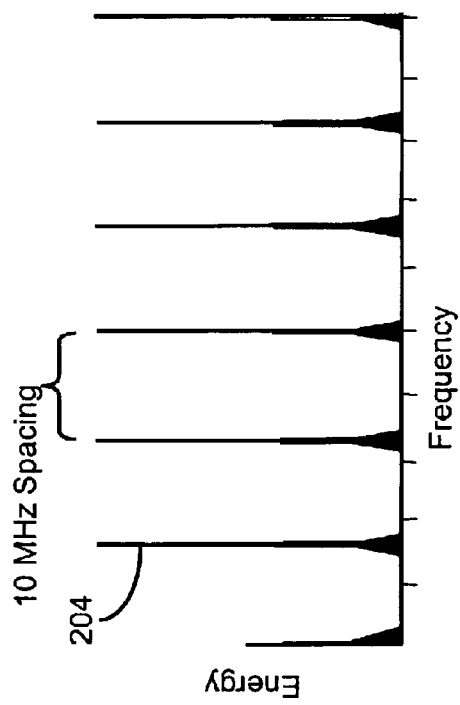
FIG. 2A illustrates a pulse train comprising pulses as in FIG. 1A.
Figure 2B:
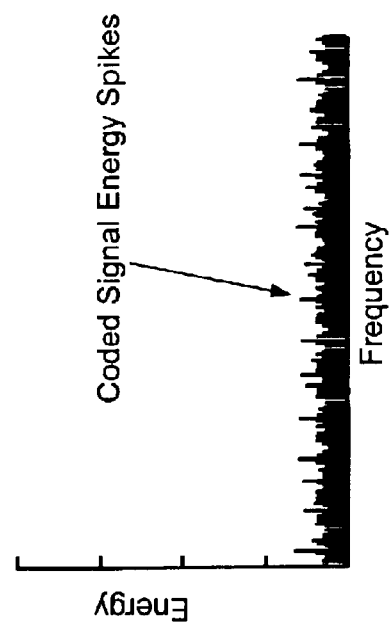
FIG. 2B illustrates the frequency domain amplitude of the waveform of FIG. 2A.
Figure 2C:
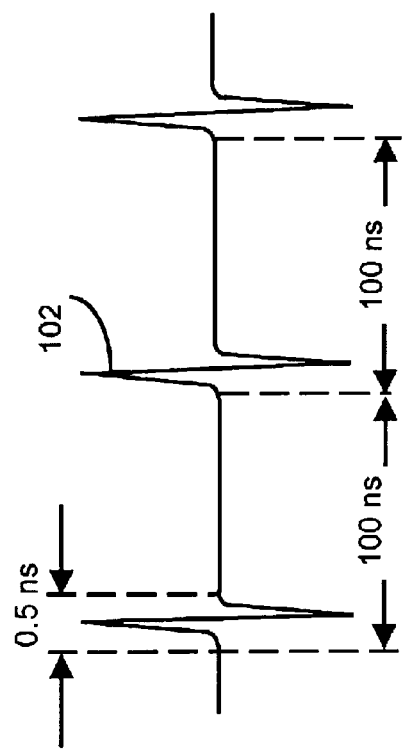
FIG. 2C illustrates the pulse train spectrum.

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems may have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = a\sum_{i=1}^{n} w(c(t - iT_f), b)$$

where i is the index of a pulse within a pulse train of n pulses, a is pulse amplitude, b is pulse type, c is a pulse width scaling parameter, w(t, b) is the normalized pulse waveform, and $T_f$ is pulse repetition time, also referred to as frame time.

The Fourier transform of a pulse train signal over a frequency bandwidth of interest may be determined by summing the phasors of the pulses for each code time shift, and multiplying by the Fourier transform of the pulse function:

$$S(f) = a\left|\sum_{i=1}^{n} e^{-j2\pi f i T_f}\right| W(f)$$

where S(f) is the amplitude of the spectral response at a given frequency, f is the frequency being analyzed, $T_f$ is the relative time delay of each pulse from the start of time period, W(f) is the Fourier transform of the pulse, w(t,b), and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-peak-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Coding

Figure 2D:
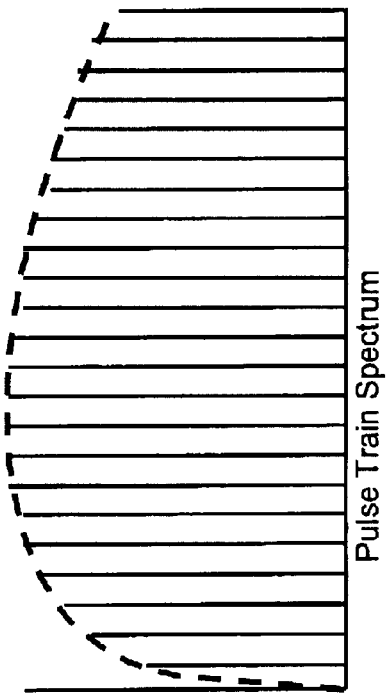
FIG. 2D is a plot of the Frequency vs. Energy.

Specialized coding techniques can be employed to specify temporal and/or non-temporal pulse characteristics to produce a pulse train having certain spectral and/or correlation properties. For example, by employing a Pseudo-Noise (PN) code to vary inter-pulse spacing, the energy in the uncoded comb lines presented in FIGS. 2B and 2C can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Figure 3:
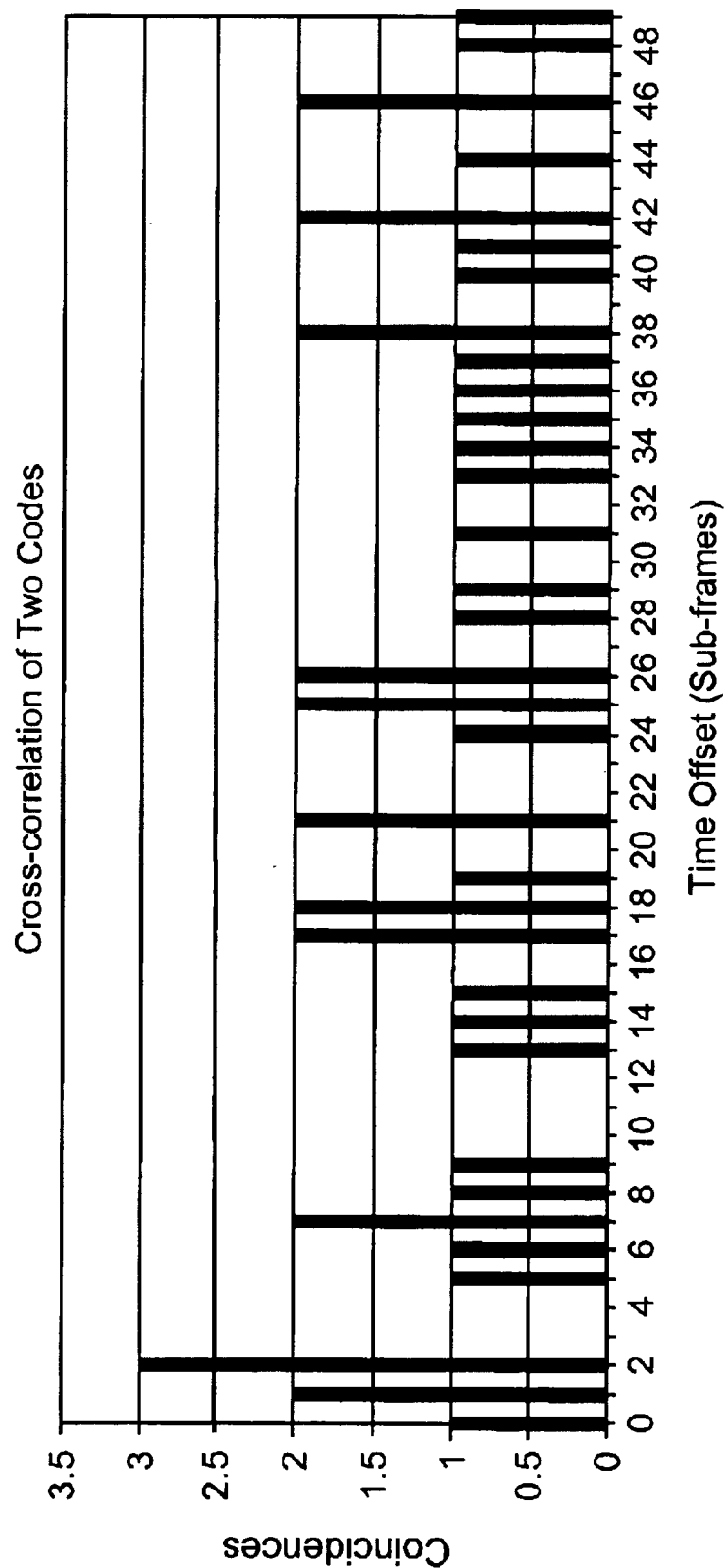
FIG. 3 illustrates the cross-correlation of two codes graphically as Coincidences vs. Time Offset.

Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," application Ser. No. 09/592,289, filed Jun. 12, 2000, and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," application Ser. No. 09/592,248 filed Jun. 12, 2000, and incorporated herein by reference.

The signal of a coded pulse train can be generally expressed by:

$$S_{tr}(t) = \sum_i (-1)^{f_i} a_i w(c_i(t-T_i), b_i)$$

where $s_{tr}(t)$ is the coded pulse train signal, i is the index of a pulse within the pulse train, $(-1)^{f_i}$, $a_i$, $b_i$, $c_i$, and $\omega(t,b_i)$ are the coded polarity, pulse amplitude, pulse type, pulse width, and normalized pulse waveform of the $i^{th}$ pulse, and $T_i$ is the coded time shift of the $i^{th}$ pulse.

Various numerical code generation methods can be employed to produce codes having certain correlation and spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned, co-pending application, titled "A Method and Apparatus for Specifying Pulse Characteristics using a Code that Satisfies Predefined Criteria," application Ser. No. 09/592,288, filed Jun. 12, 2000, and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Applying Codes Having Pre-Defined Properties," application Ser. No. 09/591,690, filed Jun. 12, 2000, and incorporated herein by reference.

Modulation

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas, the information modulation may shift the pulse position by 150 ps. This two-state 'early-late' form of time shift modulation is depicted in FIG. 4A.

A generalized expression for a pulse train with 'early-late' time-shift modulation over a data symbol time is:

$$S_{tr}(t) = \sum_{i=1}^{N_s} (-1)^{f_i} a_i w(c_i(t - T_i - \delta d_k), b_i)$$

where k is the index of a data symbol (e.g., bit), i is the index of a pulse within the data symbol, $N_s$ is the number of pulses per symbol, $(-1)^{f_i}$ is a coded polarity (flipping) pattern (sequence), $a_i$ is a coded amplitude pattern, $b_i$ is a coded pulse type (shape) pattern, $c_i$ is a coded pulse width pattern, and $w(t,b_i)$ is a normalized pulse waveform of the $i^{th}$ pulse, $T_i$ is the coded time shift of the $i^{th}$ pulse, $\delta$ is the time shift added when the transmitted symbol is 1 (instead of 0), $d_k$ is the data (i.e., 0 or 1) transmitted by the transmitter. In this example, the data value is held constant over the symbol interval. Similar expressions can be derived to accommodate other proposed forms of modulation.

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see "Apparatus, System and Method for One-of-Many Position Modulation in an Impulse Radio Communication System," application Ser. No. 09/875,290, filed Jun. 7, 2001, assigned to the assignee of the present invention, and incorporated herein by reference.

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, assigned to the assignee of the present invention, and incorporated herein by reference.

Vector modulation techniques may also be used to convey information. Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/169,765, filed Dec. 9, 1999, assigned to the assignee of the present invention, and incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they typically do not depend on receiving every transmitted pulse. Except for single pulse per bit systems, impulse radio receivers perform a correlating, synchronous receiving function (at the RF level) that uses sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

Interference Resistance

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems.

Figure 5A:
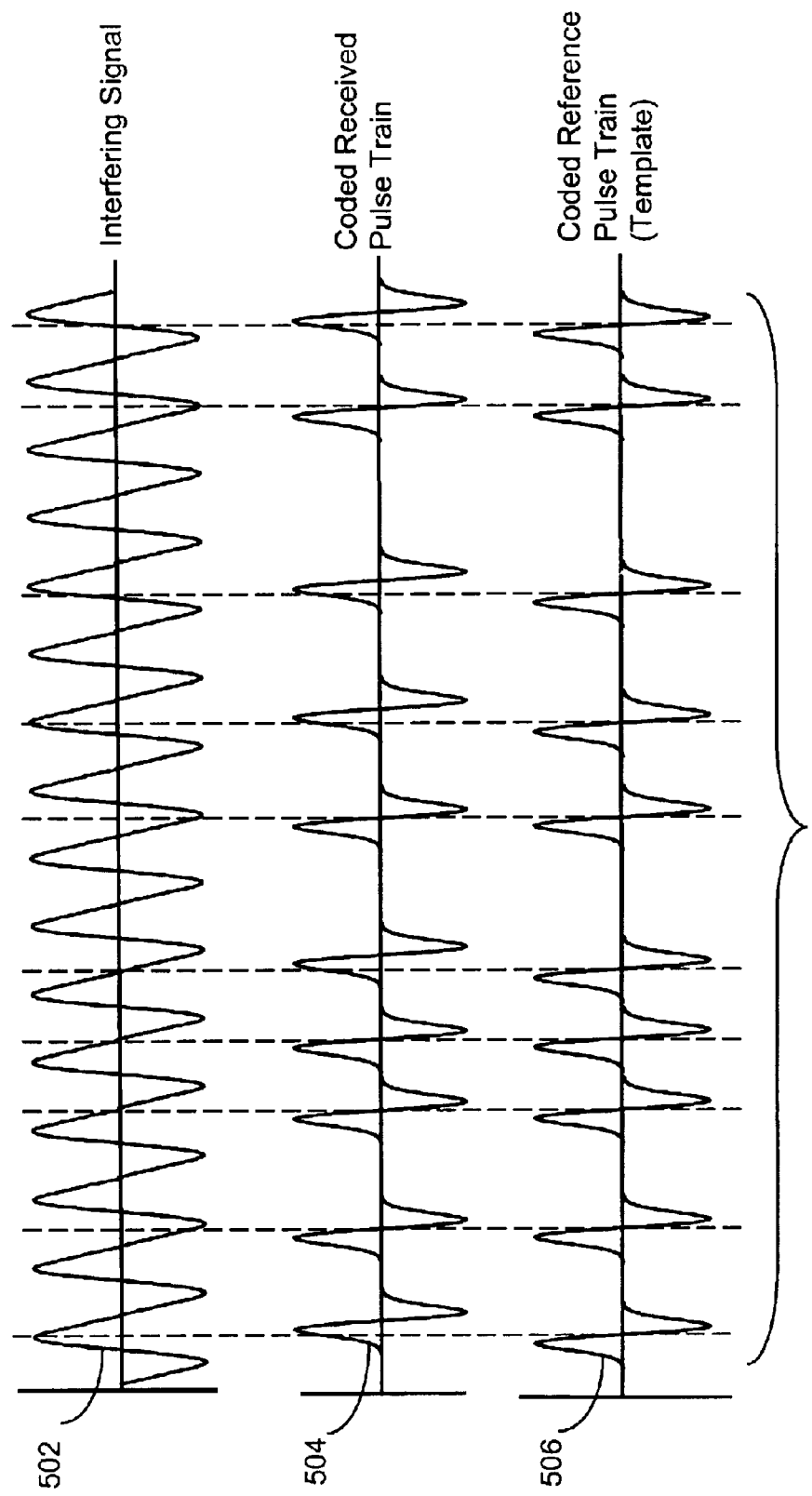
FIG. 5A illustrates representative signals of an interfering signal, a coded received pulse train and a coded reference pulse train.

FIG. 5A illustrates the result of a narrow band sinusoidal interference signal 502 overlaying an impulse radio signal 504. At the impulse radio receiver, the input to the cross correlation would include the narrow band signal 502 and the received ultrawide-band impulse radio signal 504. The input is sampled by the cross correlator using a template signal 506 positioned in accordance with a code. Without coding, the cross correlation would sample the interfering signal 502 with such regularity that the interfering signals could cause interference to the impulse radio receiver. However, when the transmitted impulse signal is coded and the impulse radio receiver template signal 506 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a conventional narrow band direct sequence spread spectrum system with a 10 kbps data rate and a 10 MHz spread bandwidth yields a processing gain of 1000, or 30 dB. However, far greater processing gains are achieved by impulse radio systems, where the same 10 kbps data rate is spread across a much greater 2 GHz spread bandwidth, resulting in a theoretical processing gain of 200,000, or 53 dB.

Capacity

It can be shown theoretically, using signal-to-noise arguments, that for an impulse radio system with an information rate of a few tens of kbps, thousands of simultaneous channels could be available as a result of its exceptional processing gain.

The average output signal-to-noise ratio of a reference impulse radio receiver may be calculated for randomly selected time-hopping codes as a function of the number of active users, $N_u$, as:

$$S_{out}(N_u) = \frac{1}{\frac{1}{S_{out}(1)} + \frac{1}{N_s}\frac{\sigma_a^2}{m_p^2}\sum_{k=2}^{N_u}\left(\frac{A_k}{A_1}\right)}$$

where $N_s$ is the number of pulses integrated per bit of information, $A_1$ is the received amplitude of the desired transmitter, $A_k$ is the received amplitude of interfering transmitter k's signal at the reference receiver, and $\sigma_{rec}^2$ is the variance of the receiver noise component at the pulse train integrator output in the absence of an interfering transmitter. The waveform-dependent parameters $m_p$ and $\sigma_a^2$ are given by $$m_p = \int_{-\infty}^{\infty} w(t)[w(t) - w(t-\delta)]dt$$

and $$\sigma_a^2 = T_f^{-1}\int_{-\infty}^{\infty}\left[\int_{-\infty}^{\infty} w(t-s)v(t)dt\right]^2 ds,$$

where $w(t)$ is the transmitted waveform, $u(t)=w(t)-w(t-\delta)$ is the template signal waveform, $\delta$ is the modulation time shift between a digital one and a zero value data bit, $T_f$ is the pulse repetition time, or frame time, and s is an integration parameter. The output signal to noise ratio that one might observe in the absence of interference is given by:

$$S_{out}(1) = \frac{(A_1 N_s m_p)^2}{\sigma_{rec}^2}$$

where, $\sigma_{rec}^2$ is the variance of the receiver noise component at the pulse train integrator output in the absence of an interfering transmitter. Further details of this analysis can be found in R. A. Scholtz, "Multiple Access with Time-Hopping Impulse Modulation," Proc. MILCOM, Boston, Mass., Oct. 11–14, 1993.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents a substantial portion of the potential coverage area of a typical radio system. In a mobile system, received signal strength fluctuates due to the changing mix of multipath signals that vary as the mobile units position varies relative to fixed transmitters, other mobile transmitters and signal-reflecting surfaces in the environment.

Impulse radios, however, can be substantially resistant to multipath effects. Impulses arriving from delayed multipath reflections typically arrive outside of the correlation time and, thus, may be ignored. This process is described in detail with reference to FIGS. 5B and 5C. FIG. 5B illustrates a typical multipath situation, such as in a building, where there are many reflectors 504B, 505B. In this figure, a transmitter 506B transmits a signal that propagates along three paths, the direct path 501B, path 1 502B, and path2 503B, to a receiver 508B, where the multiple reflected signals are combined at the antenna. The direct path 501B, representing the straight-line distance between the transmitter and receiver, is the shortest. Path 1 502B represents a multipath reflection with a distance very close to that of the direct path. Path 2 503B represents a multipath reflection with a much longer distance. Also shown are elliptical (or, in space, ellipsoidal) traces that represent other possible locations for reflectors that would produce paths having the same distance and thus the same time delay.

FIG. 5C illustrates the received composite pulse waveform resulting from the three propagation paths 501B, 502B, and 503B shown in FIG. 5B. In this figure, the direct path signal 501B is shown as the first pulse signal received. The path 1 and path 2 signals 502B, 503B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

FIGS. 5D, 5E, and 5F represent the received signal from a TM-UWB transmitter in three different multipath environments. These figures are approximations of typical signal plots. FIG. 5D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 5E illustrates an intermediate multipath environment. This approximates the response from one room to the next in a building. The amplitude of the direct path signal is less than in FIG. 5D and several reflected signals are of significant amplitude. FIG. 5F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 5E. In this situation, the direct path signal power is small relative to the total signal power from the reflections.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Figure 5G:
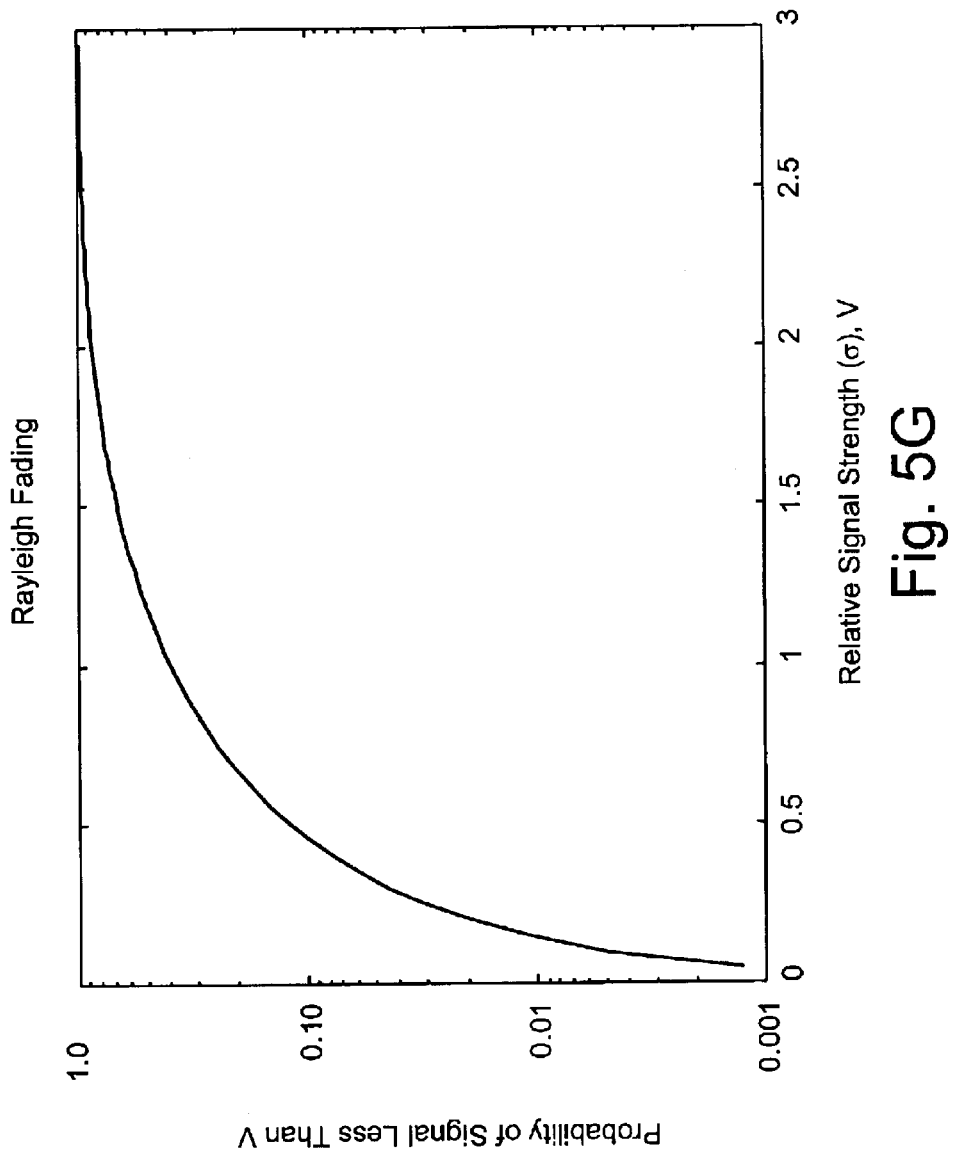
FIG. 5G illustrates the Rayleigh fading curve associated with non-impulse radio transmissions in a multipath environment.

In a narrow band system subject to a large number of multipath reflections within a symbol (bit) time, the received signal is essentially a sum of a large number of sine waves of random amplitude and phase. In the idealized limit, the resulting envelope amplitude has been shown to follow a Rayleigh probability density as follows:

$$p(r) = \frac{r}{\sigma^2} \exp\left(\frac{-r^2}{2\sigma^2}\right)$$

where r is the envelope amplitude of the combined multipath signals, and $2\sigma^2$ is the expected value of the envelope power of the combined multipath signals. The Rayleigh distribution curve in FIG. 5G shows that 10% of the time, the signal is more than 10 dB attenuated. This suggests that a 10 dB fade margin is needed to provide 90% link reliability. Values of fade margin from 10 dB to 40 dB have been suggested for various narrow band systems, depending on the required reliability. Although multipath fading can be partially improved by such techniques as antenna and frequency diversity, these techniques result in additional complexity and cost.

Figure 5H:
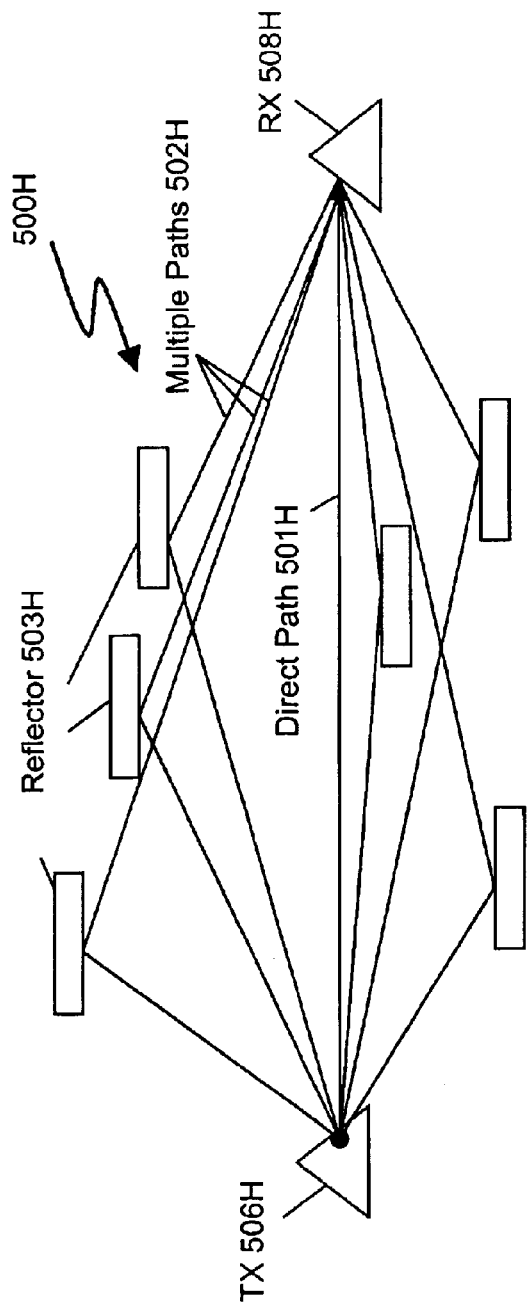
FIG. 5H illustrates a plurality of multipaths with a plurality of reflectors from a transmitter to a receiver.
Figure 5I:
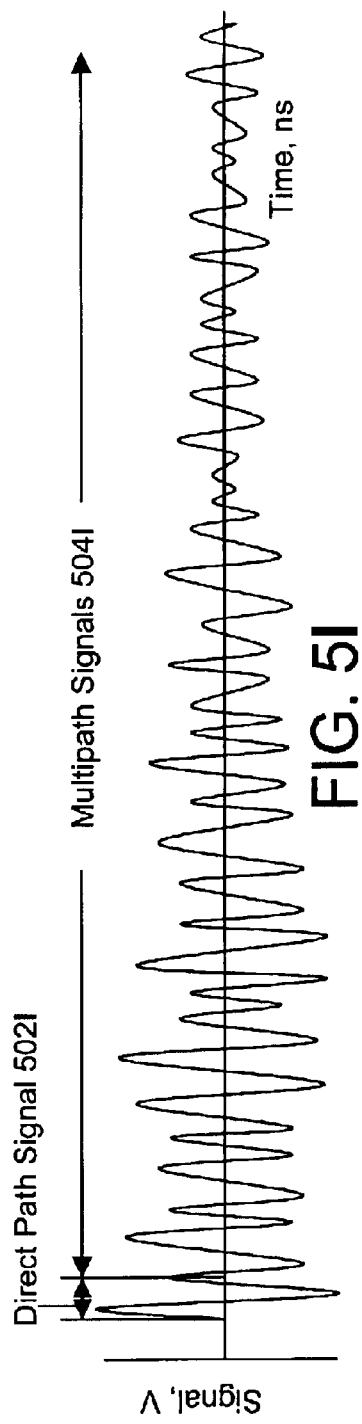
FIG. 5I graphically represents signal strength as volts vs. time in a direct path and multipath environment.

In a high multipath environment such as inside homes, offices, warehouses, automobiles, trailers, shipping containers, or outside in an urban canyon or in other situations where the propagation is such that the received signal is primarily scattered energy, impulse radio systems can avoid the Rayleigh fading mechanism that limits performance of narrow band systems, as illustrated in FIGS. 5H and 5I. FIG. 5H depicts an impulse radio system in a high multipath environment 500H consisting of a transmitter 506H and a receiver 508H. A transmitted signal follows a direct path 501H and reflects off of reflectors 503H via multiple paths 502H. FIG. 5I illustrates the combined signal received by the receiver 508H over time with the vertical axis being signal strength in volts and the horizontal axis representing time in nanoseconds. The direct path 501H results in the direct path signal 502I while the multiple paths 502H result in multipath signals 504I. UWB system can thus resolve the reflections into separate time intervals which can be received separately. Thus, the UWB system can select the strongest or otherwise most desirable reflection from among the numerous reflections. This yields a multipath diversity mechanism with numerous paths making it highly resistant to Rayleigh fading. Whereas, in a narrow band systems, the reflections arrive within the minimum time resolution of one bit or symbol time which results in a single vector summation of the delayed signals with no inherent diversity.

Distance Measurement and Positioning

Impulse systems can measure distances to relatively fine resolution because of the absence of ambiguous cycles in the received waveform. Narrow band systems, on the other hand, are limited to the modulation envelope and cannot easily distinguish precisely which RF cycle is associated with each data bit because the cycle-to-cycle amplitude differences are so small they are masked by link or system noise. Since an impulse radio waveform has minimal multi-cycle ambiguity, it is feasible to determine waveform position to less than a wavelength in the presence of noise. This time position measurement can be used to measure propagation delay to determine link distance to a high degree of precision. For example, 30 ps of time transfer resolution corresponds to approximately centimeter distance resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology in a Time Division Multiple Access (TDMA) radio system can achieve geo-positioning capabilities to high accuracy and fine resolution. This geo-positioning method is described in U.S. Pat. No. 6,300,903, issued Oct. 9, 2001, titled "System and Method for Person or Object Position Location Utilizing Impulse Radio," which is incorporated herein by reference.

Power Control

Power control systems comprise a first transceiver that transmits an impulse radio signal to a second transceiver. A power control update is calculated according to a performance measurement of the signal received at the second transceiver. The transmitter power of either transceiver, depending on the particular setup, is adjusted according to the power control update. Various performance measurements are employed to calculate a power control update, including bit error rate, signal-to-noise ratio, and received signal strength, used alone or in combination. Interference is thereby reduced, which may improve performance where multiple impulse radios are operating in close proximity and their transmissions interfere with one another. Reducing the transmitter power of each radio to a level that produces satisfactory reception increases the total number of radios that can operate in an area without mutial interference. Reducing transmitter power can also increase transceiver efficiency.

For greater elaboration of impulse radio power control, see patent application titled "System and Method for Impulse Radio Power Control," application Ser. No. 09/332, 501, filed Jun. 14, 1999, assigned to the assignee of the present invention, and incorporated herein by reference.

Exemplary Transceiver Implementation

Transmitter

An exemplary embodiment of an impulse radio transmitter 602 of an impulse radio communication system having an optional subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter. The control voltage to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614, together with an optional, internally generated subcarrier signal, and an information signal 616, to generate a modulated, coded timing signal 618.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger signal to generate output pulses. The output pulses are provided to a transmit antenna 624 via a transmission line 626 coupled thereto. The output pulses are converted into propagating electromagnetic pulses by the transmit antenna 624. The electromagnetic pulses (also called the emitted signal) propagate to an impulse radio receiver 702, such as shown in FIG. 7, through a propagation medium. In a preferred embodiment, the emitted signal is wide-band or ultrawide-band, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710, via a receiver transmission line, coupled to the receive antenna 704. The cross correlation 710 produces a baseband output 712.

The receiver 702 also includes a precision timing generator 714, which receives a periodic timing signal 716 from a receiver time base 718. This time base 718 may be adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 preferably comprises a multiplier followed by a short term integrator to sum the multiplier product over the pulse interval.

The output of the correlator 710 may be coupled to an optional subcarrier demodulator 732, which demodulates the subcarrier information signal from the optional subcarrier, when used. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to provide an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to maintain proper timing between the received signal 708 and the template. The loop error signal 744 is processed by the loop filter to provide adjustments to the adjustable time base 718 to correct the relative time position of the periodic timing signal 726 for best reception of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
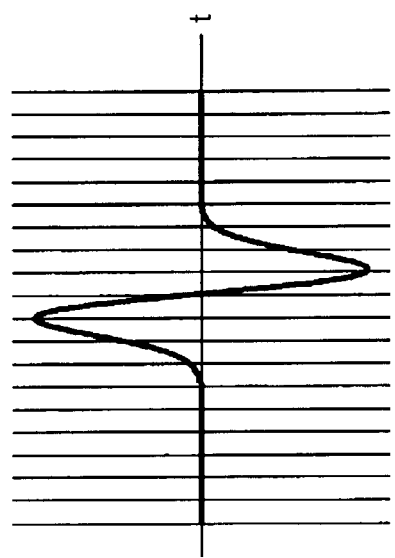
FIG. 8A illustrates a representative received pulse signal at the input to the correlator.
Figure 8B:
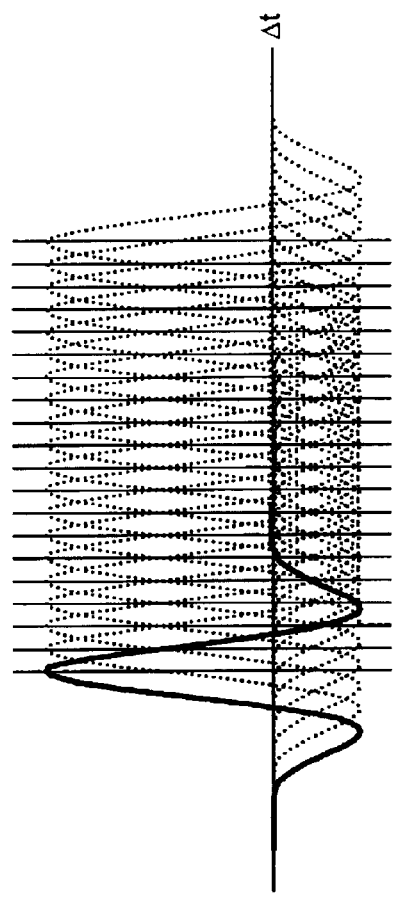
FIG. 8B illustrates a sequence of representative impulse signals in the correlation process.
Figure 8C:
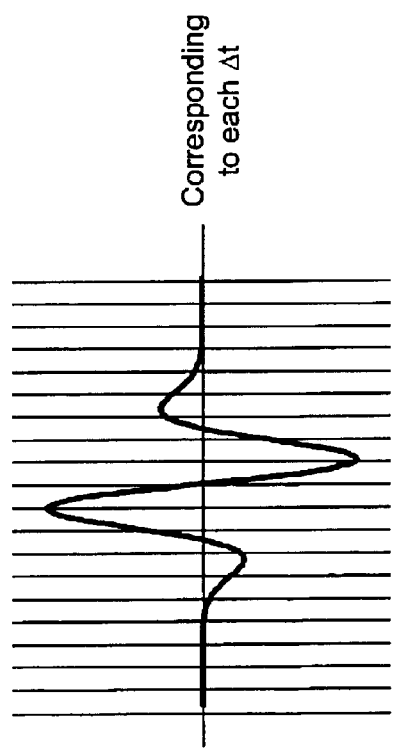
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the cross correlator for each of the time offsets of FIG. 8B. For any given pulse received, there is a corresponding point that is applicable on this graph. This is the point corresponding to the time offset of the template signal used to receive that pulse. Further examples and details of precision timing can be found described in U.S. Pat. Nos. 5,677,927 and 6,304,623, issued Oct. 16, 2001, titled "Precision Timing Generator System and Method," both of which are incorporated herein by reference.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Methods to improve the speed at which a receiver can acquire and lock onto an incoming impulse radio signal have been developed. In one approach, a receiver includes an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in more detail in U.S. Pat. No. 5,832,035 to Fullerton, incorporated herein by reference.

In another approach, a receiver obtains a template pulse train and a received impulse radio signal. The receiver compares the template pulse train and the received impulse radio signal. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, see the patent application titled "Method and System for Fast Acquisition of Ultra Wideband Signals," application Ser. No. 09/538,292, filed Mar. 29, 2000, assigned to the assignee of the present invention, and incorporated herein by reference.

A receiver has been developed that includes a baseband signal converter device and combines multiple converter circuits and an RF amplifier in a single integrated circuit package. For greater elaboration of this receiver, see U.S. Pat. No. 6,421,389, issued Jul. 16, 2002, titled "Baseband Signal Converter for a Wideband Impulse Radio Receiver," assigned to the assignee of the present invention, and incorporated herein by reference

DESCRIPTION OF THE PREFERRED EMBODIMENTS

The present invention is directed towards detecting an impulse radio signal, and more particularly, to fast lock and acquisition of an impulse radio signal.

An impulse radio signal is assumed to be sent by a transmitter to a receiver, which may be part of a one-way or two-way communication system. In a preferred embodiment, the transmitter initially sends an acquisition data signal to the receiver to assist the receiver in acquiring and locking on the signal to be sent by the transmitter. The acquisition data signal may comprise one or more bits and is further discussed below with respect to FIG. 15A. Each bit of the acquisition data sent by the transmitter typically comprises one or more pulses. The number of bits and the number of pulses per bit is determined by a number of variables, including pulse rate, bit rate, interference levels, range, and noise. The relative locations in time, polarity, and amplitude (also known as the code) of the pulses that comprise a bit of the acquisition data sent by the transmitter are predetermined and are stored in the receiver. The system may use any of a number of coding techniques including time position coding, polarity coding, amplitude coding or combinations of these or other methods known in the art. For purposes of this description, time position coding will be illustrated, but it should be apparent to one skilled in the art from the teaching herein how to apply other methods of coding to the invention. In addition to the pulse code, the receiver stores data for verifying the acquisition data. Hence, the receiver knows the time locations of the pulses for a bit of data relative to the other pulses in the bit, but the receiver does not know when in time the bit begins or when in time the acquisition data begins. For example, the receiver knows the pseudorandom sequence being used by the transmitter but does not know the location in time of the pseudorandom sequence. The present invention solves this problem by detecting the beginning of a bit, detecting the beginning of an acquisition data stream containing the bit, and verifying the contents of the acquisition data.

The Acquisition Process

Figure 9:
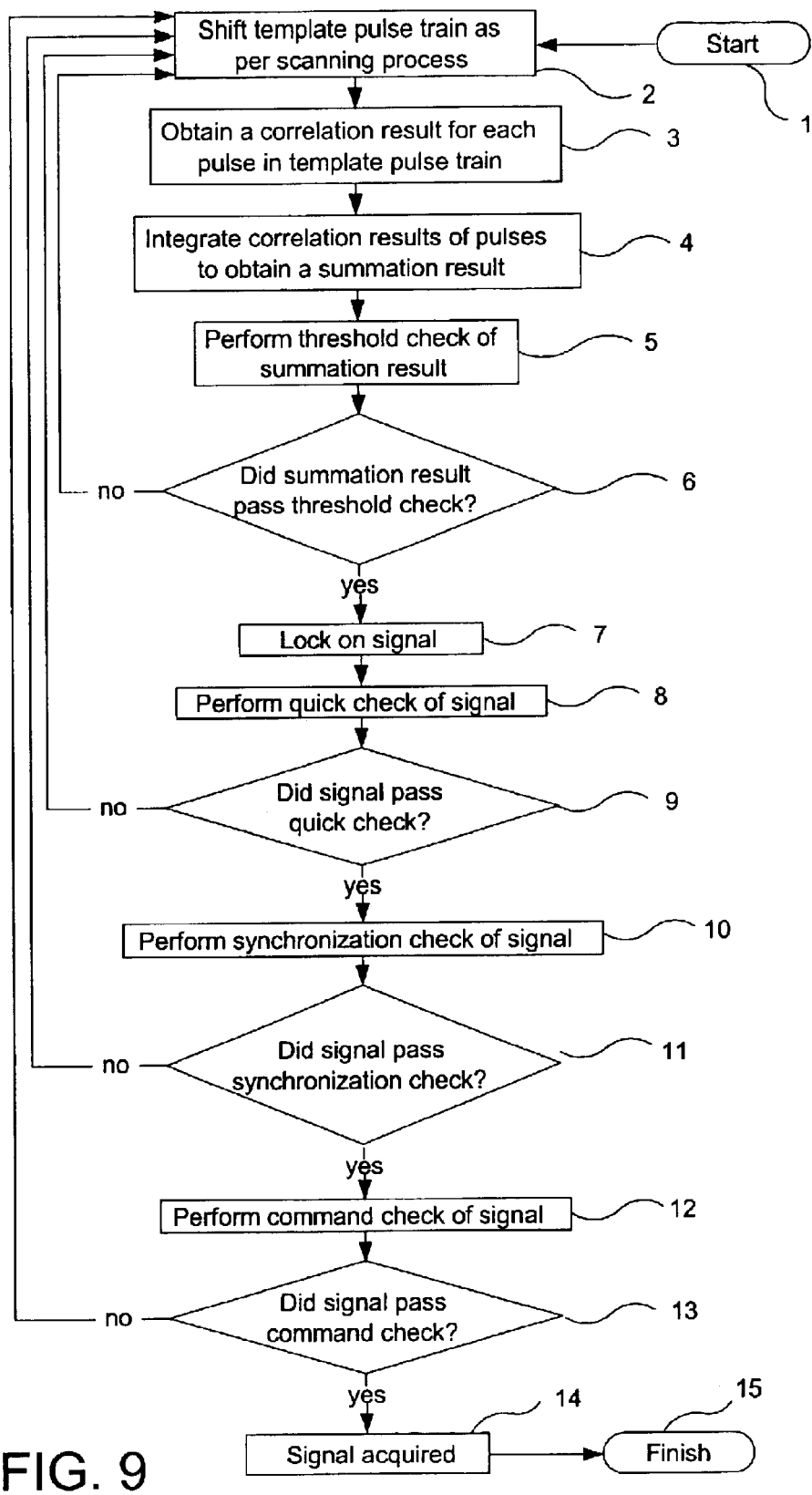
FIG. 9 illustrates a flow diagram for fast lock and acquisition of an impulse radio signal using the invention.

FIG. 9 illustrates a flow diagram for fast lock and acquisition of an impulse radio signal using the invention. In block 1, the fast lock and acquisition of the impulse radio signal starts. In block 2, a template pulse train is obtained and shifted as per a scanning process. The template pulse train includes a series of pulses and is compared in block 3 by a cross-correlator to a received impulse radio signal, which may or may not match the pattern of pulses in the template pulse train because of the unknown time shift. Through shifting the template pulse train, the template pulse train is placed at various locations in time as compared to the received impulse radio signal until a match is obtained between the template pulse train and the received impulse radio signal, where a match is determined based on one or more acceptance criteria.

Figure 10A:
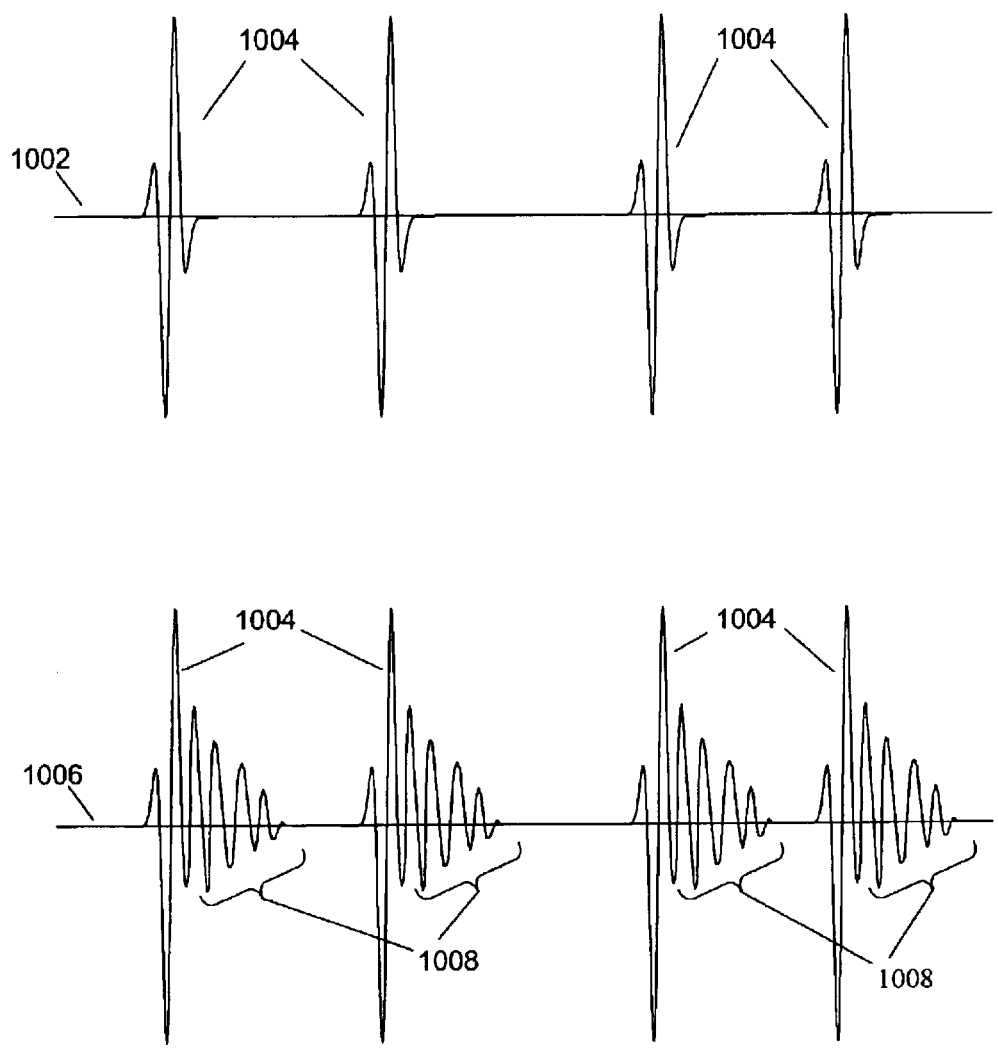
FIG. 10A illustrates two exemplary forms of a received impulse radio signal.

FIG. 10A illustrates two exemplary forms of a received impulse radio signal. The first form of a received impulse radio signal 1002 exhibits little, if any, multipath fading effects and as such includes direct path parts 1004 that closely resemble a corresponding transmitted impulse radio signal. In contrast, the second form of a received impulse radio signal 1006 exhibits multipath fading effects and as such includes direct path parts 1004 and multipath reflection parts 1008 that correspond to the transmitted impulse radio signal. The length and number of the multipath parts 1008 vary depending on the environment between a transmitter and receiver.

Figure 10B:
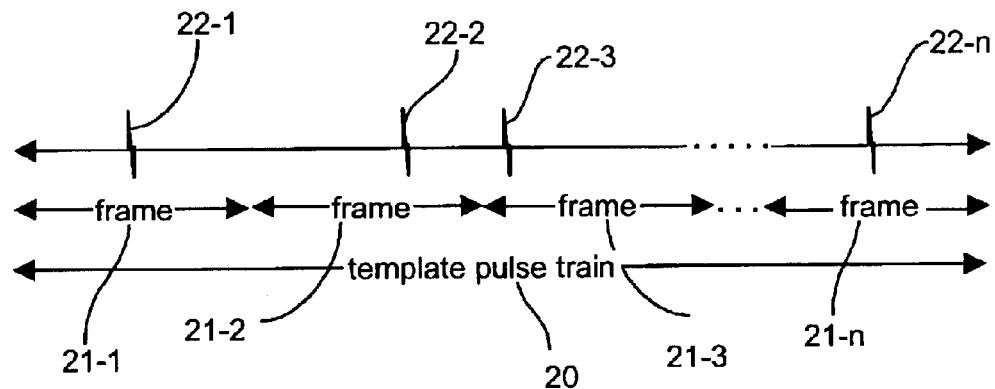
FIG. 10B illustrates a template pulse train.

FIG. 10B illustrates an exemplary template pulse train 20 based on time position coding. The template pulse train has a length of approximately one bit of an impulse radio signal. Alternatively, the template pulse train can have a length of greater than or less than approximately one bit of an impulse radio signal. The length of a bit for an acquisition and lock period can be the same or different than a length of a bit for a communication period after the acquisition and lock period. The exemplary template pulse train 20 is divided into n frames 21-1, 21-2, 21-3, . . . , 21-n. Each frame 21-1, 21-2, 21-3, . . . , 21-n includes a single pulse 22-1, 22-2, 22-3, . . . , 22-n, respectively.

As an example, if each pulse 22-1, 22-2, 22-3, . . . , 22-n has a width of approximately 0.5 ns, the template pulse train has 100 frames, and each frame has a length of approximately 100 ns, the template pulse train has a total length of approximately 10 $\mu$s.

Figure 11A:
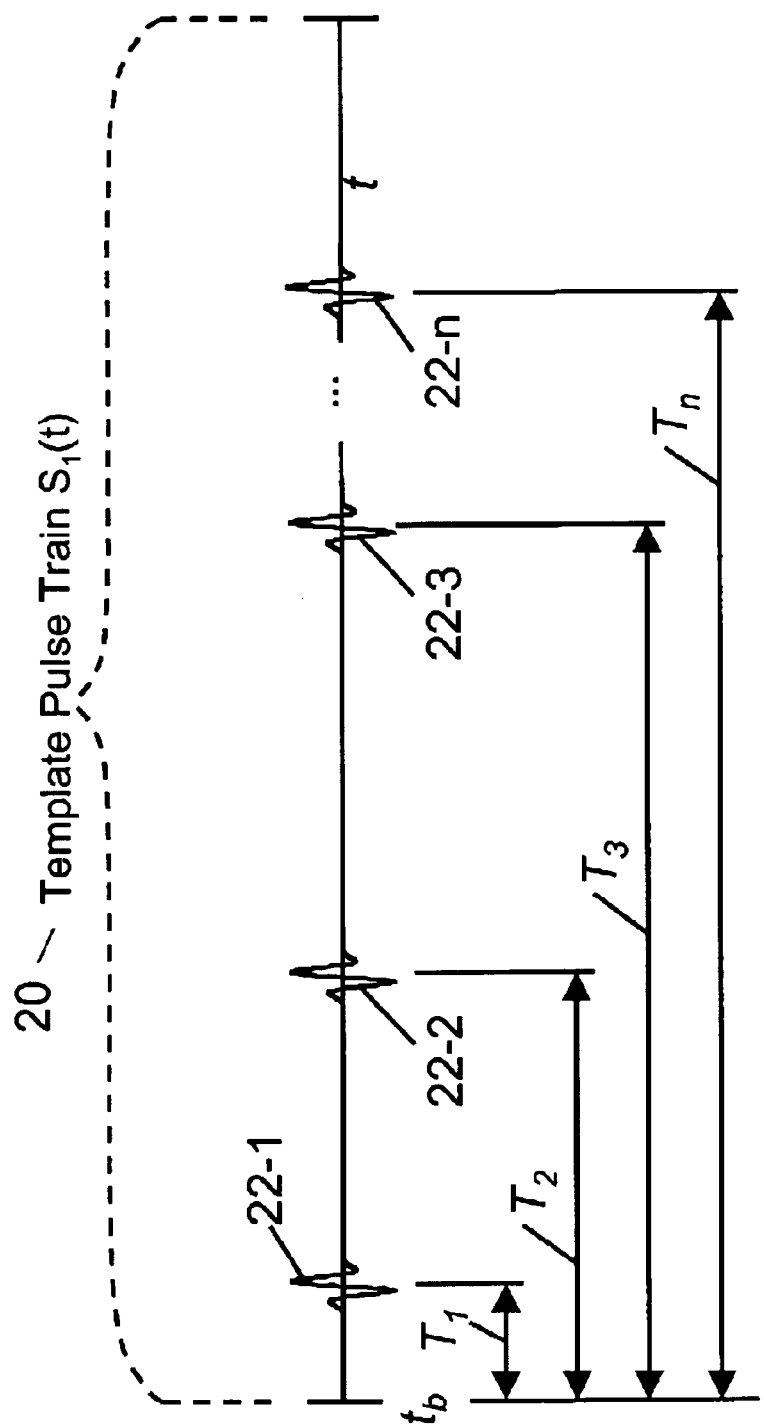
FIG. 11A illustrates an exemplary template pulse train that can have a fixed frame time or a non-fixed time frame.

As mentioned above, the fast lock and acquisition of a received impulse radio signal 1002 or 1006 starts by generating a template pulse train 20 and comparing this template pulse train to the received impulse radio signal 1002 or 1006. If the template pulse train 20 and received impulse radio signal 1002 or 1006 match each other, then the receiver can lock onto a direct path part 1004 or one of the multipath reflection parts 1008 of the received impulse radio signal 1002 or 1006. If they do not match each other then the template pulse train 20 is continually shifted and compared to the received impulse radio signal 1002 or 1006 until there is a match between one of the shifted template pulse trains and the received impulse radio signal 1002 or 1006. The match does not have to be exact but should be close enough to one another such that it passes acceptance criteria, for example, meeting or exceeding some predetermined threshold. The operation of block 2 which includes various ways of shifting the template pulse train is described below with reference to FIGS. 11A through 11P.

Figure 10C:
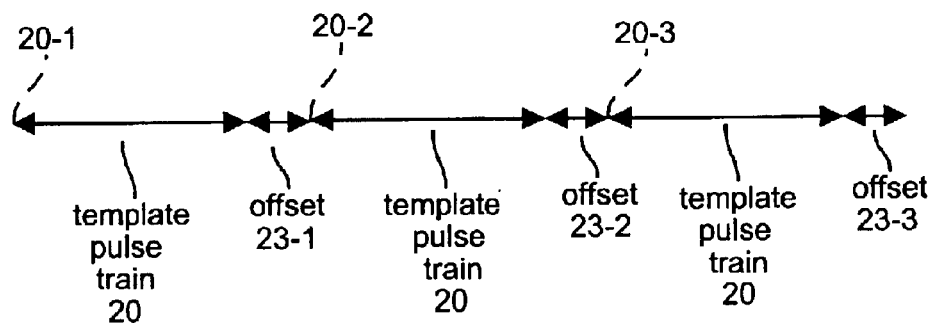
FIG. 10C illustrates shifting a template pulse train by an offset.

FIG. 10C illustrates shifting a template pulse train 20 by an offset 23-1, 23-2 or 23-3. After being located at a first position 20-1, the flow of FIG. 9 proceeds from block 2 to block 3. After the flow of FIG. 9 returns to block 2 from block 6, 9, 11, or 13, the template pulse train 20 is offset in time by a first offset 23-1 to a second position 20-2. After the flow of FIG. 9 again returns to block 2 from block 6, 9, 11, or 13, the template pulse train 20 is offset in time by a second offset 23-2 to a third position 20-3. After the flow of FIG. 9 once again returns to block 2 from block 6, 9, 11, or 13, the template pulse train 20 is offset in time by a third offset 23-3, and so on.

Figure 10D:
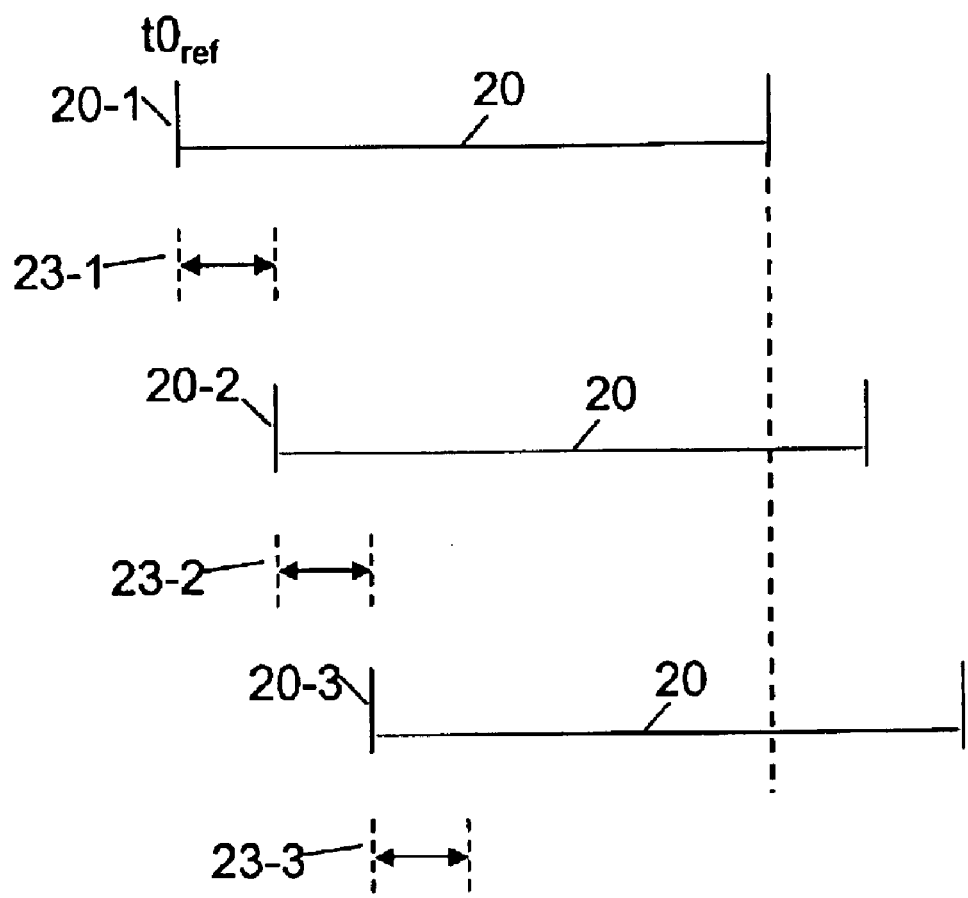
FIG. 10D is an alternative presentation of the information in FIG. 10C using a cyclic representation.

FIG. 10D illustrates the information as in FIG. 10C in a cyclic format. The cyclic format shown in FIG. 10D displays each successive line in synchronization with a time reference keeping time at the system pulse train rate. Thus, without any offset, each successive pulse train will line up immediately beneath the preceding pulse train. Using this format the time offset is easily visualized relative to an uninterrupted set of template pulse trains.

Following are some exemplary mathematical expressions that can be used to describe the position of each pulse 22-1, 22-2, 22-3 and 22-n in a template pulse train 20. The following expression equation is described in conjunction with FIG. 11A, which illustrates an exemplary template pulse train:

$$S_1(t) = \sum_k a_k W(t - T_k - t_b)$$

where $S_1(t)$ is the template waveform comprising a plurality of pulse waveforms, W is a single ultra-wideband (pulse) waveform, k is a pulse index, $a_k$ is the amplitude of the $k^{th}$ pulse, $T_k$ is the time delay between the beginning of the pulse train time interval and the $k^{th}$ pulse, t is the receiver's clock time and $t_b$ is the receiver time when the code begins.

Figure 11B:
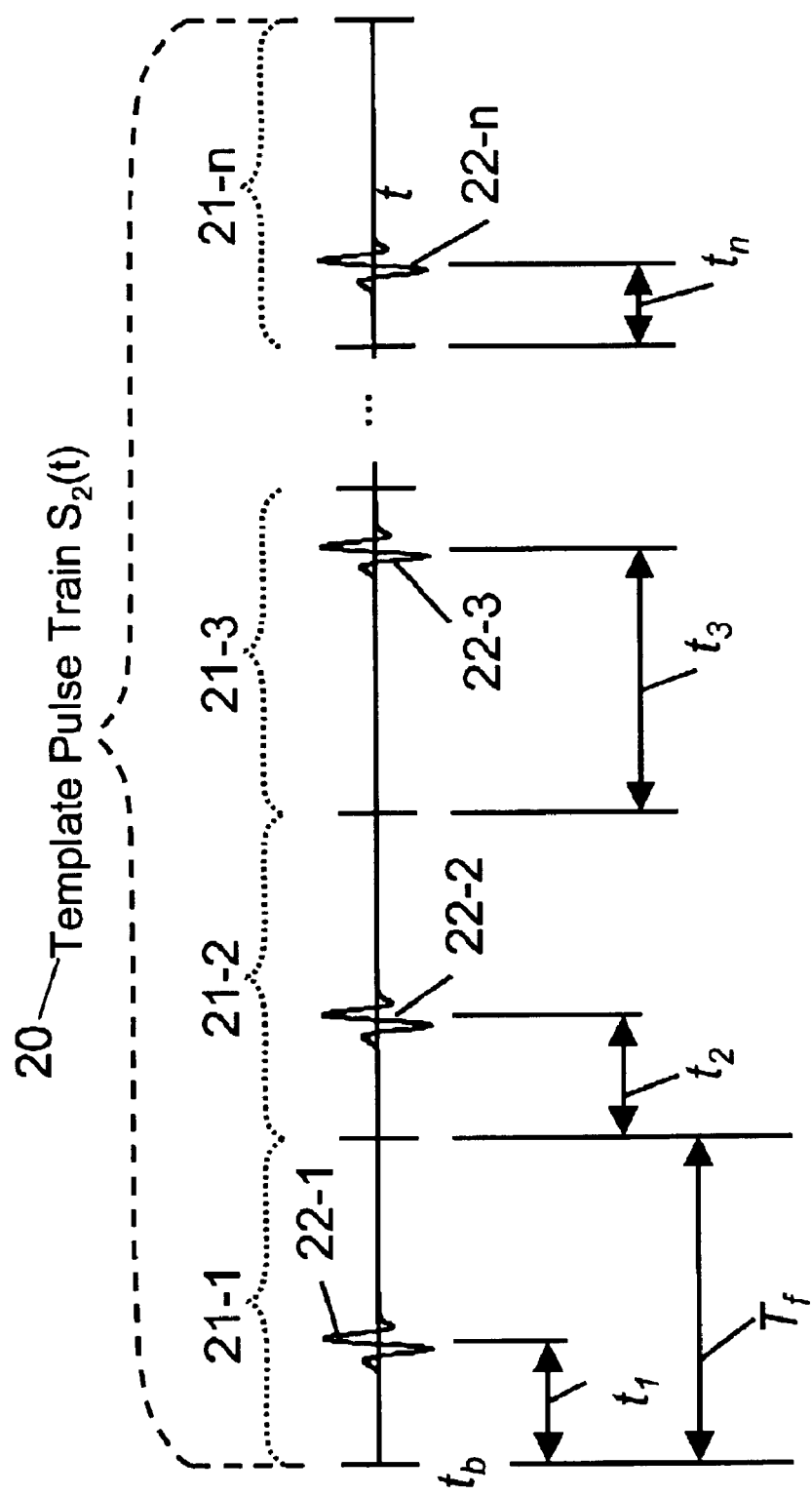
FIG. 11B illustrates an exemplary template pulse train that has a fixed frame time.

An alternative expression is described in conjunction with FIG. 11B, which illustrates an exemplary template pulse train. This alternative expression is particularly applicable to systems where time can be divided into frames of equal length with a single pulse occurring during each frame. For this type of system the template signal may be described as follows:

$$S_2(t) = \sum_{k}^{n-1} a_k W(t - kT_F - t_k - t_b)$$

where $S_2(t)$ is the template waveform comprising a plurality of pulse waveforms W is the ultra-wideband (pulse) waveform, k is the pulse index, $a_k$ is the amplitude of the $k^{th}$ pulse, $t_k$ is the frame offset, t is the receiver's clock time, $T_F$ is the frame interval and $t_b$ is the receiver time when the code begins (see FIG. 11B for a graphical representation of the above elements). It should be understood that the second equation relates to frame codes and as such is a special case of the first equation where $T_k = kT_F + t_k$. It should also be understood that the first equation can be used to determine the position of each pulse in a template pulse train that has fixed frame time or non-fixed frame time. And, the second equation can be used to determine the position of each pulse in a template pulse train that has a fixed frame time. Reference is made to the reverse binary scanning process described below and Table 1 where the concepts embodied in these expressions will be used to describe certain properties of the invention.

In order to align the receiver to a transmitted signal, the first step is to search through a space involving the relevant unknown parameters of the signal until a match is found. In a typical system, a code and stream of data are predefined and known at the receiver so that the only remaining parameter to be found is the relative time offset between the transmitter clock and the receiver clock. This time offset can be found using a searching or scanning process.

The Scanning Process

Figure 11C:
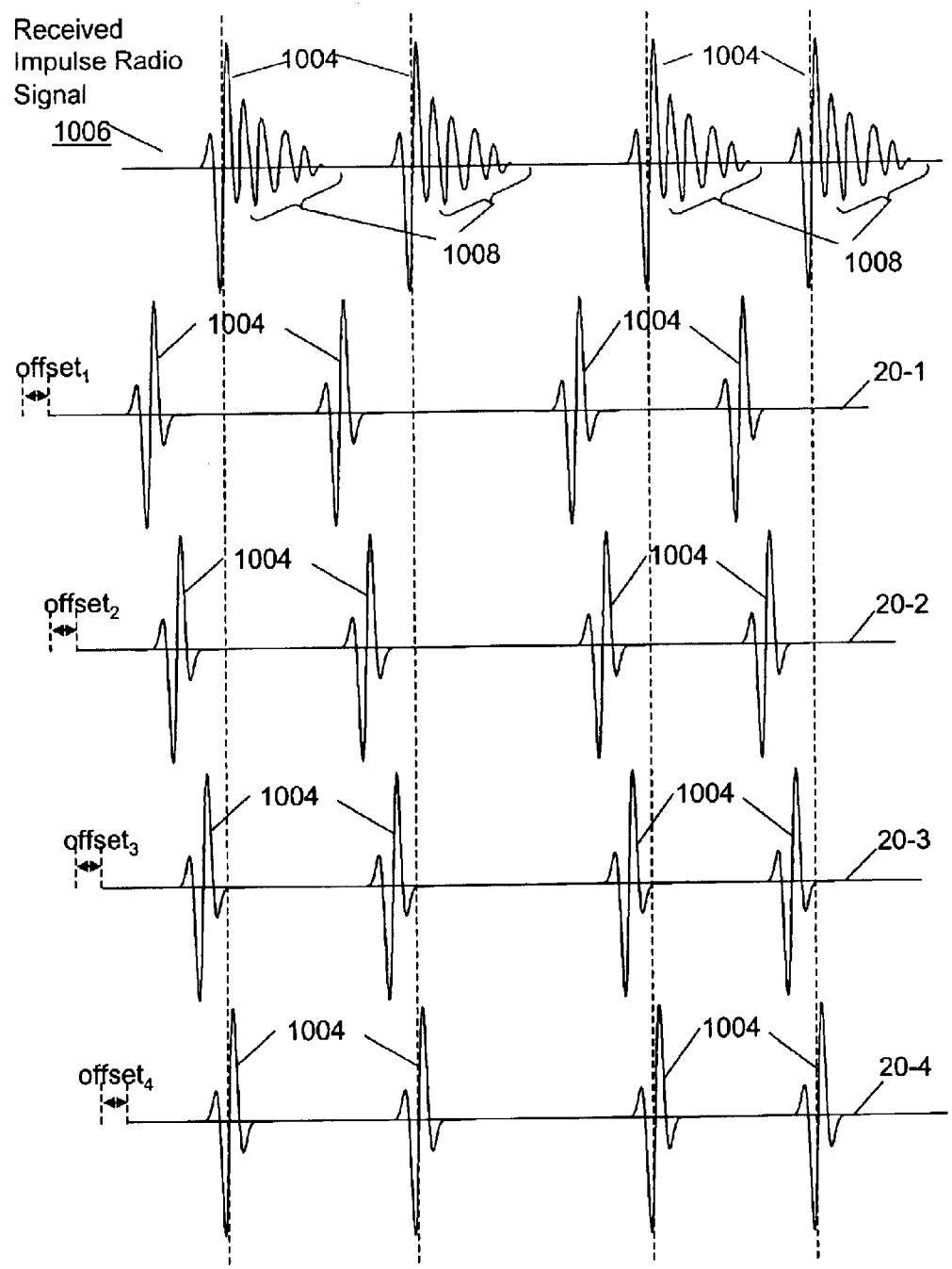
FIG. 11C illustrates a received impulse radio signal compared to a template pulse train that was shifted in accordance with an exemplary scanning process.

FIG. 11C illustrates the relative alignment of a received impulse radio signal 1006 compared to a template pulse train that was shifted in accordance with an exemplary scanning process. Basically, the same template pulse train 20 is shifted to different locations in time and compared to the received impulse radio signal 1006 until a match is obtained between one of the shifted template pulse trains and the received impulse radio signal. The different locations in time where the template pulse train 20 is placed are determined by the offsets generated by a scanning process. For instance, the first offset is 0, the second offset can be a ¼ wavelength from the first offset, and the third offset can be a ¼ wavelength from the second offset and a ½ wavelength from the first offset and so on.

As shown in FIG. 11C, four template pulse trains 20-1, 20-2, 20-3 and 20-4 are sequentially compared to the received impulse radio signal 1006 (see block 3 of FIG. 9). Each template pulse train 20-1, 20-2, 20-3 and 20-4 has a pulse code pattern that is similar to the pulse code pattern (direct path parts 1104 and, if any, multipath reflection parts 1108) within the received impulse radio signal 1006. First, the comparison between template pulse train 20-1 shifted by offset, and the received impulse radio signal 1006 fails to indicate a match. Next, the comparison between template pulse train 20-2 shifted by offset$_2$ and the received impulse radio signal 1006 fails to indicate a match. Likewise, the comparison between template pulse train 20-3 shifted by offset$_3$ and the received impulse radio signal 1006 fails to indicate a match. There are no matches between template pulse trains 20-1, 20-2 and 20-3 and the received impulse radio signal 1006, because the pulses in the template pulse trains 20-1, 20-2 and 20-3 are not aligned in time with the pulses in the received impulse radio signal 1006 (see blocks 3–6 of FIG. 9). However, the comparison between template pulse train 20-4 shifted by offset$_4$ and the received impulse radio signal 1006 indicates a match, because the pulses in the template pulse trains 20-4 are aligned in time with the pulses in the received impulse radio signal 1006. Once there is a match, the receiver locks onto any part of the impulse radio signal 1006 that was aligned with the template pulse train 20-4.

It should be understood that if the offsets are relatively small and increasing in delay (e.g., fine step scanning process), then the receiver is likely to lock onto the direct path 1104 or leading edge of the received impulse radio signal 1006. However, if the offsets are relatively large (e.g., coarse step scanning process) then the receiver may to lock onto one of the multipath reflection parts 1108 of the received impulse radio signal 1006. In the event the receiver locks onto one of the multipath reflection parts 1108 of the received impulse radio signal 1006, the receiver can then locate the direct path 1104 by continuing to scan for the leading edge of the received impulse radio signal 1006.

Various alternative scanning approaches are described below including fine step scanning, coarse step scanning, frame step scanning, random offset scanning, pseudo noise offset scanning, reverse binary scanning, reverse ternary scanning, reverse n-ary scanning, mixed binary scanning, and variations on reverse binary and mixed binary patterns.

Fine Step Scanning

The fine step scanning process, in brief, involves shifting the time offset of a receiver time base in small increments and observing a received signal for a period of time sufficient to identify a match between the received signal and a locally generated template signal in the presence of noise and/or interference.

Figure 11D:
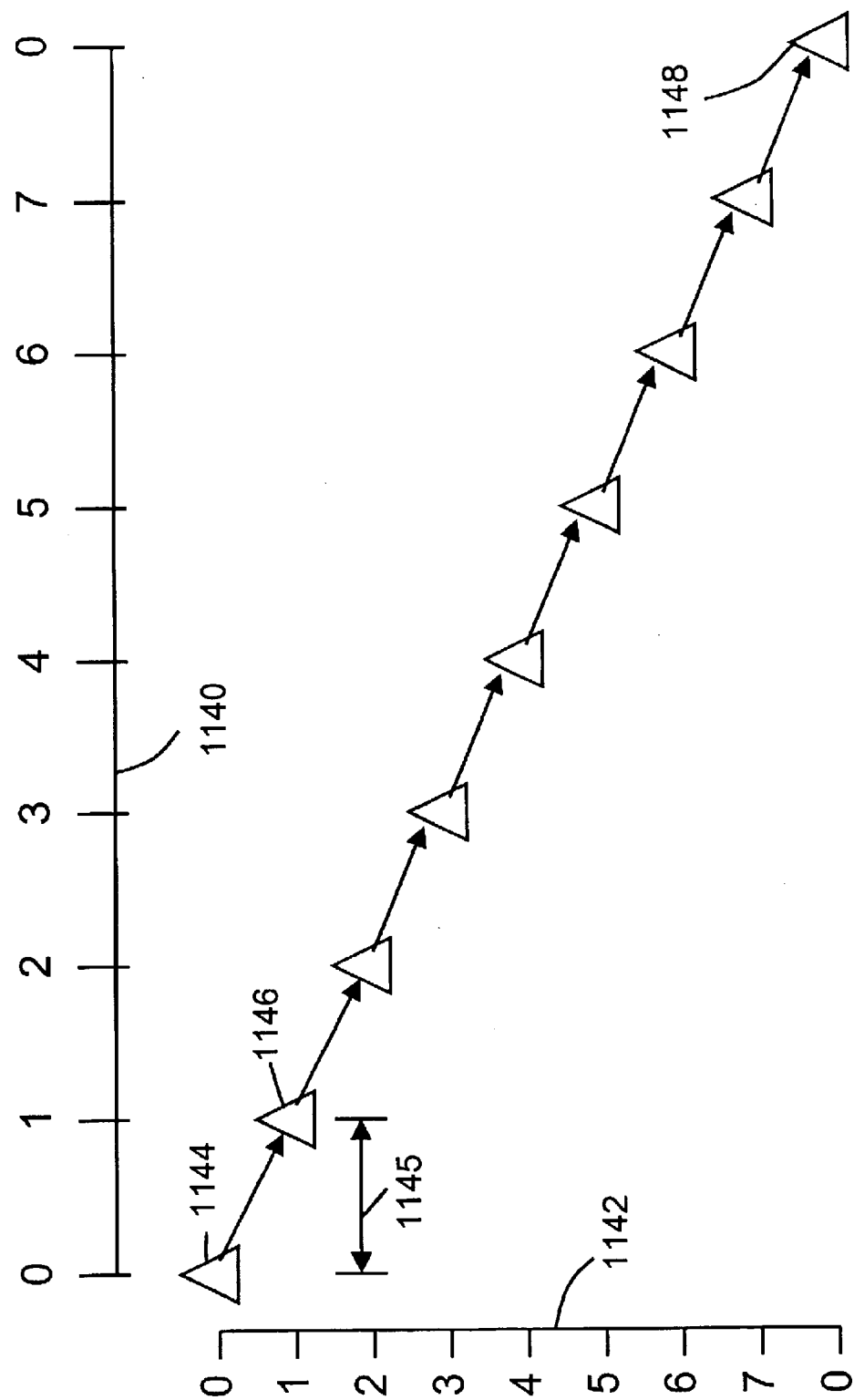
FIG. 11D is a simplified cyclic diagram showing the relative sampling positions in a fine step scanning process.

The fine step search process will now be described with reference to FIG. 11D. FIG. 11D is a simplified cyclic diagram showing the relative sampling positions in a fine step scanning process. Referring to FIG. 11D, the top axis 1140 represents a time axis spanning a search interval with eight resolution positions labeled "0"–"7" and returning to "0". The final "0" is the same as the "0" of the next search interval. The search interval may, for example, correspond to the length of a template pulse train used to receive the desired signal. The vertical axis 1142 represents successive search intervals. The triangles 1144 represent a reference point, such as the first pulse, in a sampling template pulse train. The simplified example in FIG. 11D shows eight resolution points, but in a typical system, the number of resolution points may range from a few to many tens of thousands or more, with as many corresponding samples.

The search begins with a beginning sample 1144, which may integrate as many pulses as necessary to receive the signal and determine a match. These pulses will preferably comprise a code length. If a possible match is determined, the search terminates and then the system further examines the signal to determine its validity and complete the acquisition process. If no match is determined, an offset value of 1 resolution bin is added to the template timing and a second sample 1146 is taken. The process continues until a signal is found or the final sample 1148 is taken at which time the process may begin again.

As shown in FIG. 11D, the step is positive, increasing in time; however alternatively, the step may be negative, decreasing in time.

The time step size used in fine step scanning is selected to be small enough to guarantee that received signals of all possible time offsets will be sampled at some point in the scan. This is balanced by a general need to complete the search in a reasonably short period of time. Thus, the step size is made as large as practical consistent with sampling signals at all offsets. A Nyquist sampling argument might suggest that a step size of ½ cycle time for a sine wave at the UWB center frequency might be an upper bound on the step size. However, one can envision a system based on ½ cycle spacing to hit the zero crossings of a pulse and miss the signal altogether. Accordingly, a spacing of ¼ cycle is a reasonable practical nominal value for a step size. The step size value can be refined and optimized for a particular system using detailed analysis or experimentation as is practiced by those skilled in the art.

The fine step scanning process takes successive fine steps through the length of the search interval, dwelling on each step long enough to detect a desired signal if present. To illustrate the timing related to this method, consider an example system with a center frequency of 2 Ghz and 100 ns frames. If this system is designed to integrate 100 pulses to achieve detection, and if the pulse train repeats each 100 frames, then the system would dwell 100×100 ns=10 μs at each step. If the system takes ¼ wave steps, each step would be 125 ps and it would take 10 μs/125 ps–80,000 steps to complete a full scan of the pulse train, which is in this case the search interval. At 10 μs per step this is 0.8 seconds. Given a uniform probability of initial signal offset over the time of the pulse train, the average time to detection would be half of the full scan time, or 0.4 seconds.

Coarse Step Scanning

Coarse step scanning is a process wherein the step size is greater than the resolution required for thorough searching. Whereas a fine step search may step ¼ cycle or so, a coarse step scan typically steps several cycles or more. A search scan using coarse steps can span the length of a search interval in far less time than by using fine steps, but the coverage is sparse and potentially leaves unsampled gaps. The unsampled gaps can be filled by restarting each successive scan with an additional offset such that successive scans sample previously unsampled offset values. This process can be continued until the search interval is sampled to the necessary resolution.

Figure 11E:
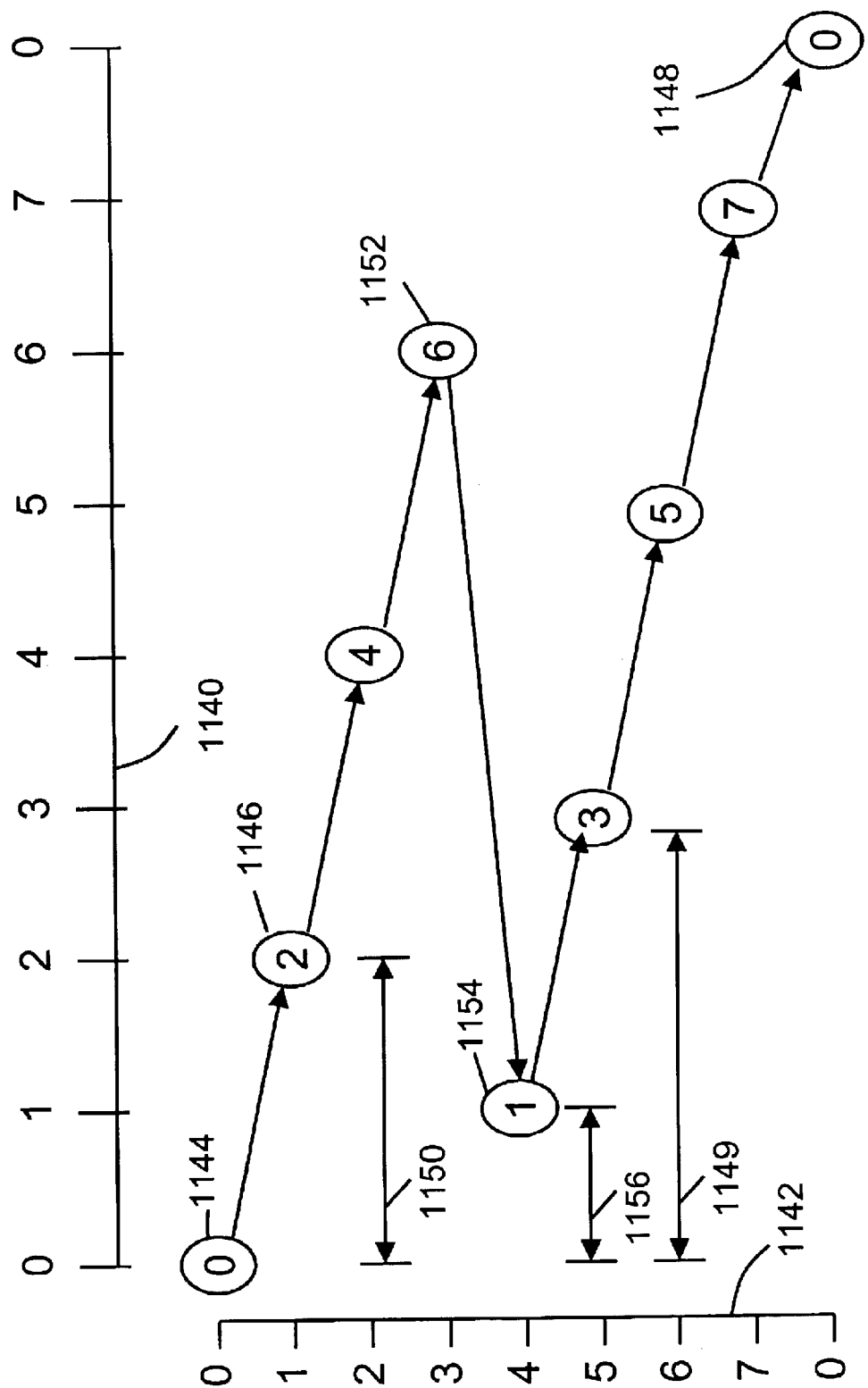
FIG. 11E is a simplified cyclic diagram showing the relative sampling positions in a coarse step scanning process.

Coarse step scanning will now be described with reference to FIG. 11E. FIG. 11E is a simplified cyclic diagram showing the relative sampling positions in a coarse step scanning process. The axes are the same as described for FIG. 11D. The coarse step scanning process begins with an initial sample 1144 and checks for match as in the fine step process, but if no match is found, a coarse step 1150 is added, which is illustrated as two resolution bins, but may be any number including a non-integer. The process continues with successive coarse steps until the span is completed 1152. At this point in the process, a new scan is started 1154 with an additional offset 1156, which allows a new position "1" to be sampled. Further samples "3","5","7" are then taken including this new offset 1156 to allow unsampled resolution positions "3","5","7" to be sampled. Further scans with different offsets may be taken as necessary to achieve the final resolution necessary or until a signal match is determined.

As shown in FIG. 11E, the coarse step is positive, increasing in time; however alternatively, the coarse step may be negative, decreasing in time.

It would seem that both fine step scanning and coarse step scanning would take the same time to scan a search interval to a given resolution. For example, using fine step scanning, where the resolution limit is the step size, a scan resolution of 1 ns over a search interval of 1000 ns requires 1000 ns for to complete the search. However, using coarse step scanning, where the search resolution is finer than the step size, a scan resolution of 1 ns over a search interval of 1000 ns using a step size of 10 ns requires 10 scans of 100 samples, where each scan might begin with 1 ns additional offset, which also requires 1000 ns to complete the complete search. Thus, it would seem that there is no benefit in acquisition time for coarse step scanning.

A benefit arises, however, where the signal may have substantial length as in a narrow band signal, medium wide band signal or an ultra wideband signal in a multipath environment.

Figure 11F:
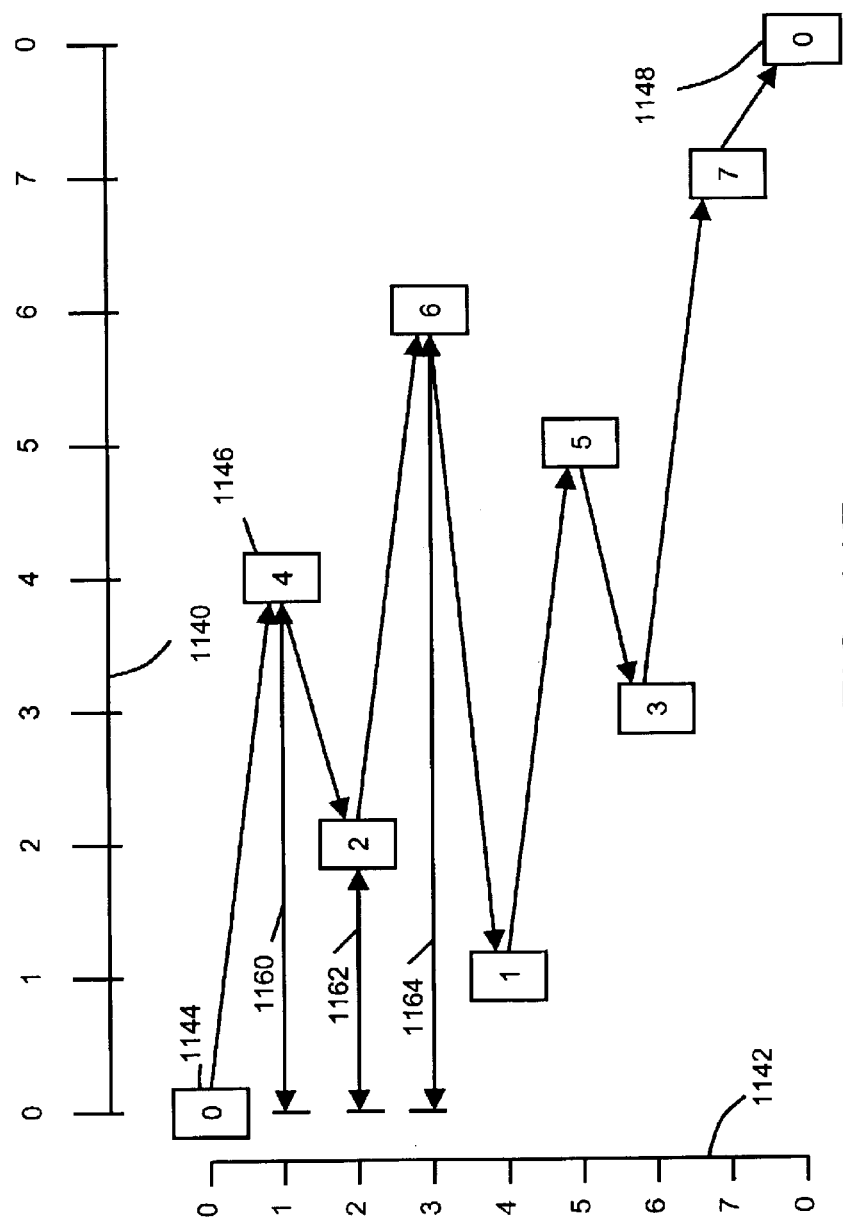
FIG. 11F illustrates a received impulse radio signal compared to a template pulse train that was shifted in accordance with a reverse binary scanning process.
Figure 11G:
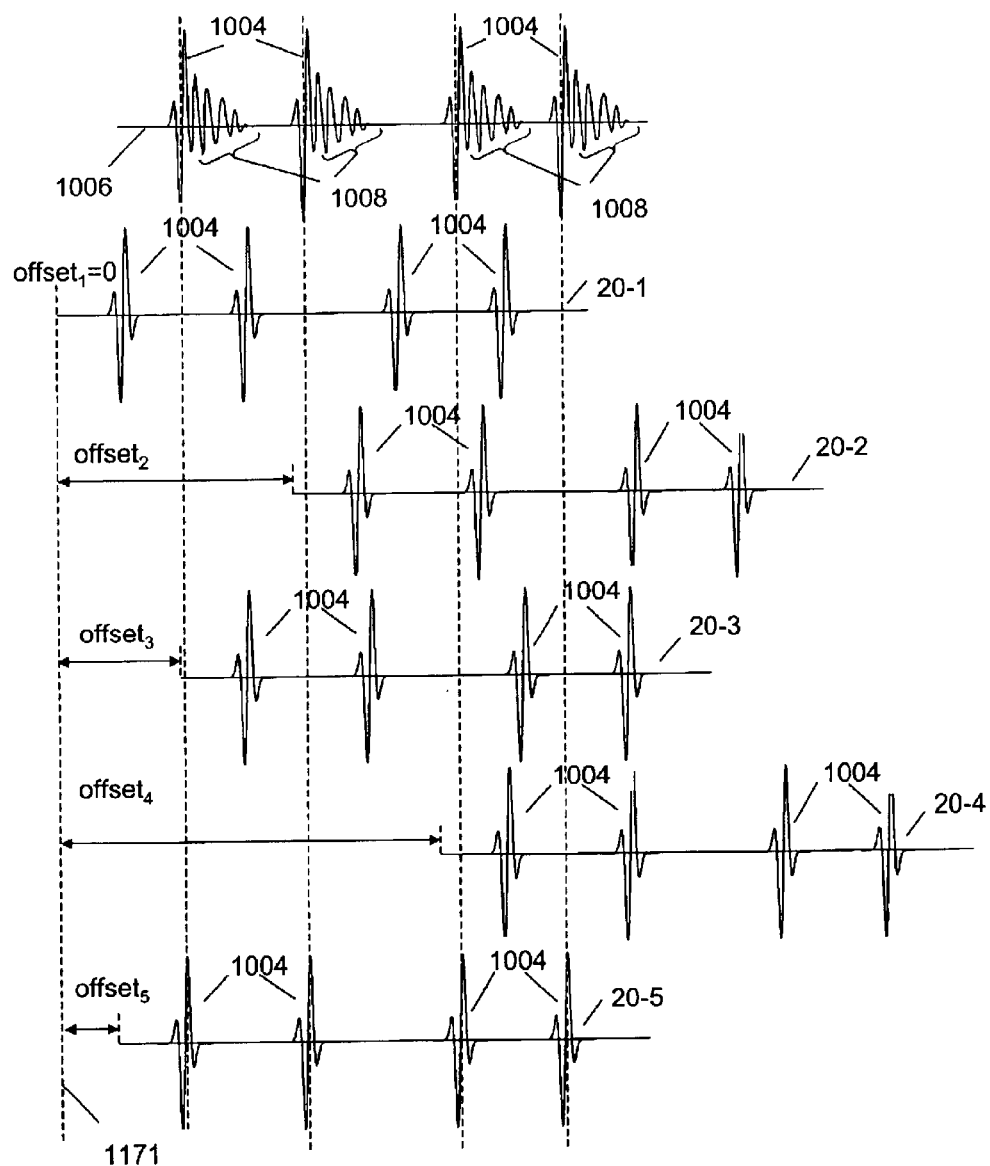
FIG. 11G illustrates in greater detail the reverse binary scanning process of FIG. 11F.
Figure 11H:
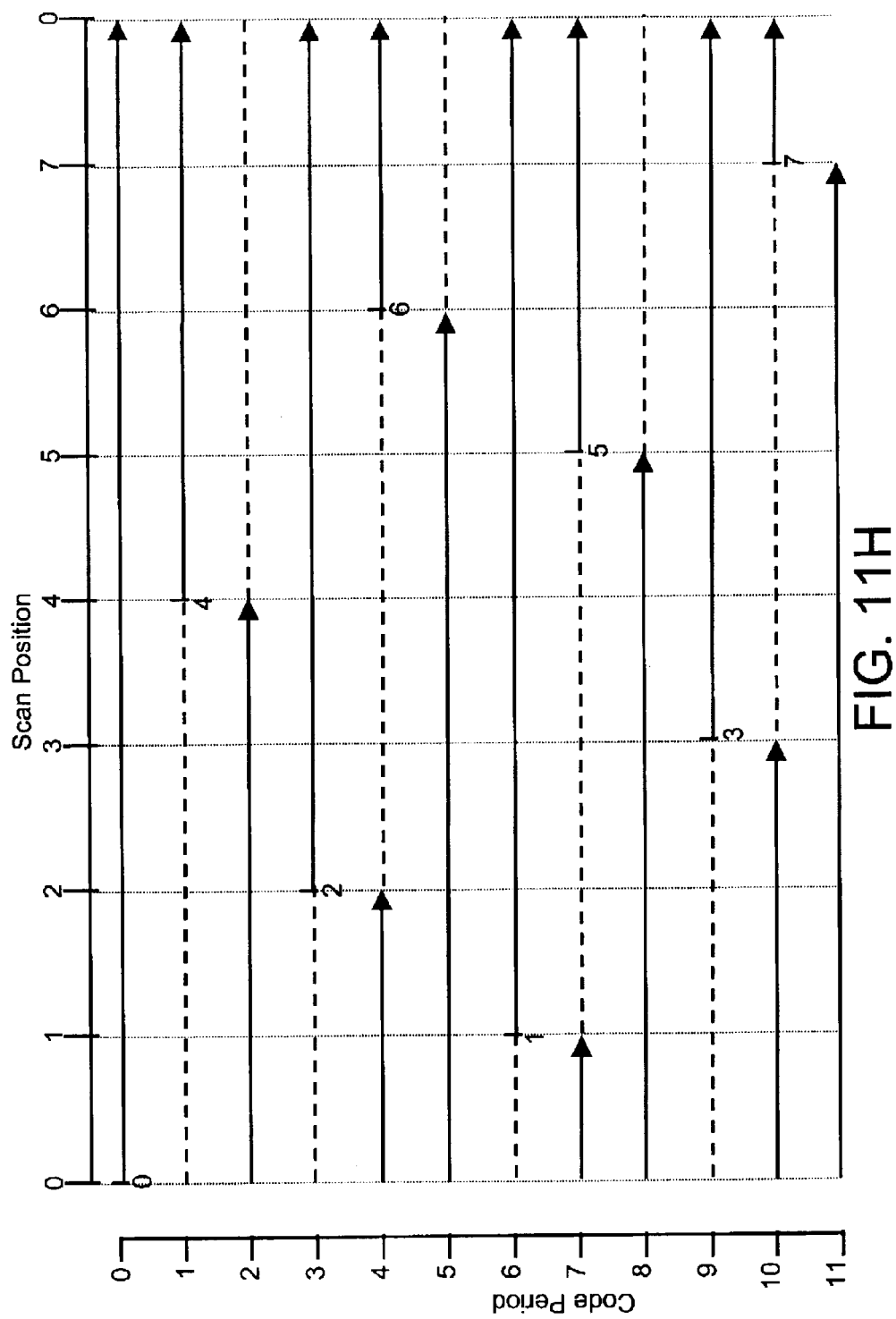
FIG. 11H illustrates delays between scans of a reverse binary scanning process in accordance with one embodiment of the invention.
Figure 11I:
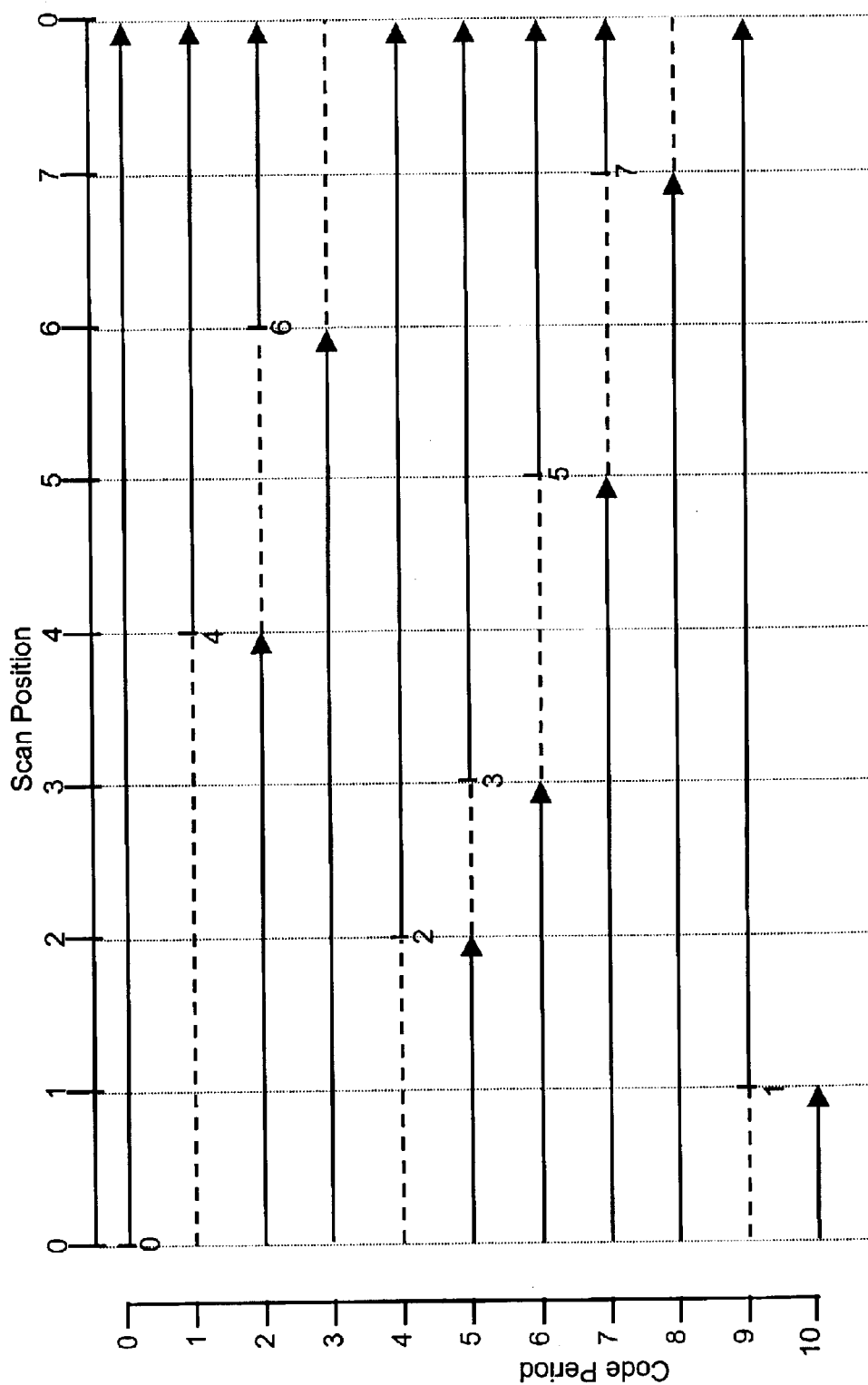
FIG. 11I illustrates an optimized reverse binary scanning order in accordance with one embodiment of the invention.
Figure 11J:
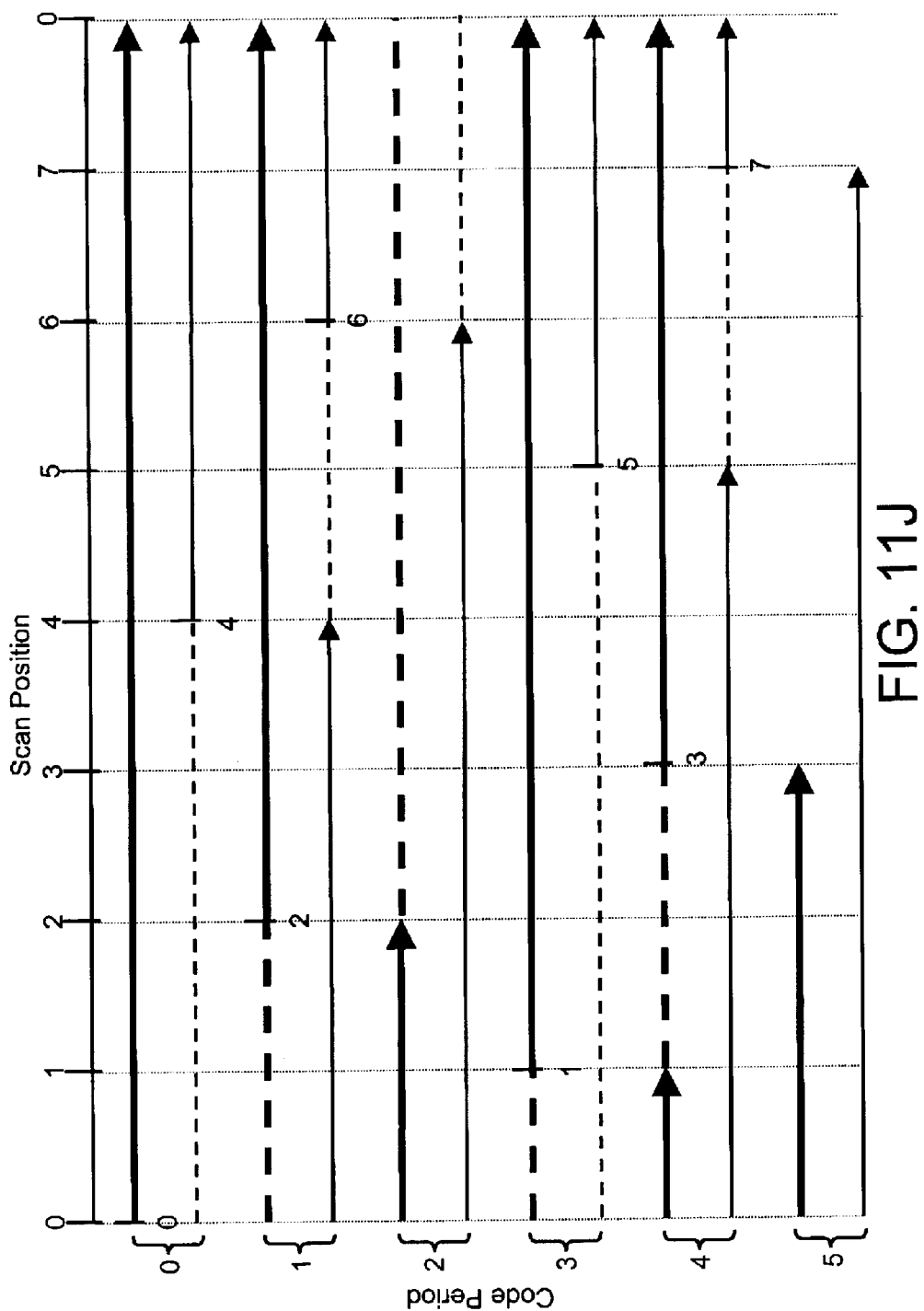
FIG. 11J illustrates a timing diagram for two receiving blocks collaboratively performing a reverse binary search process.
Figure 11K:
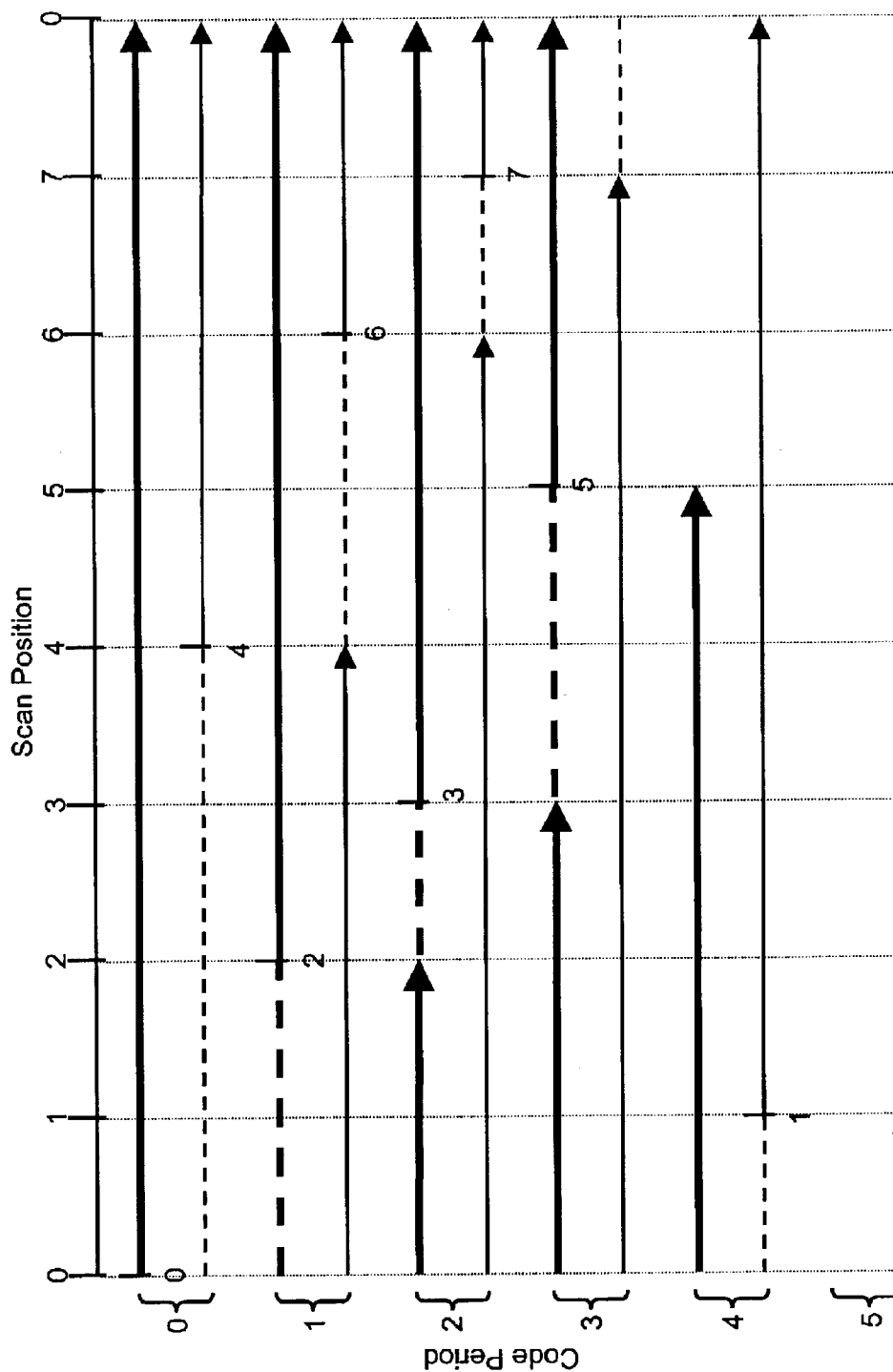
FIG. 11K illustrates a timing diagram for two receiving blocks collaborative performing a reverse binary search process using an optimized reverse binary scanning order in accordance with one embodiment of the invention.
Figure 11L:
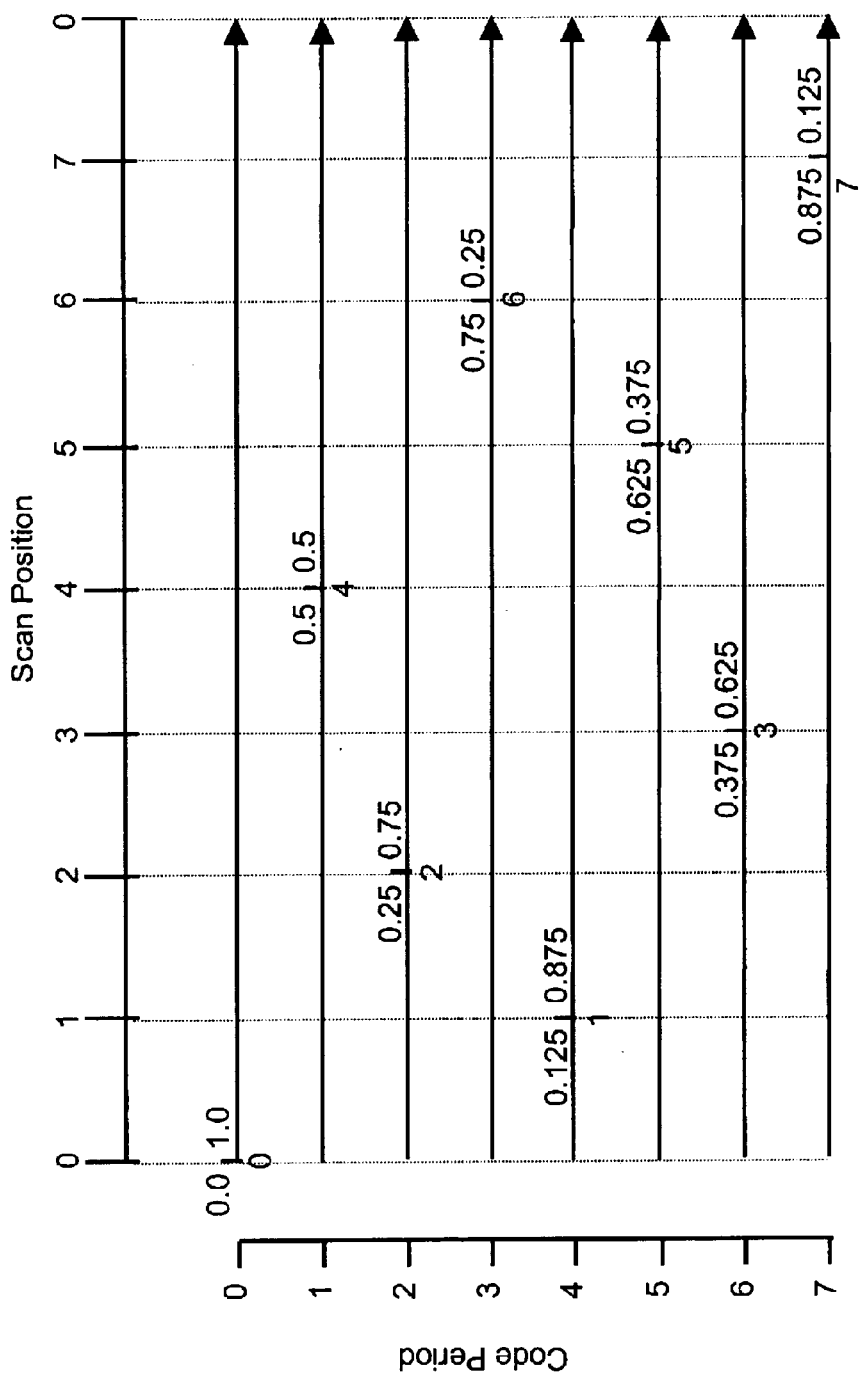
FIG. 11L illustrates a timing diagram for a reverse binary search process involving scanning across received pulse train boundaries.
Figure 11M:
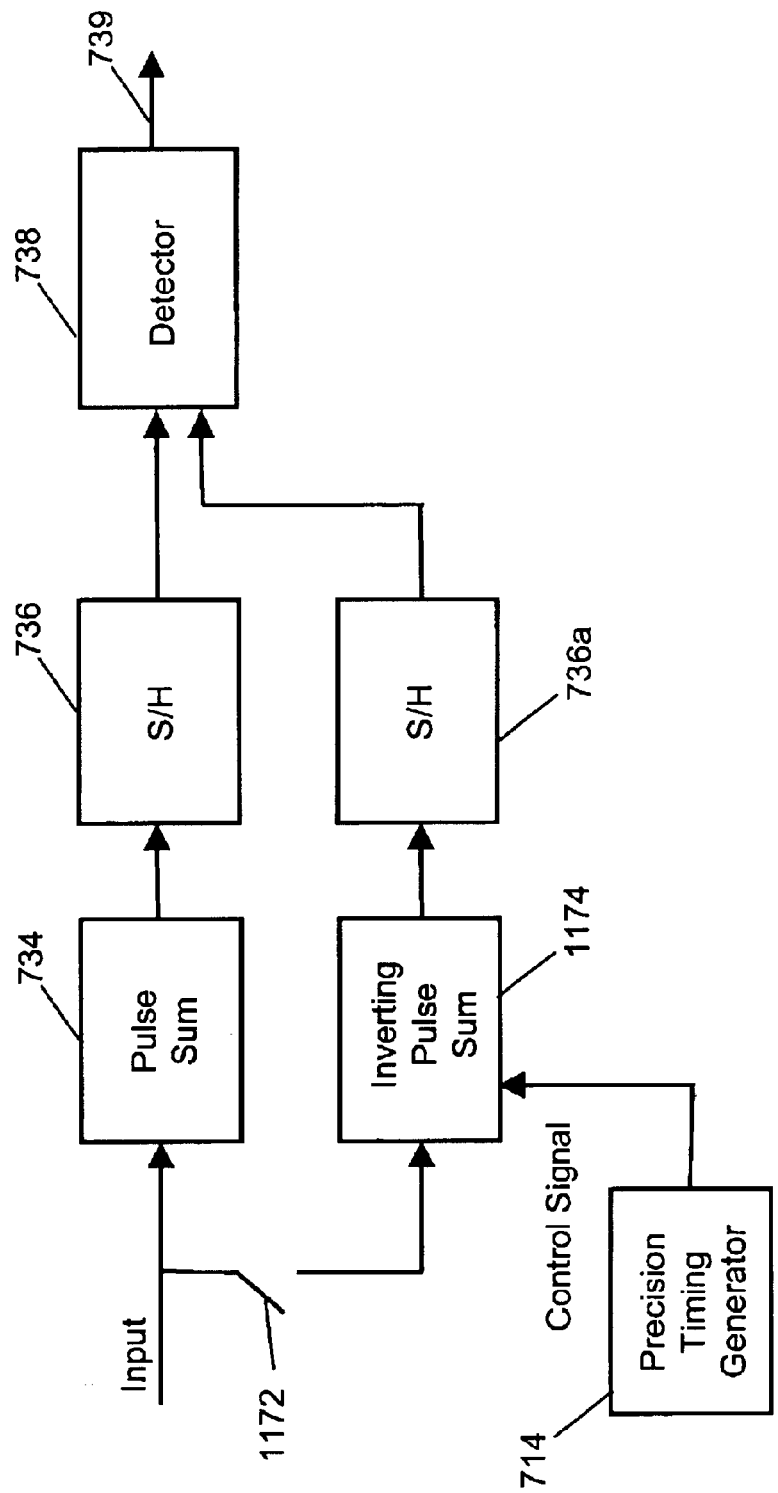
FIG. 11M illustrates a block diagram of a modification to FIG. 7 in accordance with one embodiment of the invention.
Figure 11N:
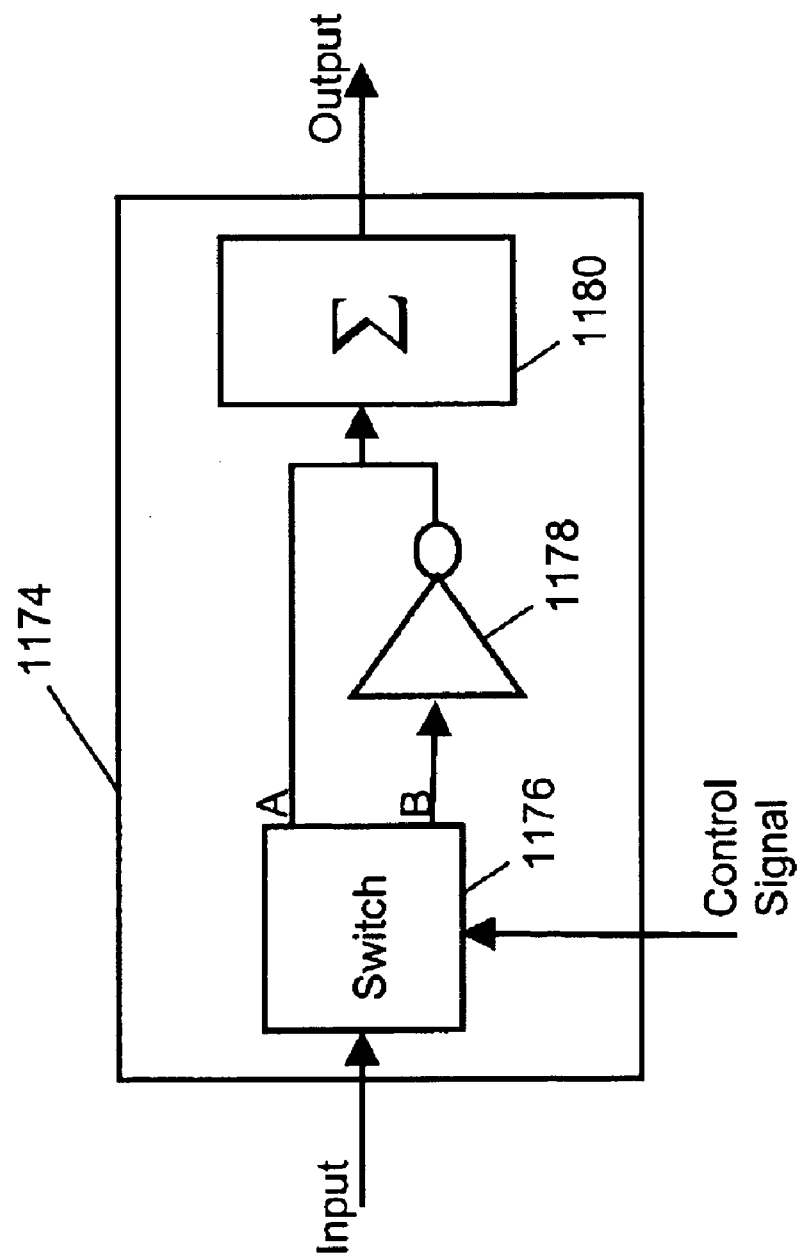
FIG. 11N illustrates a switch-based inverting pulse summation apparatus in accordance with one embodiment of the invention.
Figure 110:
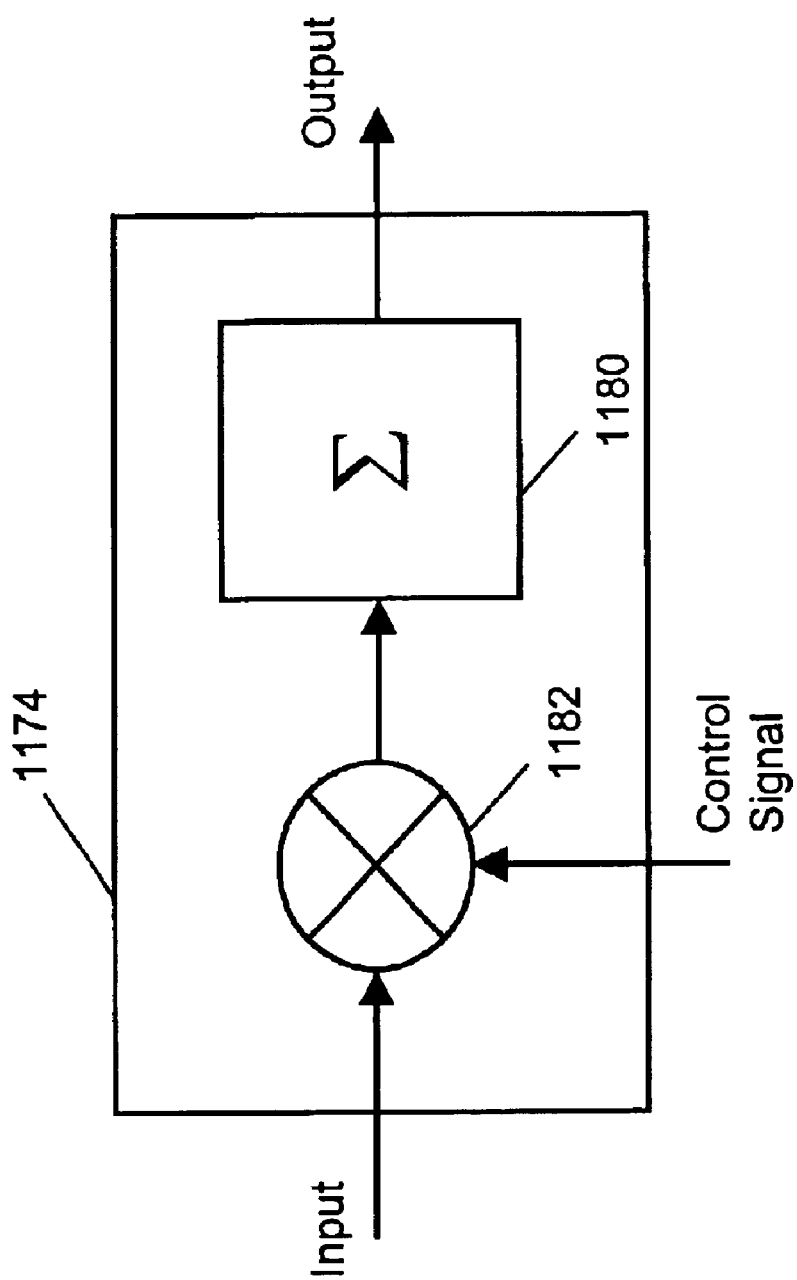
Figure 11P:
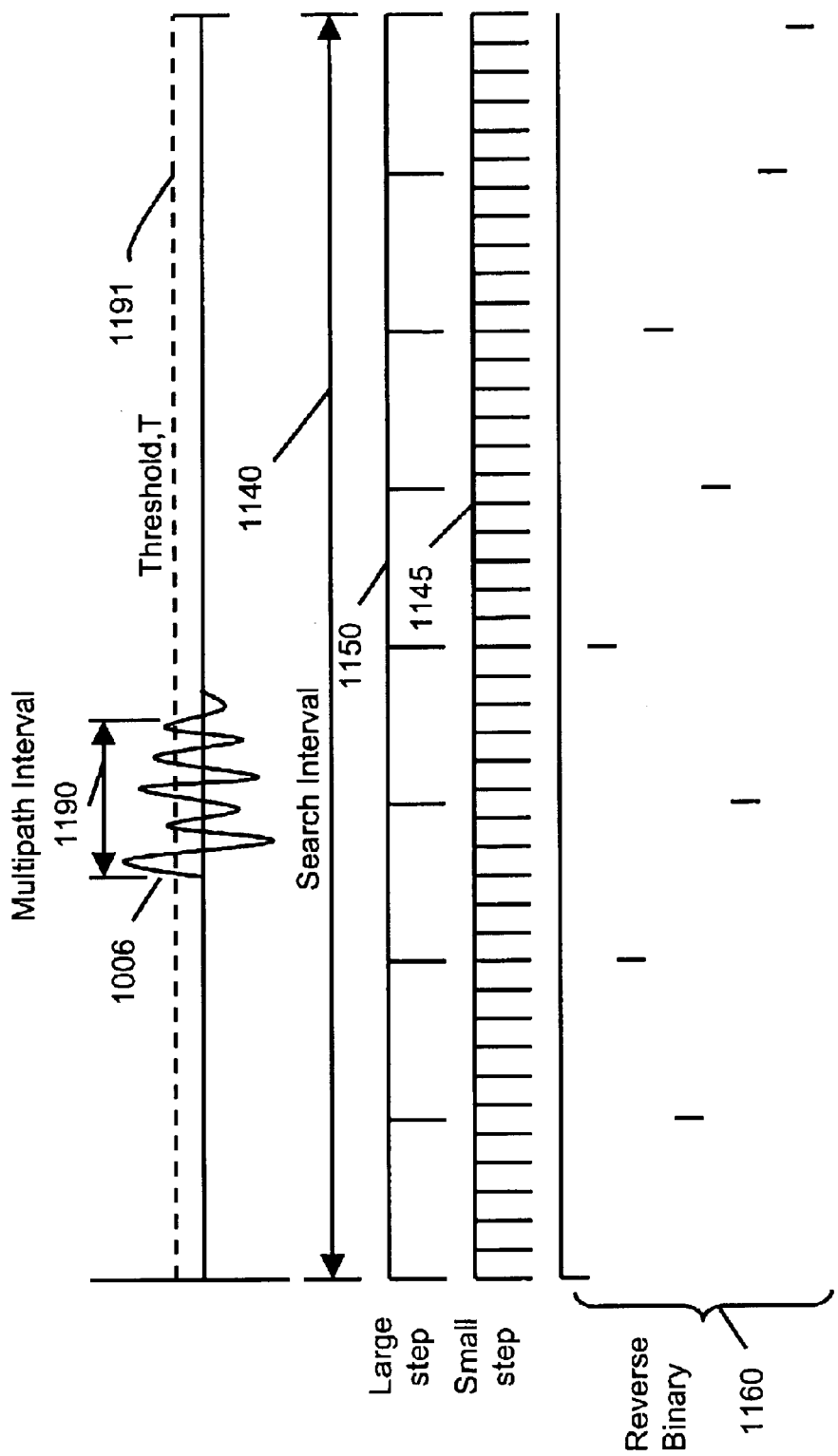
FIG. 11P illustrates step size selection in a multipath environment.

Further insight into this benefit may be obtained with reference to FIG. 11P. FIG. 11P illustrates step size selection in a multipath environment. FIG. 11P depicts a signal 1006 with a length 1190 based on a threshold 1191 and contained within a search interval 1140. This benefit arises because the coarse step size 1150 need only be equal to or less than the signal length 1190 in order to be assured of sampling the desired signal 1006, if the desired signal 1006 is present. The signal length 1190 is the span of a signal where its strength is sufficient to meet a performance threshold 1191 for detection. In the case of an ultra wideband signal in multipath, this length may encompass a certain amount of the multipath reflection signals 1008 even though these reflections may not cover the entire signal length span 1190.

Accordingly one embodiment of the invention characterizes the environment and establishes a coarse step size 1150 in accordance with the measured environment. The characterization may be accomplished by a receiver or may be accomplished during the design of a receiver and then established in the receiver as a predetermined value. For example, a scanning receiver could be used to characterize the environment such as is described in application Ser. No. 09/537,264 previously incorporated by reference. Alternatively, the coarse step size 1150 value may be based on an experimental performance optimization process. The coarse step size value 1150 may also be a factor based on average channel delay spread or RMS delay spread, for example the factor may be one.

Further details on coarse step scanning in multipath are supplied herein along with a discussion of reverse binary scanning.

Frame Step Scanning

As an option, the coarse step may be equal to a frame size. This can often result in hardware simplification since hardware already exists for generation of frame intervals for pulse coding. If the step were always exactly equal to a frame, the system would not scan between pulses. This can be overcome by skewing the receiver clock or by adding an additional offset at the beginning or end of a code length.

Random Offset Scanning

As an additional example of a shifting strategy, the offset can be determined through a random offset generating process. For example, a random or pseudorandom number generator can be used to select an offset to shift the template pulse train, where the selected offset is not an offset previously selected by the random number generator. As an option, a random offset can be generated using oscillator drift. With this option, the inherent drift of the oscillator can be used to adjust the offset for shifting the template pulse train.

Pseudo Noise Offset Scanning

As a special case of random offset scanning, a pseudorandom number generator, in particular a linear feedback shift register generating a maximal length sequence, or equivalent, will generate all of the offsets within its resolution before it repeats (except zero, which can be included). For example a five bit length LFSR will generate all of the integers from 1 to $2^5-1=31$ and will then repeat the sequence. The absence of a zero state will probably not be noticed in the operation of a typical system, but the zero state can be added by forcing an extra cycle with dedicated logic.

Reverse Binary Scanning

In another example of a shifting strategy, the offset can be determined via reverse binary scanning, which can be considered a type of coarse step scanning process. In brief, a reverse binary scanning process uses a scan offset value that is proportional to a reverse binary counter. Thus, each scan includes an offset determined by:

$$\text{Offset}_i = I_s * M_i$$

where $M$ is a multiplier multiplying the scanned interval $I_s$. The multiplier $M_i$ is given by the following sequence: 0, ½, ¼, ¾, ⅛, ⅝, ⅜, ⅞, 1/16, 9/16, 5/16, 13/16, 3/16, 11/16, 7/16, 15/16, 1/32, 17/32, 9/32, 25/32, 5/32, 21/32, 13/32, 29/32, 3/32, 19/32, 11/32, 27/32, 7/32, 23/32, 15/32, 31/32, 1/64, etc., where $M_0=0$ is the initial case. The scanning may continue until $I_s * M_i$ is less than ¼ wavelength of a pulse after the initial case. As an option, the initial case can be $M_0=1$.

This type of scanning is referred to as reverse binary scanning because a binary sequence of numbers is reversed from least significant bit to most significant bit to provide the fraction of the multiplier M. For example, for a denominator of 8 for M, three bits are needed, and the multiplier M is determined as follows in Table 1:

TABLE 1

| $b_1b_2b_3$ | | $b_3b_2b_1$ | | M | |
|---|---|---|---|---|---|
| 000 | Reverse→ | 000 | Obtain | 0/8 | = 0 |
| 001 | Bits | 100 | numerator→ | 4/8 | = 1/2 |
| 010 | | 010 | for M from | 2/8 | = 1/4 |
| 011 | | 110 | binary | 6/8 | = 3/4 |
| 100 | | 001 | number | 1/8 | |
| 101 | | 101 | | 5/8 | |
| 110 | | 011 | | 3/8 | |
| 111 | | 111 | | 7/8 | |

The same procedure may be used to extend the resolution of the sequence by adding more bits to obtain more fractions (i.e., multipliers M) for the offset. Once adequate resolution is achieved to assure finding the required signal, further resolution has little effect on acquisition speed performance. Thus the level of precision, if sufficient, is not a critical design parameter.

Reverse Binary scanning will now be described with reference to FIG. 11F. FIG. 11F is a simplified cyclic diagram showing the relative sampling positions in a reverse binary scanning process. The axes are the same as described for FIG. 11D. The reverse binary scanning process begins with an initial sample 1144 and checks for match as in the fine step process, but if no match is found, an offset equal to half of the search interval 1160 is added. If no match is found, the next offset 1162 is one quarter of the search interval 1160. The third offset is three quarters of the search interval. This process continues sampling the remaining positions "1","5","3","7" and then returns to "0" to begin the process again. Upon completion of the reverse binary search pattern example in FIG. 11F, the search interval is sampled to the same resolution as for the fine step and coarse step examples in FIGS. 11D and 11E respectively.

FIG. 11G illustrates the relative timing of a received impulse radio signal 1006 compared to a template pulse train that was shifted in accordance with a reverse binary scanning process. Basically, the same template pulse train 20 is shifted to different locations in time and compared to the received impulse radio signal 1006 until a match is obtained between one of the shifted template pulse trains and the received impulse radio signal. The different locations in time where the template pulse train 20 is placed are determined by the offsets generated by the reverse binary scanning process (see Table 1). For instance, the first offset is 0, the second offset is ½ of the length of the template pulse train 20 from the first offset, and the third offset is ¼ of the length of the template pulse train 20 from the first offset and so on. In this case, the scanned interval is the full length of the template pulse train.

As shown in FIG. 11G, five template pulse trains 20-1, 20-2, 20-3, 20-4 and 20-5 are sequentially compared to the received impulse radio signal 1006 (see block 3 of FIG. 9). Each template pulse train 20-1, 20-2, 20-3, 20-4 and 20-5 has a pattern of pulses that are similar in relative timing to the pattern of pulses (direct path parts 1104 and, if any, multipath reflection parts 1108) within the received impulse radio signal 1006. First, the comparison between template pulse train 20-1 shifted by offset, and the received impulse radio signal 1006 fails to indicate a match. Next, the comparison between template pulse train 20-2 shifted by offset$_2$ and the received impulse radio signal 1006 fails to indicate a match. Likewise, the comparison between template pulse train 20-3 shifted by offset$_3$ and received impulse radio signal 1006 fails to indicate a match. Also, the comparison between template pulse train 20-4 shifted by offset$_4$ and the received impulse radio signal 1006 fails to indicate a match. There are no matches between template pulse trains 20-1, 20-2, 20-3 and 20-4 and the received impulse radio signal 1006, because the pulses in the template pulse trains 20-1, 20-2, 20-3 and 20-4 are not aligned in time with the pulses in the received impulse radio signal 1006 (see blocks 3–6 of FIG. 9). However, the comparison between template pulse train 20-5 shifted by offset$_5$ and the received impulse radio signal 1006 indicates a match, because the pulses in the template pulse trains 20-5 are aligned in time with the pulses in the received impulse radio signal 1006. Once there is a match, the receiver locks onto any part (most likely one of the multipath reflection parts 1108) of the received impulse radio signal 1006 that was aligned with the template pulse train 20-5.

FIG. 11G illustrates in greater detail the reverse binary scanning process of FIG. 11F. In FIG. 11G, the received impulse signal 1006 is shown at an arbitrary time offset relative to the receiver template. Each receiver template pulse train 20-1 through 20-5 is timed according to a time offset (offset$_1$ through offset$_5$) relative to a receiver cyclic reference 1171 that repeats at a predetermined interval designed to be synchronous with the received signal 1006. As shown in FIG. 11G, two code cycles are allocated for each template code pulse train 20-1 through 20-5 to avoid overlap of template pulse trains.

Since, the receiver does not know when a particular transmitter is going to transmit an impulse radio signal, the receiver continually repeats the scanning process in an attempt to lock onto any part of the received impulse radio signal 1006. As illustrated, the first template pulse train scan 20-1 does not line up with the received pulse train 1006. The following pulse train 20-2 is delayed from the reference by offset$_2$ and it also does not line up with the received signal 1006. This process continues with no match until offset$_5$ is used, at which point, all four pulses line up enabling the signal to be detected.

Of course, if the template pulse train 20-1 through 20-5 has a pattern of pulses that are not similar to the pattern of pulses within a received impulse radio signal then there will not be a match. In addition, if interference degrades the received impulse radio signal 1006 then there may not be a match during one or more scanning processes.

Reverse Binary Scanning Example

Referring again to FIG. 11C and the associated equation:

$$S(t) = \sum_{k=0}^{n-1} a_k W(t - kT_F - t_k - t_b).$$

A reverse binary scanning process uses a sequence of these pulse trains which may be represented by the following:

$$B(t) = \sum_{j=0}^{m-1} S_j(t - jnT_f - T_{search}M_j)$$

$$B(t) = \sum_{j=0}^{m-1} \sum_{k=0}^{n-1} a_k W(t - kT_F - t_k - jnT_f - T_{search}M_j)$$

where B(t) is a pulse train according to a reverse binary search sequence, $T_{search}$ is the interval to be searched, $M_j$ is the offset fraction associated with each search scan interval ($S_j(t)$ subsequence), $nT_f$ is the length of a pulse code subsequence $S_j(t)$. Note that the pulse train beginning time $t_b$ is now defined by the scan sequence, $jnT_f$, and reverse binary offset, $T_{search}M_j$.

The following is an example of how the offsets of the reverse binary scanning process of Table 2 can be used to determine the position of each impulse in a template pulse train. For this example, assume the template pulse train has the following characteristics:

Frame time: $T_F$=100 ns

Code Length: n=120=number of pulses per bit

Code interval, $T_c$; Search interval, $T_{search}$: $T_c$=$T_{search}$= 120*100 ns=12 $\mu$s Scanning resolution, resolution of $M_j$: 14 bits Thus, the offset value $M_j$ progresses as follows:

| j | M(j) (binary) | M(j) (decimal) |
|---|---|---|
| 00 ... 0000 | 0.0000 ... 00 | 0 |
| 00 ... 0001 | 0.1000 ... 00 | 0.5 |
| 00 ... 0010 | 0.0100 ... 00 | 0.25 |
| 00 ... 0011 | 0.1100 ... 00 | 0.75 |
| 00 ... 0100 | 0.0010 ... 00 | 0.125 |
| 00 ... 0101 | 0.1010 ... 00 | 0.625 |
| . | . | . |
| . | . | . |
| . | . | . |

Also assume a time position code sequence, $t_k$($t_0$=23 ns, $t_1$=41 ns, $t_2$=18 ns, $t_3$=72 ns, $t_4$=95 ns ... $t_{119}$=49 ns). In addition, $t_b$=$T_{search}$ M(j) and for this example $T_{search}$=$T_c$ where $T_{search}$ is the total search space (time interval to be searched) (typically equal to the code space, or code length in time units).

Therefore, a pulse occurs at t=$kT_F$+$t_k$+$t_b$. The sequence for J=0 and k=0 through 119 is:

$$T = kT_f + t_k + T_{search}M_j$$

$t = 0 + 23\,\text{ns} + 0 = 23\,\text{ns (location of first template pulse)}$ $t = 100\,\text{ns} + 41\,\text{ns} + 0 = 141\,\text{ns (location of second template pulse)}$ $t = 200\,\text{ns} + 18\,\text{ns} + 0 = 218\,\text{ns (location of third template pulse)}$ $t = 300\,\text{ns} + 72\,\text{ns} + 0 = 372\,\text{ns (location of fourth template pulse)}$ $t = 400\,\text{ns} + 95\,\text{ns} + 0 = 495\,\text{ns (location of fifth template pulse)}$ $\vdots$ $k = 119$ then $t = 11900\,\text{ns} + 49\,\text{ns} + 0 = 1194\,\text{ns (location of the last template pulse)}$ And, at $J = 1$ and $k = 0$ through 119 and $t_b = 12\,\mu s \times 0.5 = 6000\,\text{ns}$ $t = 0 + 23\,\text{ns} + 6000\,\text{ns} = 6023\,\text{ns (location of first template pulse)}$ $t = 100\,\text{ns} + 41\,\text{ns} + 6000\,ns = 6141\,\text{ns (location of second template pulse)}$ $t = 200\,\text{ns} + 18\,\text{ns} + 600\,\text{ns} = 6218\,\text{ns (location of third template pulse)}$ $t = 300\,\text{ns} + 72\,\text{ns} + 6000\,\text{ns} = 6372\,\text{ns (location of fourth template pulse)}$ $t = 400\,\text{ns} + 95\,\text{ns} + 6000\,\text{ns} = 6495\,\text{ns (location of fifith template pulse)}$ $k = 119$ then $t = 11900 \text{ ns} + 49 \text{ ns} + 6000 \text{ ns} = 17949 \text{ ns}$ (location of the last template pulse).

Reverse Ternary and Reverse N-ary Scanning

Moreover, the reverse binary scanning can be extended to reverse n-ary scanning, where n is any desired base. For instance, one type of scanning is known as reverse ternary scanning because a sequence of base 3 numbers is reversed from least significant bit to most significant bit to provide the fraction of a multiplier M. Like the reverse binary scanning process, the multiplier M can be used to determine the offset. For example, for a denominator of 27 for M, two digits are needed, and the multiplier M is determined as follows in Table 2:

TABLE 2

| $b_1 b_2$ | | $b_2 b_1$ | | M |
|---|---|---|---|---|
| 00 | →Reverse→ | 00 | Obtain | 0/9 |
| 01 | digits | 10 | →numerator→ | 3/9 |
| 02 | | 20 | for M from | 6/9 |
| 10 | | 01 | ternary | 1/9 |
| 11 | | 11 | number | 4/9 |
| 12 | | 21 | | 7/9 |
| 20 | | 02 | | 2/9 |
| 21 | | 12 | | 5/9 |
| 22 | | 22 | | 8/9 |

The same procedure continues by adding more digits to obtain more fractions (i.e., multipliers M) for the offset.

Mixed Binary Scanning

In yet another example of a coarse shifting strategy, the offset can be determined via a mixed binary scanning process. This type of scanning is known as mixed binary scanning because a binary sequence of numbers is ordered according to a reverse binary scanning process and another binary sequence of numbers is ordered according to a forward binary scanning process. Like the reverse binary scanning process, a multiplier M can be used to determine the offset (e.g., offset=IO*M). For example, for a denominator of 32 for M, five bits are needed, and the multiplier $M = \frac{1}{2}b_1 + \frac{1}{4}b_2 + \frac{1}{8}b_5 + \frac{1}{16}b_4 + \frac{1}{32}b_3$ as follows in Table 3:

TABLE 3

| $b_1 b_2 b_3 b_4 b_5$ | | $b_1 b_2 b_5 b_4 b_3$ | | M | j |
|---|---|---|---|---|---|
| 00000 | →Reverse→ | 00000 | Obtain | 0 | 0 |
| 01000 | bits | 01000 | M→ | 1/4 | 1 |
| 10000 | ($b_3 b_4 b_5$) | 10000 | | 1/2 | 2 |
| 11000 | | 11000 | | 3/4 | 3 |
| 00001 | | 00100 | | 1/8 | 4 |
| 01001 | | 01100 | | 3/8 | 5 |
| 10001 | | 10100 | | 5/8 | 6 |
| 11001 | | 11100 | | 7/8 | 7 |
| 00010 | | 00010 | | 1/16 | 8 |
| 01010 | | 01010 | | 5/16 | 9 |
| 10010 | | 10010 | | 9/16 | . |
| 11010 | | 11010 | | 13/16 | . |
| . | | . | | . | . |
| . | | . | | . | . |
| . | | . | | . | . |

The same procedure can be changed by simply adding more bits to the forward binary scanning process (shown in Table 3 as $b_1 b_2$) and/or by adding more bits to the reverse binary scanning process (shown in Table 3 as $b_3 b_4 b_5$) to obtain more fractions (i.e., multipliers M) for the offset. Also, the order of the forward component and the reverse component can be reversed e.g., $b_3 b_2 b_1 b_4 b_5$ or $b_5 b_4 b_3 b_1 b_2$. Also, note that each sequence may be truncated i.e., it need not extend to its full count.

Modified Reverse Binary and Mixed Binary Patterns

Reverse binary and mixed binary search patterns may be modified by inverting selected bits, i.e., exclusive or-ing the output by a mask e.g., if the second bit of a three bit reverse binary counter is inverted the count changes from 0,4,2,6, 1,5,3,7 to 2,6,0,4,3,7,1,5, which also results in a widely scattered pattern.

In another variation, the same difference sequence may be preserved by selecting alternates. Note that in the sequence 0,4,2,6,1,5,3,7, the differences between successive numbers forms a first difference sequence: 4,2,4,5,4,2,4,1, the last digit representing the return from 7 in the first sequence to zero in the following sequence (which is 8 in the first sequence). An alternate sequence formed as follows: 0,4,6, 2,7,3,5,1 results in a second difference sequence: 4,2,4,5,4, 2,4,1. Note that the second difference sequence equals the first difference sequence. A further alternate sequence: 0,4, 6,2,1,5,7,3 has a third difference sequence: 4,2,4,1,4,2,4,5.

Note also that further sequences may be derived from this process by certain operations. For example, a ones complement, or twos complement, or reversing in order of all or part of the sequence, or adding a constant all yield equivalent sequences. For example, beginning with the sequence 0,4,2,6,1,5,3,7, the ones complement is 7,3,5,1,6, 2,4,0, which coincidentally, is also a reversing in order of the same sequence. The twos complement is 0,4,6,2,7,3,5,1, which, in this case results in a reversal in order of the 6 and 2 and a reversal in order of the last four digits. Adding 1 yields 1,5,3,7,2,6,4,8(0). Note that the appropriate math is modulo 8 for this example so that the "8" result is equal to "0".

A feature of these sequences is that large steps resulting from the most significant bits predominate the differences and smaller steps occur less frequently. In the reverse binary case, large steps resulting in half of the scan interval occur half of the time and smaller steps associated with each smaller significant bit occur less and less frequently. This has a particular advantage in the presence of multipath as will be described herein.

Mixed scanning can also be extended to systems using multiple scanning processes where reverse binary scanning is one component of the scanning process. In one example, an analog slow scan can be combined with a reverse binary large-scale scan. In another example, a reverse binary scan may scan a single frame and frame-to-frame scanning can be done sequentially.

In one such alternative, the reverse binary process establishes an offset, and each frame offset is successively added to it to produce a sequence of offsets for search. For example, consider a system with a frame size of 100 ns and a code length and bit size of 4 frames. The reverse binary process may be used to span the frame size of 100 ns and the frame counter may be used to sequence through the frames. Thus, the combined sequence would be: 0, 100, 200, 300, 50, 150, 250, 350, 25, 125, 225, 325, 75, 175, 275, 375, 12.5, 112.5, 212.5, 312.5, and so on to the desired limit of resolution for the reverse binary part of the process.

Moreover, in general, the mixed binary scanning can be extended to mixed n-ary scanning, where n is any desired base.

Optimization of a Reverse N-Ary Scanning Order

As previously described relative to FIG. 9, the correlation result for each pulse in the template pulse train may be integrated to obtain a single summation result that is compared to a threshold. This approach only requires a single cross correlator 710 and a single pulse summation stage 734 as shown in FIG. 7. Under this arrangement, the process of shifting from one scan position to another scan position corresponds to a delay in time between scans during which cross-correlation does not occur. In order to speed acquisition, the order of a reverse N-ary scanning sequence may be optimized to minimize the total amount of delay time required during the scanning process. The optimization process is based on the recognition that scan positions at a given level of scan resolution can be reordered while retaining the benefits of the reverse N-ary scanning approach and the recognition that shifting to a backward scan position can require a longer delay than shifting to a forward scan position and thus should be avoided where possible.

The difference between moving to a forward scan position versus moving to a backward scan position can be seen in FIG. 11H. Referring to FIG. 11H, the vertical axis represents successive code periods, where a code period is defined as the amount of time required to receive a pulse train. The top axis represents a cyclic time axis spanning a search interval with eight scan positions labeled "0"–"7" and returning to "0", where due to the repeating nature of the pulse trains, the final "0" is the same as the "0" of the next code period.

In FIG. 11H the total time (in code periods) required to perform a complete reverse binary scan using a scan sequence of 0,4,2,6,1,5,3,7 is depicted. In the figure, the first scan begins at scan position 0 of the first code period (code period 0) and ends at scan position 0 of the second code period (code period 1), which is indicated by the solid line with an arrow spanning the complete time axis. The shifting forward from scan position 0 to scan position 4 requires a delay of half a code period, which is indicated by a dashed line. Thus, before the second scan begins, a code period and a half of time have elapsed. The second scan begins at scan position 4 of the second code period and ends at scan position 4 of the third code period (code period 2). The shifting backward from scan position 4 to scan position 2 requires a delay of three quarters of a code period, again indicated by a dashed line, which corresponds to the last half of the third code period and the first quarter of the fourth code period (code period 3). Thus, before the third scan begins, four and a quarter code periods of time have elapsed. The scanning process continues requiring a total of 11.875 code periods to complete.

By reordering the scan sequence, the requirement for backward shifting between scans can be reduced thereby reducing the time required to complete the scanning process. In one embodiment of the invention, the sequence of reverse N-ary scan positions is determined by setting each scan position of a given scan resolution to an available scan position that is forward of the previous scan position. In a preferred embodiment, the sequence of reverse N-ary scan positions is determined by setting each scan position of a given scan resolution to the closest available scan position that is forward of the previous scan position. With either embodiment, if a forward scan position is not available, the available backward scan position having the lowest index is selected.

For these optimization approaches, the reverse N-ary sequence is ordered per group of scan positions making up a given scanning resolution level, where each such group is defined as those scan positions that define a level of scan resolution when combined with all scan positions defining higher resolution levels. For example, given the reverse binary sequence 0,4,2,6,1,5,3,7, scan positions 0 and 4 correspond to the first group of scan positions, which define the first scanning resolution level having a resolution of a half code period. Scan positions 2 and 6 correspond to the second group of scan positions that, when combined to scan positions 0 and 4, define the second scanning resolution level having a resolution of a quarter code period. Scan positions 1, 5, 3, and 7 correspond to the third group of scan positions that, when combined with scan positions 0, 4, 2 and 6, define the third scanning resolution level having a resolution of an eighth of a code period. If finer scanning resolution is required to achieve acquisition, the next group of scan positions would be made up of the scan positions 0.5, 4.5, 2.5, 6.5, 1.5, 5.5, 3.5, and 7.5 that, when combined with the previous scan positions, define the fourth resolution level having a resolution of one sixteenth of a code period, and so forth and so on for whatever levels of scanning resolution are required to achieve acquisition.

The optimized reverse binary scan position ordering process can be visualized in relation to FIG. 11I, which is exactly like FIG. 11H except with different ordering of the scan positions. Continuing with the example, ordering is first determined for the first scan resolution level consisting of scan positions 0 and 4. The scan order would typically begin with scan position 0 in which case the next scan position would be scan position 4, which is the only available scan position at the first scan resolution level. Although, scan position 4 could be selected as first scan position if an initial one half code period delay were desired, for this example, it is assumed that such a delay is not desired. Thus, the order of the scanning positions making up the first scanning level is determined to be 0,4.

The ordering for scan positions 2 and 6 corresponding to the second resolution level would then be determined. The only available forward scan position from scan position 4 is scan position 6. Thus, scan position 6 is determined to be the next scan position. Afterwards, no forward scan positions of the second resolution level are available from scan position 6, in which case the next scan position is determined to be scan position 2. Thus, the order of the sequence including the scan positions of the first and second scanning resolution levels would be 0,4,6,2.

Next, the ordering for scan positions 1, 5, 3, and 7 corresponding to the third scanning resolution level would be determined. From scan position 2, three forward positions are possible 3, 5, and 7. Under one embodiment, any of the three forward positions could be selected and have a lesser delay than scan position 1, which would require a backward shift. Under a preferred embodiment, scan position 3, which is the closest of the available forward scan positions, is selected. Afterwards, the closest of the available forward scan positions is scan position 5, so it is selected as the next scan position. Then scan position 7 is the only remaining forward scan position, so it is selected, leaving no available forward scan positions. Because no forward scan positions remain available, the available backward scan position having the smallest index is selected, which is scan position 1. This optimized reverse binary scan position ordering process would continue for each additional scanning resolution level as required. Thus, according to the preferred embodiment, the optimized reverse binary sequence is 0, 4, 6, 2, 3, 5, 7, 1. The optimized sequence requires 10.125 code periods to complete, which is a nearly 15% acquisition speed improvement over the non-optimized reverse binary scan sequence 0, 4, 2, 6, 1, 5, 3, 7.

Reverse N-ary Scanning By Multiple Receiving Blocks

In one embodiment of the invention, two or more receiving blocks, each receiving block comprising all the elements of FIG. 7 other than the antenna 704, are coupled to the received signal 708. The two or more receiving blocks are coupled to one or more processing blocks that control the scan process and perform processing of the two or more received signals 739 relative to acceptance criteria including the threshold check, quick check, etc. in accordance with the invention. Under this arrangement, the two or more receiving blocks collaboratively perform a reverse N-ary scan process by operating on alternate scans so that integration intervals may overlap without interference. Alternative arrangements for employing multiple cross-correlators, which are applicable to this embodiment of the invention, are described in application Ser. No. 09/537,264 previously incorporated by reference.

A timing diagram of a collaborative reverse binary scan as might be performed by two receiving blocks is provided in FIG. 11J. Referring to FIG. 11J, the vertical axis represents successive code periods, where a code period is defined as the amount of time required to receive a pulse train. The top axis represents a cyclic time axis spanning a search interval with eight scan positions labeled "0"–"7" and returning to "0", where due to the repeating nature of the pulse trains, the final "0" is the same as the "0" of the next code period. For each code period of time, the scanning activity performed by a first receiving block is depicted by a thick solid or dashed line and the scanning activity performed by a second receiving block is depicted by a thin solid or dashed line, where a solid line indicates a scan and a dashed line indicates a delay. The thick and thin lines (solid or dashed) are also bracketed to provide further indication that the depicted scanning activity by the two receiving blocks occurs simultaneously during the given code period.

In FIG. 11J the total time (in code periods) required by two receiving blocks to perform a complete reverse binary scan using a scan sequence of 0,4,2,6,1,5,3,7 is depicted. In the figure, the first scan of the scan sequence is performed by the first receiving block. The first scan begins at scan position 0 of the first code period (code period 0) and ends at scan position 0 of the second code period (code period 1), which is indicated by the thick solid line with an arrow spanning the complete time axis. When the first scan begins, the second receiving block is idle. After a half a code period delay, indicated by the thin dashed line, the second receiving block begins the second scan at scan position 4, which is indicated by the thin solid line. Thus, at the end of the first code period of time, the first receiving block has completed the first scan while the second receiving block has completed half of the second scan.

After completing the first scan, the first receiving block delays for one quarter of the second code period and begins the third scan at scan position 2 and completes three quarters of the scan by the end of the second code period. During the same code period, the second receiving block completes the second scan at scan position 4, delays one quarter code period, and begins the fourth scan at scan position 6. The process continues with the two receiving blocks alternately performing the remainder of the reverse binary scans until the first receiving block completes the seventh scan at scan position 3 of the sixth code period (code period 5) and the second receiving block completes the eighth scan at scan position 7 of the same code period. Collaboratively, the two receiving blocks complete the reverse binary scan process in a total of 5.875 code periods.

Optimization of a Reverse N-ary Scanning Order for Multiple Receiving Blocks

As was the case with a single receiving block arrangement, the order of a reverse N-ary scanning sequence can be optimized for a multiple receiving block arrangement in order to reduce the requirement for backward shifting between scans and thereby reduce the time required to complete the scanning process. In one embodiment of the invention, the sequence of reverse N-ary scan positions is determined by setting each scan position of a given scan resolution to an available scan position that is forward of the previous scan position. In a preferred embodiment, the sequence of reverse N-ary scan positions is determined by setting each scan position of a given scan resolution to the closest available scan position that is forward of the previous scan position. With either embodiment, if a forward scan position is not available, the available backward scan position having the lowest index is selected.

The optimized reverse binary scan position ordering process for a multiple receiving block arrangement can be visualized in relation to FIG. 11K, which is exactly like FIG. 11J except with different ordering of the scan positions. In the figure, the first group of scan positions comprising 0 and 4 are assigned to the first and second receiving blocks respectively. The first receiving block begins the first scan at scan position 0 and completes at the end of the first code period (code period 0). During the same code period, the second receiving block delays for one half a code period and begins the second scan at scan position 4. Thus, the order of the scan positions 0 and 4 in the first group of scan positions is determined to be 0,4.

The order of the second group of scan positions, 2 and 6, is then determined. To begin the second code period (code period 1), the first receiving block is assigned the next available forward scan position from scan position 0, which is scan position 2. Thus, after a quarter code period delay, the first receiving block begins the third scan at scan position 2. Also during the second code period, the second receiving block completes the second scan at scan position 4 and is assigned the next available forward scan position from scan position 4, which is scan position 6. Thus, after a quarter code period delay, the second receiving block begins the fourth scan at scan position 6. So, the order of the scan positions 2 and 6 in the second group of scan position is determined to be 2,6 and the optimized reverse binary sequence has been determined through two levels of scanning resolution to be 0,4,2,6.

The order of the third group of scan positions, 1, 5, 3, and 7, is then determined. To begin the third code period (code period 2), the first receiving block is continuing with the third scan, which it completes at scan position 2. Under one embodiment, the first receiving block could be assigned any one of the three scan positions 3, 5, or 7, which are forward of scan position 2. While under a preferred embodiment, which is depicted in the figure, the first receiving block is assigned the closest forward scan position, which is scan position 3. Thus, the first receiving block delays for one eighth of a code period and begins the fifth scan at scan position 3. During the same code period the second receiving block completes the fourth scan at scan position 6. It is assigned the only available forward position of the third group of scan positions, which is scan position 7. Thereafter, the second receiving block delays for one eighth of a code period and then begins the sixth scan at scan position 7.

Continuing the process, the first receiving block completes the fifth scan at scan position 3 of the fourth code period (code period 3). It is assigned the only available forward scan position of the third group of scan positions, which is scan position 5. Afterwards, it delays for one quarter of a code period and begins the seventh scan at scan position 5. During the same code period, the second receiving block completes the sixth scan at scan position 7. Because there are no longer any forward scan positions remaining in the third group of scan positions, it is assigned the available backward scan position having the lowest index, scan position 1, which also happens to be the only remaining scan position. Thus, the second receiving block delays for one quarter of a code period and begins the eighth scan at scan position 1 of the fifth code period (code period 4). The first receiving block completes the seventh scan at scan position 5 of the fifth code period and the second receiving block completes the eighth scan at scan position 1 of the sixth code period (code period 5). Thus, according to the preferred embodiment, the optimized reverse binary sequence for two receiving blocks is 0, 4, 2, 6, 3, 7, 5, 1. The optimized sequence requires 5.125 code periods to complete, which is approximately a 12% acquisition speed improvement over two receiving blocks using the non-optimized reverse binary scan sequence 0, 4, 2, 6, 1, 5, 3, 7.

Scanning Across Received Pulse Train Boundaries

In an alternate embodiment, scanning is performed across received pulse train boundaries. With this approach, there are no delays between scans as depicted in FIGS. 10B and 10C. Instead, the code, which defines the template pulse train, is shifted in a cyclic manner relative to the scan position. For each scan, a last portion of the code is used to define the template pulse train signal up to the scan position and a first portion of the code is used to define the template pulse train signal after the scan position, where the code is subdivided into a first portion and a second portion based on the received pulse train boundary defined by the scan position.

The difference between this alternative embodiment and previously described embodiments can be visualized using FIG. 10D. In FIG. 10D, the time positions 20-1, 20-2, and 20-3 represent template pulse train boundaries, where the code defining the template pulse train is applied at the beginning of each template pulse train boundary. With the previously described embodiments of the invention, the summation result is produced beginning at each template pulse train boundary in which case the time offsets 23-1, 23-2, and 23-3 correspond to delays during which there are no attempts to acquire the received pulse train signal. Under this arrangement, the template pulse train boundary shifts with each time offset and when the summation result passes the threshold check, it is assumed that the given template pulse train boundary substantially coincides with the received pulse train boundary. Thus, each template pulse train boundary also represents a candidate received pulse train boundary, and when the threshold check is passed, the actual received pulse train boundary is assumed to have been substantially determined and the template pulse train timing is assumed to be substantially aligned.

With the alternative embodiment, time positions 20-1, 20-2, and 20-3 continue to represent candidate received pulse train boundaries, but no longer represent template pulse train boundaries except for the 0 scan position case. Additionally, the time offsets 23-1, 23-2, and 23-3 no longer correspond to delays during which there are no attempts to acquire the received pulse train signal. Instead, time offsets 23-1, 23-2, and 23-3 correspond to portions of the code that "wraps". Here, the template pulse train boundary never changes. Instead, the code defining the pulse train shifts with each time offset with the end of the code wrapping to the front. With this approach, the portions of the shifted template pulse trains 20 to the right of the vertical dashed line that intersects the second and third template pulse trains will wrap around in front of the time positions 20-2 and 20-3, respectively. Accordingly, the template pulse train boundary is only assumed to coincide with the first candidate received pulse train boundary, which has a time position equal to some initial time reference $t0_{ref}$. For all other candidate received pulse train boundaries defined by some time offset from $t0_{ref}$, the pulse train boundary and the candidate pulse train boundary are assumed to not substantially coincide and the summation result is assumed to correspond to the energy captured from the last portion of a received pulse train and the first portion of the following received pulse train. Under this arrangement, when the threshold check is passed and the actual received pulse train boundary is assumed to have been substantially determined, the template pulse train must still be shifted by the known time offset such that its boundary aligns with the received pulse train boundary.

An advantage of the alternative embodiment is improved acquisition speed. One potential disadvantage of the approach is that specialized pulse summation techniques may be required to account for crossing bit boundaries when the acquisition signal is modulated by data, which increases system complexity and may increase system costs.

FIG. 11L depicts reverse binary scanning across received pulse train boundaries. In the figure, the scan positions defining the received pulse train boundaries are shown with a number on either side. The number to the left of each received pulse train boundary represents the last portion (or fraction) of the code used to define the template pulse train signal from the beginning of the code period to the boundary and the number to the right of the boundary represents the first portion (or fraction) of the code used to define the template pulse train signal from the boundary to the end of the code period. Under this arrangement, a portion of a code corresponds to the code elements that specify pulse characteristics during the corresponding portion (or fraction) of the code period defined by the received pulse train boundary. However, it should be understood that the numbers of pulses of the template pulse train defined by the first and second portions of the code are not necessarily proportional to the portion (or fraction) of the code period defined by the received pulse train boundary. For example, half a code period does not necessarily represent half of the pulses of a template pulse train, but instead equals half of the time corresponding to a full template pulse train.

With this embodiment of the invention, the first scan of the reverse binary scanning process begins at scan position 0 where the received pulse train boundary coincides with the beginning of the code period. For the second scan, the received pulse train boundary is defined by scan position 4. Thus, the second half of the code is used to define the template pulse train from the beginning of the second code period (code period 1) to scan position 4 and the first half of the code is used to define the template pulse train from scan position 4 to the end of the code period. Similarly, for the third scan, the received pulse train boundary is defined by scan position 2. Here, the last quarter of the code is used to define the template pulse train from the beginning of the third code period (code period 2) to scan position 2 and the first three quarters of the code is used to define the template pulse train from scan position 2 to the end of the code period. The process continues for each of the remaining scans. Thus, each scan requires one code period and the total scanning time is 8.0 code periods.

With this embodiment of the invention, there is no benefit to be gained by reordering the reverse binary scanning sequence since there are no delays between scans. It should also be understood that scanning across received pulse train boundaries may be used to speed acquisition times of each of the other scanning approaches such as those described herein (e.g., coarse step scanning, fine step scanning, frame step scanning, random offset scanning, pseudo noise offset scanning, etc.) and most other scanning approaches as would be understood by one skilled in the art.

As stated previously, specialized pulse summation techniques may or may not be required depending on whether the transmitted pulse train signal is modulated or not and, if it is modulated, depending on the characteristics of the acquisition data signal.

In one embodiment, the transmitter sends an acquisition signal that is not modulated by data for a period of time to aid acquisition. The transmitted signal is modulated only by a code. With this embodiment, specialized pulse summation techniques are not required, and a single correlator 710 and single pulse summation stage 734 will suffice as depicted in FIG. 7.

In another embodiment, the transmitter sends an acquisition signal that is modulated by a constant data signal. In other words, at least a portion of the acquisition signal may be all 0 bits or all 1 bits. With this embodiment, specialized pulse summation techniques are again not required because although the received pulse train boundary also represents a bit boundary, the bits on either side of the bit boundary are the same.

In still another embodiment, the transmitter sends an acquisition signal that is modulated by data that may vary. With this embodiment, specialized pulse summation techniques are required because both the data bit before the bit boundary and after the bit boundary are unknown. There are four possible combinations for the bits before and after the boundary: 0 0, 0 1, 1 0, and 1 1. As previously described, if both bits are the same, then it does not matter whether a bit boundary is scanned across. However, if the bits are different, then the energy captured corresponding to one or the other bit must be inverted prior to being summed. Thus, the 0 1 and 1 0 bit combinations require either the energy captured before the bit boundary or the energy captured after the bit boundary to be inverted.

In one embodiment, the impulse radio receiver is modified to have an inverting pulse summation stage capable of being switched on during acquisition, which inverts either the energy before the bit boundary or the energy after the bit boundary based on a control signal. Referring to FIG. 11M, the pulse summation stage 734, sample and hold 736, and detector stage 738 of FIG. 7 are supplemented by an inverting pulse summation stage 1174 and sample and hold 736a that also outputs to the detector stage 738. During signal acquisition, switch 1172 may be engaged. When switch 1172 is engaged, inverting pulse summation stage 1174 inverts the energy captured before the bit boundary or the energy captured after the bit boundary, as controlled by a control signal received from the precision timing generator 714, and integrates both the inverted and non-inverted captured energy to produce an integrated output signal. The integrated output signal is input into sample and hold 736a. The output of sample and hold 736a is input into detector stage 738 which performs a threshold check using the outputs of the two sample and holds 736 and 736a, where the threshold check is passed if either sample and hold output meets the established threshold.

FIG. 11N and FIG. 11O depict alternative embodiments of an inverting pulse summation stage. In FIG. 11N, the inverting pulse summation stage 1174 includes a switch 1176 controlled by the control signal, as might be output by precision timing generator 714, which directs an input signal to either output A or output B. Output A is received directly by summing device 1180 while Output B is directed to an inverter 1178 that inverts the input signal prior to it being input into summing device 1180. Under this arrangement, switch 1176 can be controlled such that either the energy prior to the bit boundary or the energy after the bit boundary is inverted.

In FIG. 11O, the inverting summation stage 1174 includes a multiplier 1182 and a summing device 1180. The multiplier 1182 receives a positive control signal, e.g., a positive square wave signal, or a negative control signal, e.g., a negative square wave signal, as might be output by precision timing generator 714, which is mixed with the input signal. When the control signal is positive, the input signal is not inverted. When the control signal is negative, the input signal is inverted. Thus, the control signal can be a negative square wave before the bit boundary and a positive square wave after the bit boundary, or vice versa, to cause either the energy prior to the bit boundary or the energy after the bit boundary to be inverted.

Scanning Processes in Multipath

Large step scanning, and in particular, binary scanning can have advantages in a multipath environment. These advantages will now be described with respect to FIG. 11P. The multipath advantages arise from the ability of a UWB system under certain circumstances to acquire one or more of the reflections as an alternative to the direct path signal. Since the strongest reflections typically follow closely in time from the direct path signal, this creates a time interval following the direct path signal where an acquisition step will very likely result in detection and acquisition. Conversely, an acquisition step outside this time interval is much less likely to result in acquisition. It can thus be observed that a sequence of steps just equal to this interval would find the signal or a reflection in a minimum number of steps. It is not necessary to step through the entire search space at ¼ cycle in order to acquire the signal.

Thus, if the multipath pattern for a channel is known, the search step size can be established accordingly. The multipath pattern may be known in the case where a message has been previously communicated and the two parties have not moved appreciably in the interval, or in the case where lock is temporarily lost and must be reacquired. Packet mode communications is a particular example where the multipath pattern can be utilized advantageously.

If a system is designed with a fixed large step scanning process and there is no multipath or the multipath interval is smaller than the step size, there exists a possible condition where the system may step over the signal and not acquire in an acceptable time. This may be corrected by assuring that for each rescan of the signal space that some additional offset, which may be ¼ cycle or some random pattern or other pattern, is added to insure that the offsets within the step size are eventually sampled.

The reverse binary scanning approach has advantages of both large step and small step scanning and is particularly adapted to the situation where the multipath is unknown and may vary over a wide range. In this regard, the reverse binary scanning approach utilizes the whole search length as the initial step size by way of the zero sample and then divides this length in half, then further divides the half in half, but each succeeding half is not sampled in sequence, but itself is sampled with a reverse binary pattern.

Thus, the reverse binary pattern quickly presents a new transmission with a maximal width step successively dividing in half no matter where the new signal begins in the cycle. Thus, for any multipath interval width, the search space will be searched to that width based on the binary halving process beginning from the start of transmission rather than from the start of the reverse binary sequence. For example, a reverse binary sequence with an ultimate resolution of 16 bits will take 65536 steps to complete a cycle. The equivalent fine resolution system would take 65536 steps to complete a cycle. For a multipath interval of $\frac{1}{16}$ of the search space, the reverse binary system could search the entire search interval to that resolution in 16 steps beginning with any one of the 65536 possible starting steps. Each sample would have a 1 in 16 chance of landing in the multipath interval. In contrast a fine resolution linear scan system would have a 1 in 16 chance of starting in the multipath interval, but if not, it may take on average half of the remaining search interval to reach the multipath interval, in this case being $\frac{1}{2}(65536-4096)=30720$ steps.

Because of the halving process, the reverse binary method matches inherently to any multipath interval size from minimum resolution to the full width of the scan interval without prior knowledge of the channel multipath characteristics.

The disclosure herein teaches structures with properties similar to the reverse binary pattern and identifies key properties that will enable one skilled in the art to design similar patterns, thus it is consistent with the intended scope of the invention to include sequences that have similar or equivalent structure and method to the reverse binary pattern.

The Acquisition Process (continued)

Referring back to FIG. 9, in block 3, a correlation result is obtained for each pulse in the template pulse train. The received impulse radio signal and the template pulse train are compared via a cross-correlator (e.g., multiplication and integration, or a multiplication and summation) as illustrated with FIGS. 8A–8C.

In block 4, the output of block 3 is further summed or integrated, if necessary, to yield a summation result. Many types of modulation can be used to convey data using UWB signals as are known in the art or described in documents incorporated herein. The present invention is not limited to the modulation types described as examples herein, but may be adapted by one skilled in the art to other types of modulation.

Figure 12B:
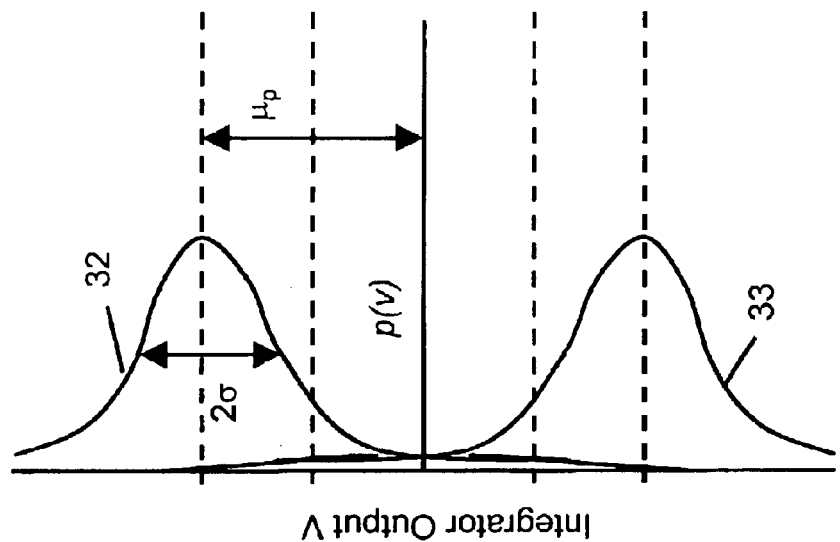
FIG. 12B illustrates a statistical probability density relating to the output and final value of the summation of FIG. 12A.
Figure 12A:
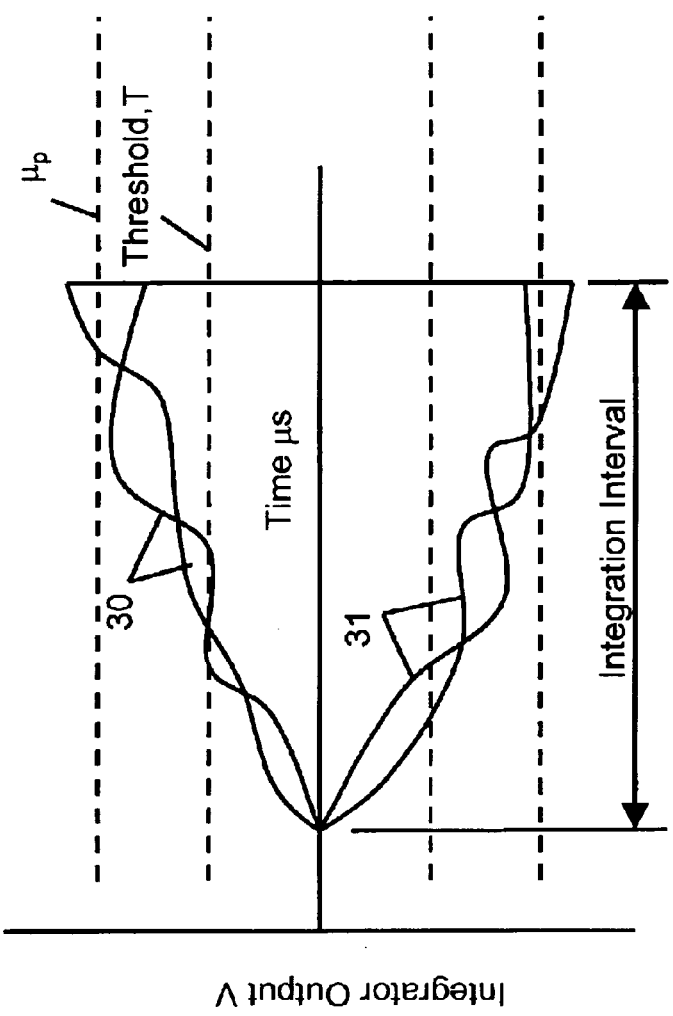
FIG. 12A illustrates a summation of multiple pulse signals leading to a digital bit decision.

FIG. 12A illustrates an exemplary output of an integrator providing a signal summation of multiple pulse signals from the output of the correlator or sampler of block 3. Basic binary modulation utilizing multiple pulses per digital bit is shown in the example illustrated in FIG. 12A.

Referring to FIG. 12A, the integrator integrates signal plus noise over an integration interval comprising a single digital bit of information. In the absence of noise and with equal pulse amplitudes for the pulses in the interval, the output of the integrator will be a stair step or ramp. Shown in the figure is the output with signal plus noise showing variation from the linear ramp shape due to noise. Shown in the figure are multiple ramp signals overlaid as might appear on an oscilloscope synchronized with the data bit clock to show multiple traces overlaid on the same display. Also shown are positive and negative ramps as would be generated by a flip or time shift modulation where positive ramps may be associated with one digital value such as "1" and the negative ramps may be associated with another digital value such as "0". At the end of the integration interval, the integrator may be dumped to ready the integrator for the next bit of information. Before dumping the integrator output, the integrator output is tested to determine if it is positive or negative. A positive value is registered as a "1" and a negative value is registered as a "0".

FIG. 12B illustrates a statistical probability density relating to the output and final value of the summation of FIG. 12A. FIG. 12B illustrates a probability density function for the positive ramp output values as a function of voltage and a probability density function for the negative ramp output values as a function. The figure is oriented to utilize the same voltage scale as FIG. 12A to illustrate the correspondence between the ramp ending values and the statistical mean and standard deviations shown in FIG. 12B. Each density function has a mean and a standard deviation. For signals received in thermal noise the distribution is typically assumed to be Gaussian. For interference, the distribution may be some other function.

In block 5, a threshold check of the comparison result, or the summation result, from block 4 is performed. Shown in FIGS. 12A and 12B is a threshold value T which may be used to estimate whether a signal is present and in synchronization or not present and\or not in synchronization. Preferably, the summation result from block 4 is compared to the threshold T. If the magnitude of the summation result is greater than or equal to the threshold T, it is assumed the template pulse train has matched the impulse radio signal. If the magnitude of the summation result is less than the threshold T, it is assumed that the template pulse train does not match the impulse radio signal.

In a preferred embodiment, FIGS. 12A and 12B represent a design minimum signal strength. A nominal value for the associated threshold is shown in FIGS. 12A and 12B as ½ of the design minimum signal strength. Other methods of setting threshold T are possible such as a factor based on noise variance or a level established by a constant false alarm control loop. If the design minimum signal strength is established as a mean signal-to-RMS noise of 10 dB or about 3/1, the threshold would be set at about 1.5/1, which would result in about one false alarm in 16 bits for Gaussian noise. Such a high value suggests that false alarms should be identified within a very few data bit times. It can be appreciated that if it takes 16 bit times to identify false alarms and false alarms are produced at an average rate of one in 16 bit sample times, the lock search time would be cut in half. Other thresholds can be established that are more or less sensitive to noise. This example is used to illustrate that a fast method of identifying and eliminating false alarms enables lower threshold values and thus enables faster acquisition for lower signal levels.

In block 6, if the comparison result passed the threshold check, flow proceeds to block 7. If the comparison result failed the threshold check, flow proceeds back to block 2.

In block 7, after the comparison result passes the threshold check, a lock loop is engaged to track the timing of the received signal. Engaging the lock loop is also referred to as "locking on" the signal or "closing" the lock loop. Preferably, the lock loop is engaged at the earliest practical point in the flow and may be engaged as early as Block 2 of FIG. 9. Early closing of the lock loop minimizes the open loop time during which the receiver reference oscillator may drift relative to the transmitter of the desired signal. Excessive drift can cause the impulse radio signal to be lost, and the process to be restarted. There can be a variety of systems used to lock and track the received impulse radio signal. As examples, the following systems can be used for locking on the received impulse radio signal: phase locked loop, decision feedback loop, Costas loop, and other UWB lock loops described in the art. Several such techniques are described in U.S. Pat. Nos. 5,812,081 and 5,832,035, which have been previously incorporated by reference.

1/t Gain Scheduling in a Lock Loop

Figure 13A:
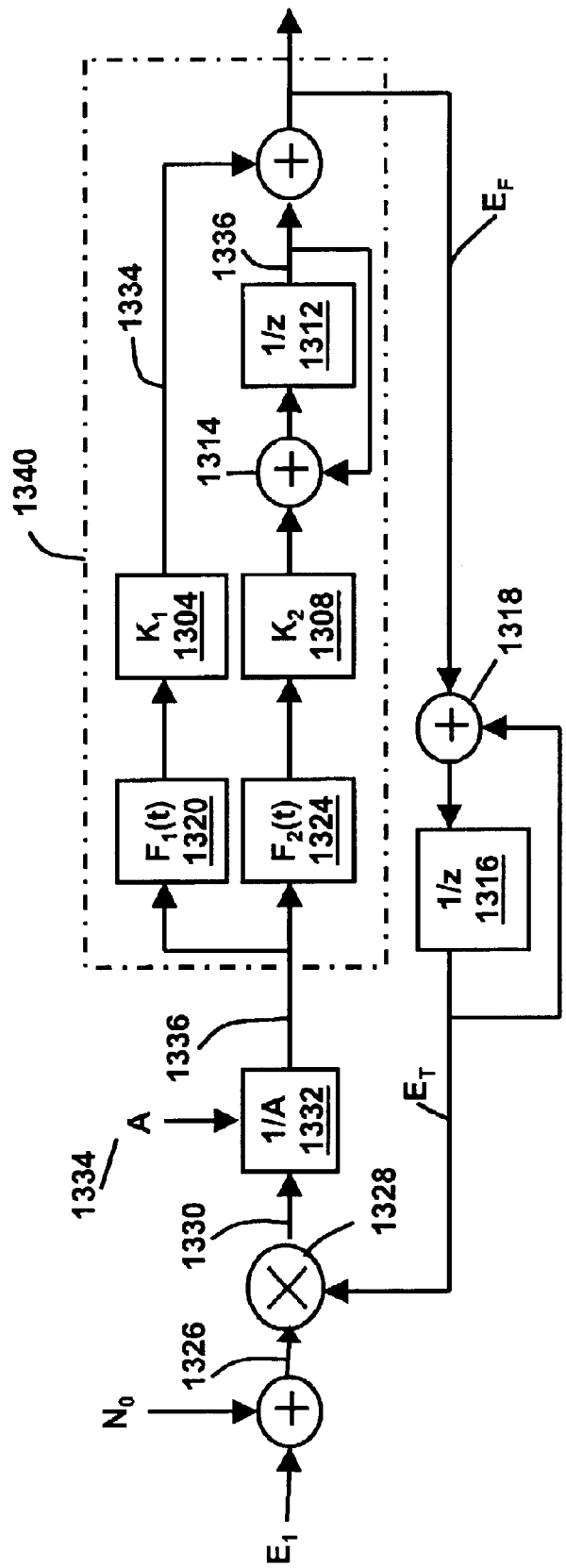
FIG. 13A illustrates a flow diagram for a discrete system tracking loop to maintain signal timing.

FIG. 13A illustrates a system for use in locking and tracking the received impulse radio signal. The system in FIG. 13A employs two gains blocks 1304 and 1308 and two delays 1312 and 1316. The closed-loop system employs a proportional-integral controller 1340, which includes gain 1304, gain 1308, and delay 1312. The values for the gains 1304 and 1308 can be determined and fixed to obtain desired control loop properties. As an option, the gain values for the gains 1304 and 1308 can have a time varying component. This component is illustrated as gain functions 1320 and 1324. In a preferred embodiment, these gains may be $F_1(t)=1/\sqrt{t}$ 1320 and $F_2(t)=1/t$ 1324.

The operation of the invention will now be described in greater detail with reference to FIG. 13A. FIG. 13A is a simplified diagram representing the signal flow in a discrete time lock loop in accordance with the present invention.

Referring to FIG. 13A, signal $E_1$ and signal $N_0$ represent the signal and noise components respectively of a received signal as presented to the input of a sampler in a receiver system. The combined signal 1326 is sampled by the sampler 1328 in accordance with timing controlled by signal $E_t$. $E_t$ is a timing command signal which results from the control loop calculation. Sampling of $E_1$ at time $E_t$ produces a control error signal 1330. In a preferred embodiment, the operation of the control loop is at an update rate synchronous with and equal to the data rate. Thus the delays 1312 and 1316 are equal to the data bit time in, for example, a flip modulated system. Accordingly, the sampling function 1328 may include the sampling and integrating of multiple pulses comprising one bit's worth of error signal and may include decision feedback as appropriate. The system, however, may be configured to operate at an update rate that is less than or more than the system data rate by appropriate adjustment of the gains.

After sampling and summing, the error signal 1330 is then optionally, but preferably, adjusted 1332 to compensate for signal amplitude as determined by a measurement of signal amplitude 1334. In a typical UWB receiver, the tracking loop is configured to track a zero crossing of the received signal. A transfer function relating the timing command signal $E_t$ to the sampler output error signal 1330 includes a time error to voltage out function that is proportional to the received signal $E_1$ input. Thus, in a preferred embodiment, the amplitude dependency is compensated in block 1332. The resulting amplitude compensated signal 1336 is then passed through two paths. A first gain path scales the signal by a first constant 1304 and optionally scales the signal by a first time varying value 1320. A second path scales the signal by a second constant 1308 and also optionally scales the signal by a second time varying value 1324. The second path includes a first delay 1312 and first feedback summation 1314.

The output of the first path 1332 and the output of the second path 1334 are summed to produce a signal representative of a frequency control signal $E_f$. This frequency control signal $E_f$ is then passed through a feedback summing function comprising a second delay 1316 and summation 1318, which outputs the time control signal $E_t$ which commands the timing for subsequent samples to correct for the error in accordance with the error signal and thus completes the loop. In one alternative embodiment of the invention, the frequency control signal $E_f$ is coupled to the frequency control input of an alternative precision timer, the alternative precision timer being designed to be controlled by a frequency control $E_f$ rather than a time control $E_t$.

Referring to FIG. 13A, two gain blocks are indicated where the gain is a function of time $F_1(t)$ 1320 and $F_2(t)$ 1324. Time is measured from the instant of closing of the loop. These gain blocks together with the gain blocks k1 1304, k2 1308 and the gain transfer function for the sampler and amplitude correction determine the dynamics of the closed loop. A preferred dynamic for this loop response is a critically damped response. Since the gain transfer function of the sampler is typically a function of signal amplitude, the 1/A (where A represents signal amplitude) block 1332 is provided to compensate for this dependence on amplitude. Thus, the desired dynamics can be held relatively constant over a range of signal amplitudes. Since the tracking loop is typically based on a zero crossing of the signal, the amplitude of $E_t$ is not directly available from signal 1330; however, amplitude may typically be derived from the data demodulation process.

The purpose of scheduling the gain as a function of time is to accommodate two opposite extremes in the desired performance of the tracking loop and gracefully transition between these two extremes. On one extreme, for the very first few samples, the response of the loop should preferably be fast to capture lock in the presence of a relatively large frequency difference between the transmitter and receiver. This is desirable because tolerance of larger frequency differences in the pulse rate allows lower cost devices. Conversely, the requirement for extremely tight tolerance on pulse rate frequency can be prohibitively expensive for some applications.

On the opposite extreme, once the initial frequency difference is captured, it is desirable to filter the tracking signal as much as possible to minimize susceptibility to noise and interference. The effect of noise may be to cause loss of lock or to cause increased error rate through timing jitter introduced at the $E_t$ or $E_f$ controls. The need for reduced noise suggests a preference for a slowly responding control loop. The functions $F_1(t)$ and $F_2(t)$ provide for these two extremes and provide a transition from one to the other. A preferred transition function for $F_1(t)$ is $1/\sqrt{t}$ where t begins at the beginning of the first sample following the closing of the control loop so that t is equal to one sample time (the time between at the end of the first sample where the value of t is first utilized, and t is equal to two sample times at the end of the second sample and so on. A preferred transition function for $F_2(t)$ is $1/t$ for this particular second order control loop because when the two gain factors are kept in this ratio, the dynamics of the control loop remain critically damped over the full range of gain transition. The initial value of the gain function may be predetermined for a period or may be adjusted by substituting $t=t+a$, where a is an initial value. One skilled in the art will appreciate that other similar methods may be utilized to optimize the initial performance.

It is also preferred that the transition functions 1320 and 1324 be limited to some predetermined minimum value for large values of t. Factors influencing the choice of the minimum value include: short term stability of the transmitter and receiver reference oscillators, Doppler motion between the transmitter and receiver, and the stability of a multipath environment that may be present. Methods for limiting the value of $F_1(t)$ include simply limiting the value, and limiting t, and alternate equations for $F_1(t)$ such as $F_1(t)=b+1/t$, and other similar methods available to one skilled in the art.

Figure 13B:
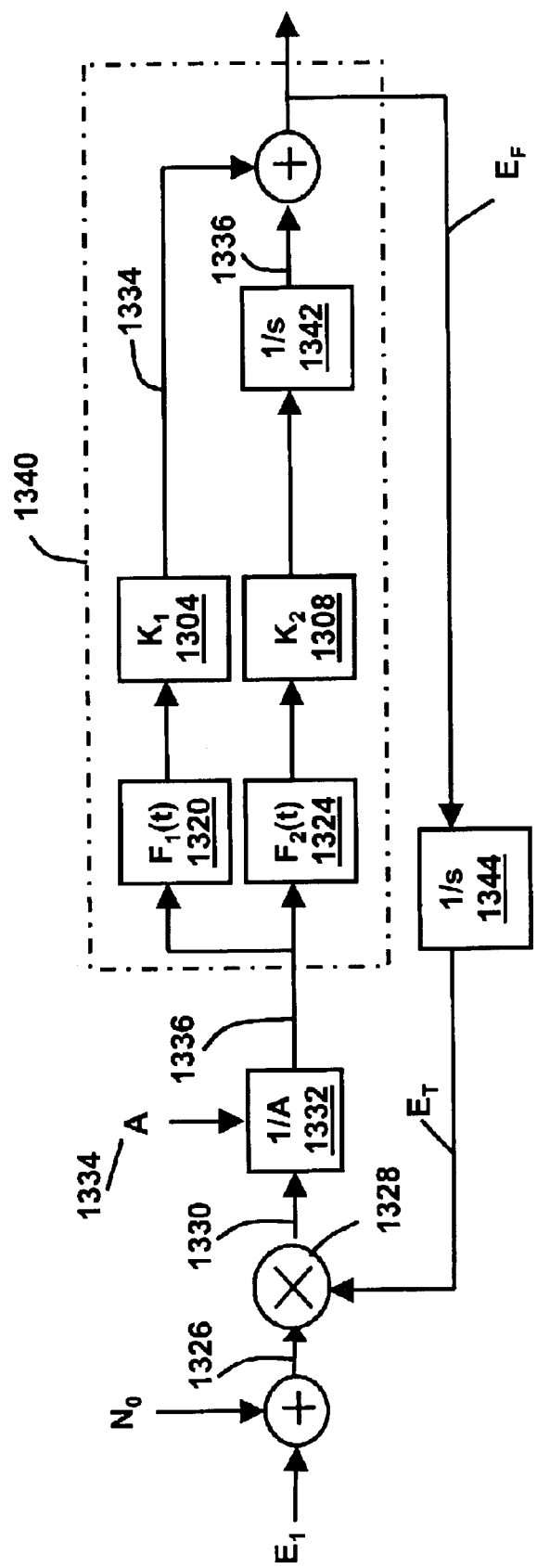
FIG. 13B illustrates a flow diagram for a continuous system tracking loop to maintain signal timing.
Figure 13C:
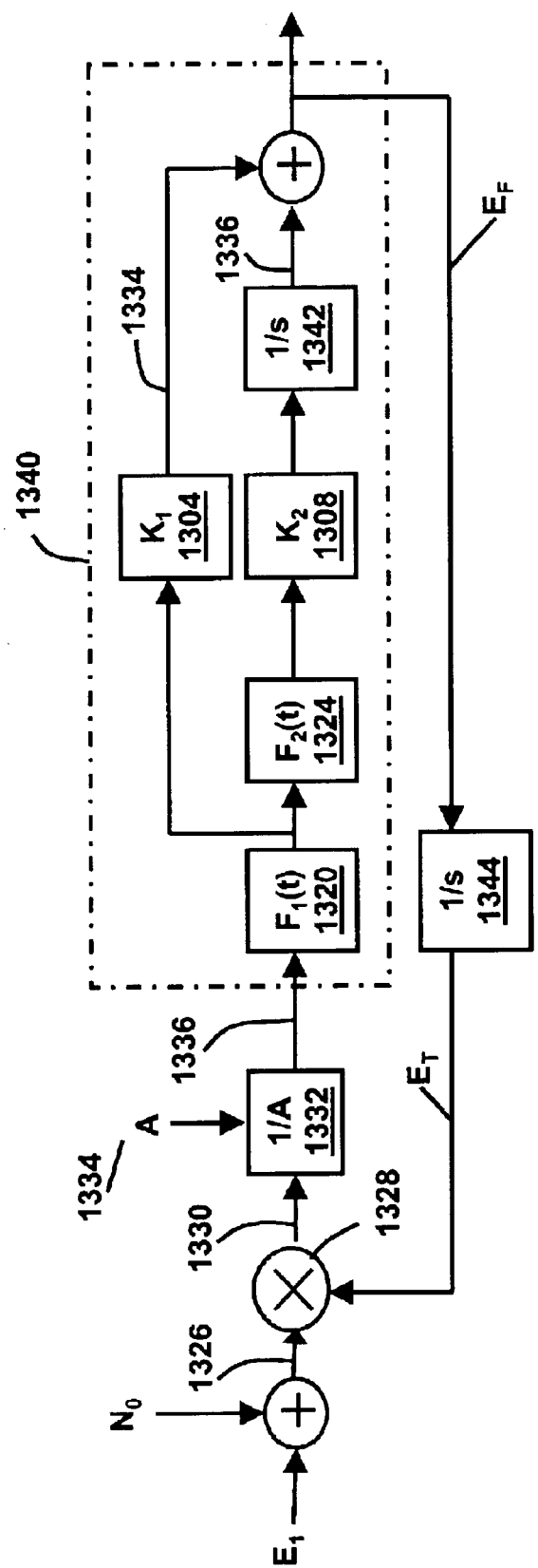
FIG. 13C illustrates a flow diagram for an alternative continuous system tracking loop to maintain signal timing.

FIGS. 13B and 13C represent continuous system embodiments of the invention. FIG. 13B is similar to FIG. 13A except that the delay 1312 1316 and summation 1318 1314 blocks are replaced with integration blocks 1342 and 1344. The operation is otherwise similar to that of FIG. 13A.

FIG. 13C is configured with the time dependent gain functions 1320 1324 in series. The series configuration may allow implementation efficiencies in that the two functions may be identical allowing the same function block 1320 1324 to be called by both calculations or the copying of the components for one block to implement the other.

Quick Check

In block 8, after the received impulse radio signal has acquired lock, a quick check of the received impulse radio signal is performed. A quick check is used to quickly distinguish a false detection due to noise from a true signal lock. The quick check tests a number of subsequent portions of the impulse radio signal to verify the acquisition of the received impulse radio signal. The quick check preferably removes any false alarms signaled in block 6. The quick check determines that at least X of the next Y tested portions of the impulse radio signal match the template pulse train. For example, X=2, and Y=3.

Figure 14:
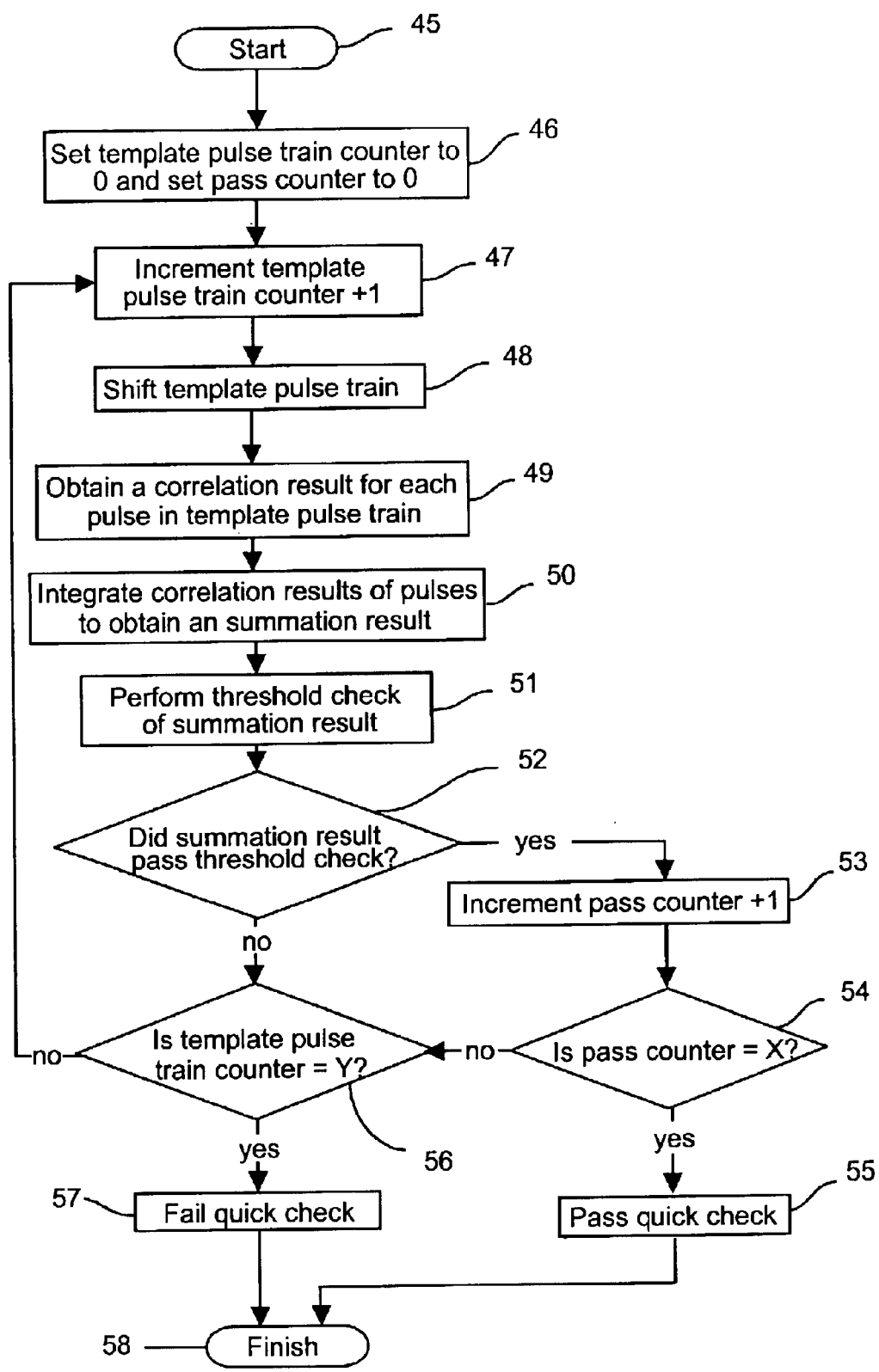
FIG. 14 illustrates a flow diagram for the quick check.

FIG. 14 illustrates a flow diagram for the quick check of block 8. The quick check incorporates several of the blocks from FIG. 9 and determines whether the template pulse train is aligned with the received impulse radio signal via a repetition of blocks 2–6 in FIG. 9. In block 45, the quick check starts. In block 46, a template pulse train counter is set to 0, and a pass counter is set to 0. In block 47, the template pulse train counter is incremented by 1. Blocks 49–52 are the same as blocks 3–6 in FIG. 9, and the discussion of these blocks is omitted.

In block 53, the pass counter is incremented by 1. In block 54, the value for the pass counter is compared to X, where $1 \leq X$. If the pass counter is equal to X, flow proceeds to block 55. If the pass counter is not equal to X, flow proceeds to block 56. In block 55, the received impulse radio signal passed the quick check.

In block 56, the template pulse train counter is compared to Y, where $1 \leq X \leq Y$. If the template pulse train counter is equal to Y, flow proceeds to block 57. If the template pulse train counter is not equal to Y, flow proceeds to block 47. In block 57, the received impulse radio signal failed the quick check. In block 58, the quick check is finished.

Data Synchronization

Referring to FIG. 9, after the quick check is performed, flow proceeds to block 9. In block 9, it is determined if the received impulse radio signal passed the quick check. If the received impulse radio signal passed the quick check, flow proceeds to block 10. If the received impulse radio signal failed the quick check, flow proceeds to block 2.

In block 10, a synchronization check of the received impulse radio signal is performed. Once the quick check has been passed, it is assumed that the locations of the pulses in the received impulse radio signal have been determined. With the synchronization check, the location of the beginning of the acquisition data is determined.

Figure 15A:
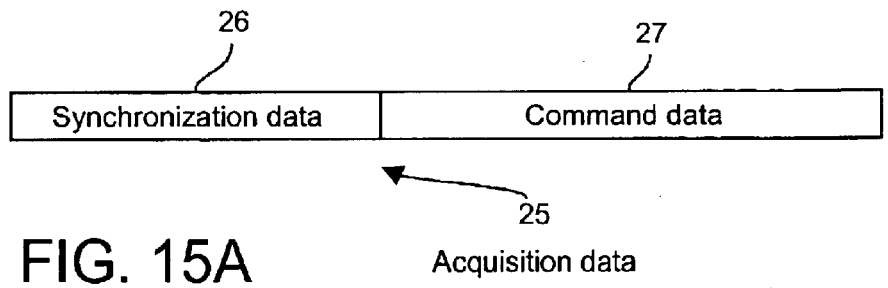
FIG. 15A illustrates acquisition data.

FIG. 15A illustrates acquisition data 25. The acquisition data 25 is transmitted by the transmitter and includes synchronization data 26 and command data 27. Preferably, the synchronization data 26 is determined by an error tolerant code, such as one of the Stiffler codes. Stiffler codes are described in the following, which is incorporated herein by reference: J. J. Stiffler, "Synchronization Techniques," in *Digital Communications with Space Applications*, edited by S. W. Golomb, 1964, pp. 135–160. For example, if four bits are used for the synchronization data, one of 16 code words, as determined by the Stiffler code, can be used for the synchronization data 26. Advantageously, by using Stiffler codes, one code word is not mistaken for another code word. Preferably, the synchronization data 26 has approximately 32 data bits, and the command data 27 has a length of approximately 32 data bits. The command data 27 is discussed further with respect to FIG. 18. In addition, with the invention, Stiffler codes are used for encoding an impulse radio signal to lock and acquire the impulse radio signal.

Figure 15B:
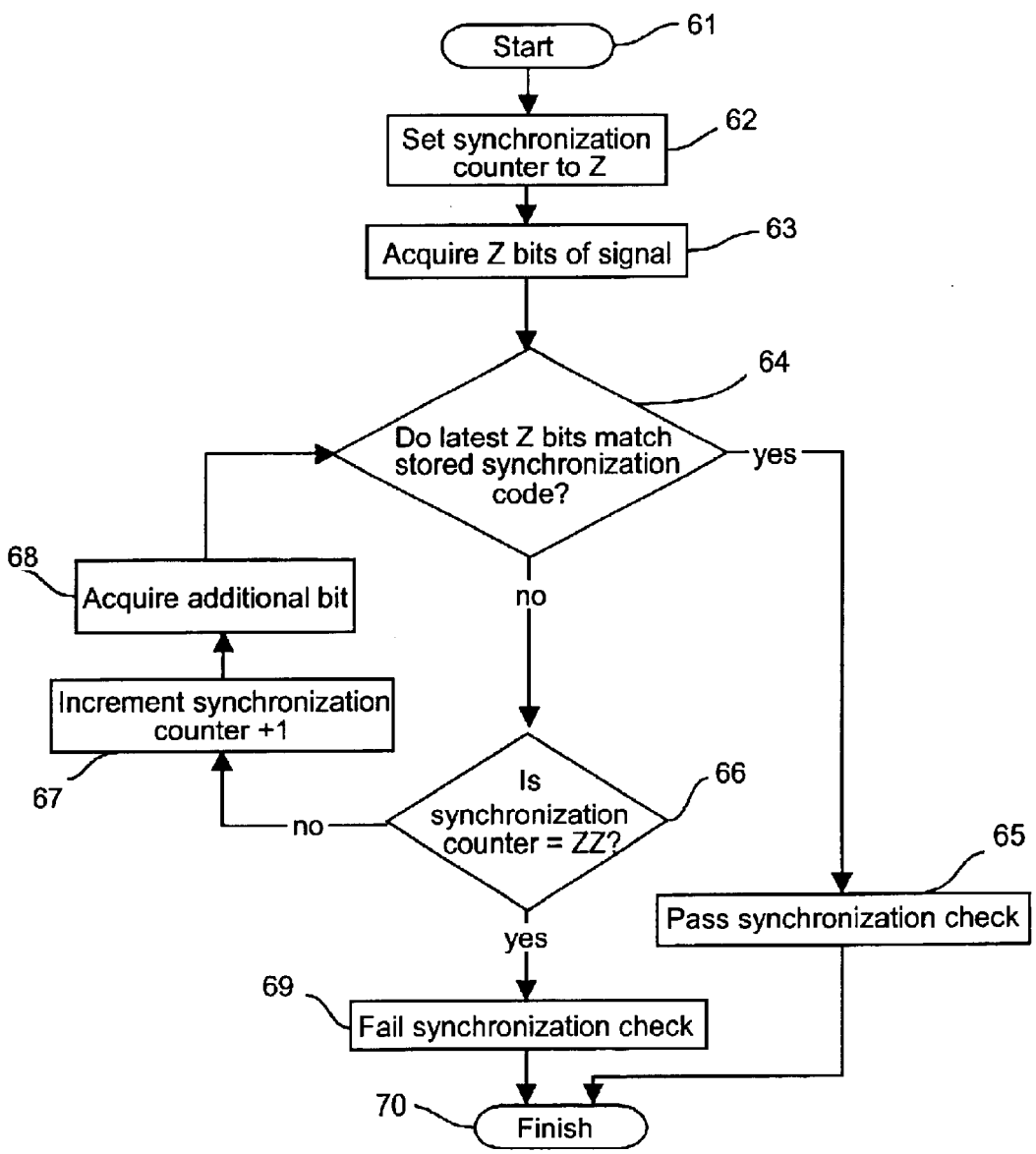
FIG. 15B illustrates a flow diagram for the synchronization check.

FIG. 15B illustrates a flow diagram for the synchronization check of block 10. In block 61, the synchronization check starts. In block 62, a synchronization counter is set to Z, where Z is a natural number and $1 \leq Z$. In block 63, Z bits of the received impulse radio signal are acquired. In block 64, it is determined whether the Z bits match a stored synchronization code. If the bits match, flow proceeds to block 65. If the bits do not match, flow proceeds to block 66. In block 65, the signal passed the synchronization check.

In block 66, it is determined whether the synchronization counter is equal to V, where V is a natural number and $1 \leq Z \leq V$. If the synchronization counter is equal to V, flow proceeds to block 69. If the synchronization counter is not equal to V, flow proceeds to block 67. In block 67, the synchronization counter is incremented by 1. In block 68, an additional bit is acquired, and flow proceeds to block 64. In block 69, the signal failed the synchronization check. In block 70, the synchronization check is finished.

If the received impulse radio signal passed the synchronization check, the beginning of the acquisition data has been located, and if the signal failed the synchronization check, the beginning of the acquisition data has not been located. By selecting V for block 66, the number of bits checked prior to failure is determined.

Referring to FIG. 9, the flow proceeds from block 10 to block 11. In block 11, it is determined whether the received impulse radio signal passed the synchronization check. If the received impulse radio signal passed, flow proceeds to block 12, and if the received impulse radio signal failed, flow proceeds to block 2.

Command Check

In block 12, a command check of the received impulse radio signal is performed. In the command check, it is assumed that the beginning of the acquisition data 25 transmitted by the transmitter has been determined via the synchronization check. In block 12, it is determined whether the correct acquisition data has been received by the receiver and whether the receiver has acquired the correct impulse radio signal.

Referring to FIG. 15A, the contents of the command data 27 of the acquisition data 25 determines the outcome of the command check. For instance, the command data 27 of the acquisition data 25 can include a transmitter identification and/or a receiver identification. The receiver may store a transmitter identification corresponding to the transmitter from which information is being received, and may store a receiver identification identifying itself. If the transmitter identification of the command data 27 does not match the stored transmitter identification, the received impulse radio signal failed the command check, and otherwise, the received impulse radio signal passed the command check. Further, if the receiver identification of the command data 27 does not match the stored receiver identification, the received impulse radio signal failed the command check, and otherwise, the received impulse radio signal passed the command check. The command data 27 may include the following, which may also be stored in the receiver: transmitter identification; receiver identification; date identification; time identification; communication protocol; network protocol; power control information; and any combination thereof.

Figure 16:
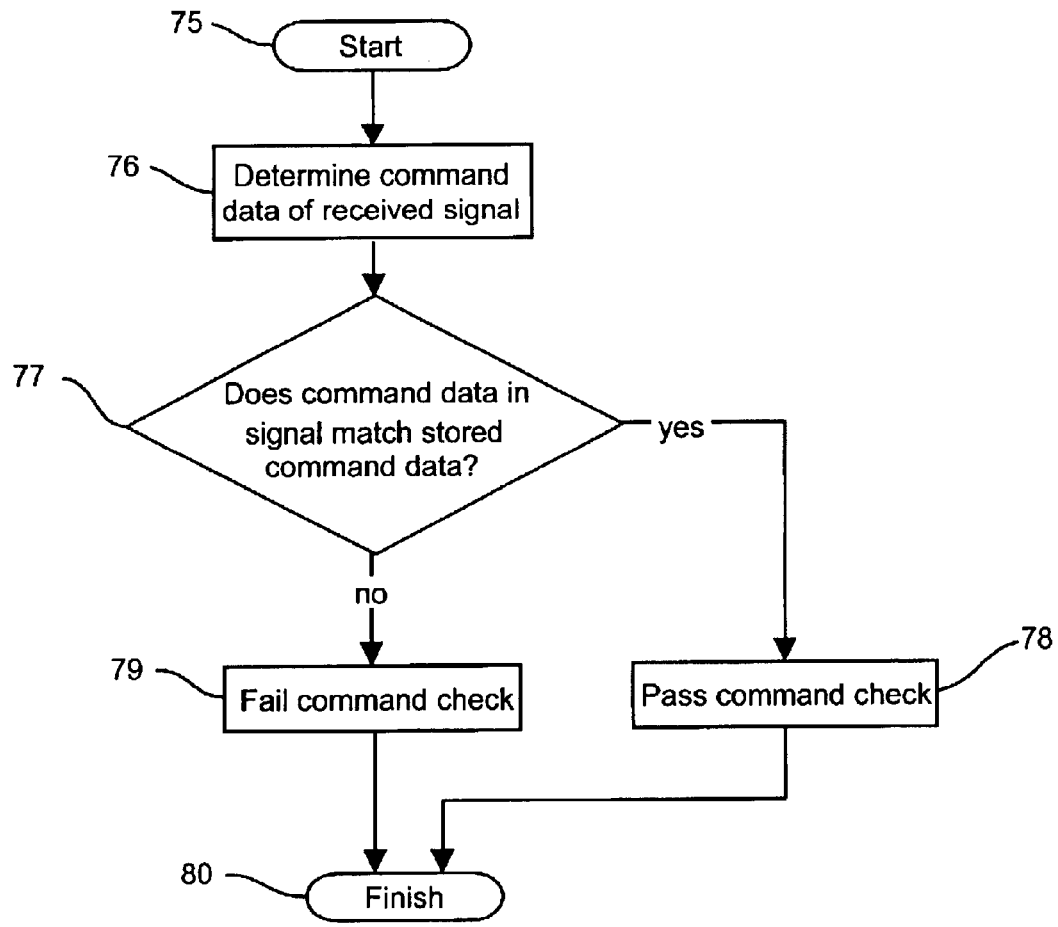
FIG. 16 illustrates a flow diagram for the command check.

FIG. 16 illustrates a flow diagram for the command check of block 12. In block 75, the command check starts. In block 76, the command data of the received impulse radio signal is determined. In block 77, the command data from the received impulse radio signal is compared to stored command data. If the received command data matches the stored command data, flow proceeds to block 78. If the received command data does not match the stored command data, flow proceeds to block 79. In block 78, the signal passed the command check. In block 79, the signal failed the command check. In block 80, the command check finishes. Referring to FIG. 9, flow proceeds from block 12 to block 13. In block 13, it is determined whether the received impulse radio signal passed the command check. If the received impulse radio signal passed, flow proceeds to block 14, and if the received impulse radio signal failed, flow proceeds to block 2. In block 14, the received impulse radio signal has been acquired and locked on. In block 15, the fast lock and acquisition of the impulse radio signal is finished.

To assist the receiver in maintaining lock and to reduce the necessity of a re-lock and re-acquisition period after the impulse radio signal is lost by the receiver, locking and acquisition data can be interspersed among the information data sent by the transmitter. For example, additional acquisition data 25 can be interspersed by the transmitter among the information data. Depending on the type of locking and acquisition data interspersed, same or all of the aspects of the process illustrated in FIG. 9 are performed when the locking and acquisition data is transmitted by the transmitter.

Radio System

Figure 17:
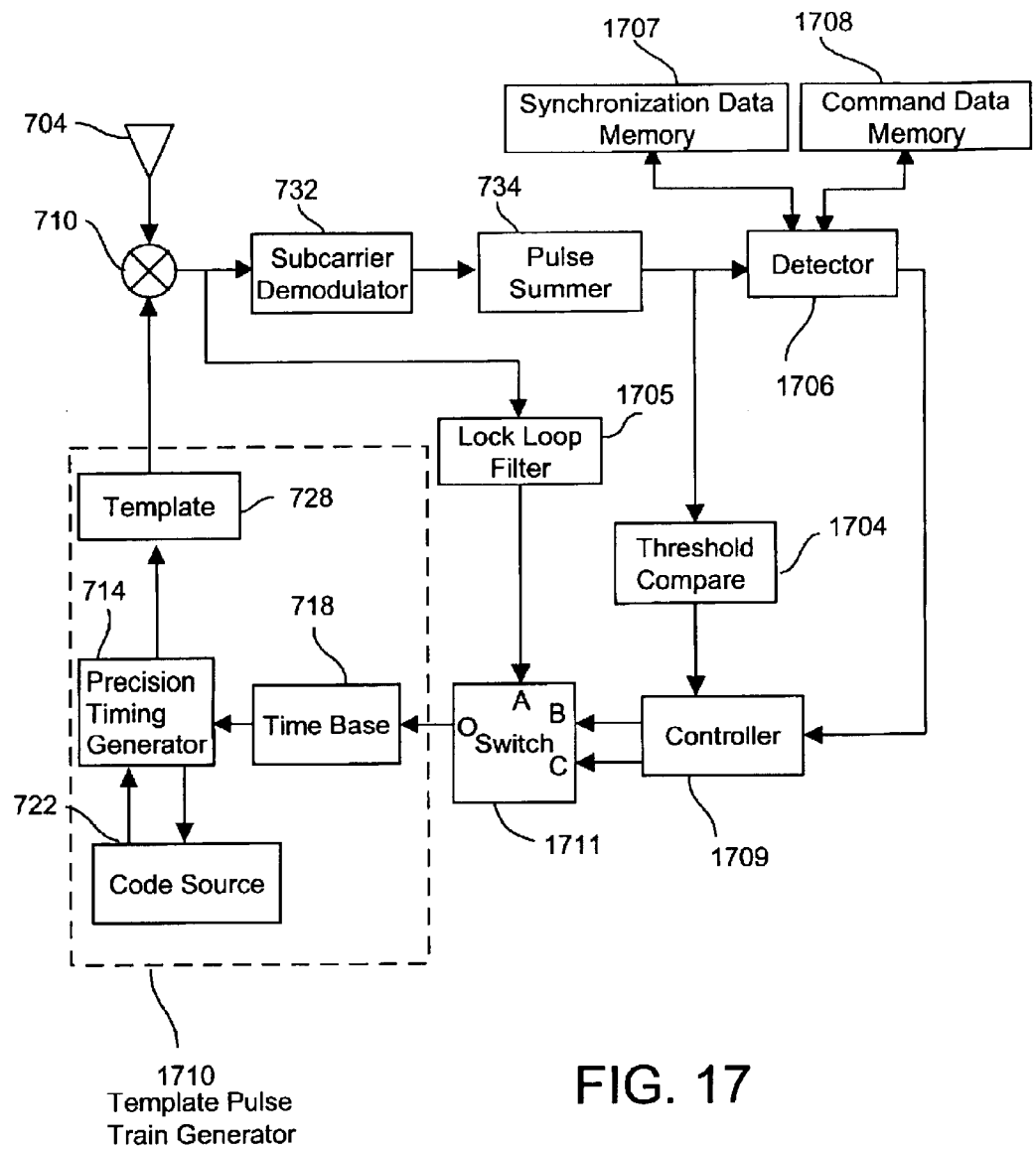
FIG. 17 illustrates a block diagram for a system capable of implementing the invention.

FIG. 17 illustrates a block diagram for a system configured in accordance with the present invention. The system of FIG. 17 can be implemented in a receiver for a one-way or two-way communication system.

The system of FIG. 17 is similar to the system of FIG. 7, except for blocks 1704, 1707, 1708, 1709, and 1711 that are used to implement fast lock and acquisition of the impulse radio signal. During the search phase of acquisition, the time base is initially controlled directly by the controller through switch 1711. After the time position and rate are established, the lock loop may optionally be engaged using switch 1711 to connect the output of the lock loop filter to the input of the time base. The engaging of the lock loop may alternatively occur at a later time such as, for example, after threshold detection or after quick check; however, later engaging of the lock loop typically requires more accurate time base oscillators. Referring to FIG. 17, the controller 1709 initially commands switch 1711 through the "C" command input to connect switch output "O" to input "B" thereby allowing the controller 1709 to control the time base 718 directly. Once the time base 718 time position and frequency are set, the controller 1709 may command the switch 1711 to connect switch input "A" to output "O" in accordance with the threshold compare 1704 and detector 1706 signals to "close" the lock loop and track the received signal.

A discussion of the components of FIG. 17 that are identical to those of FIG. 7 is omitted for clarity.

Figure 18:
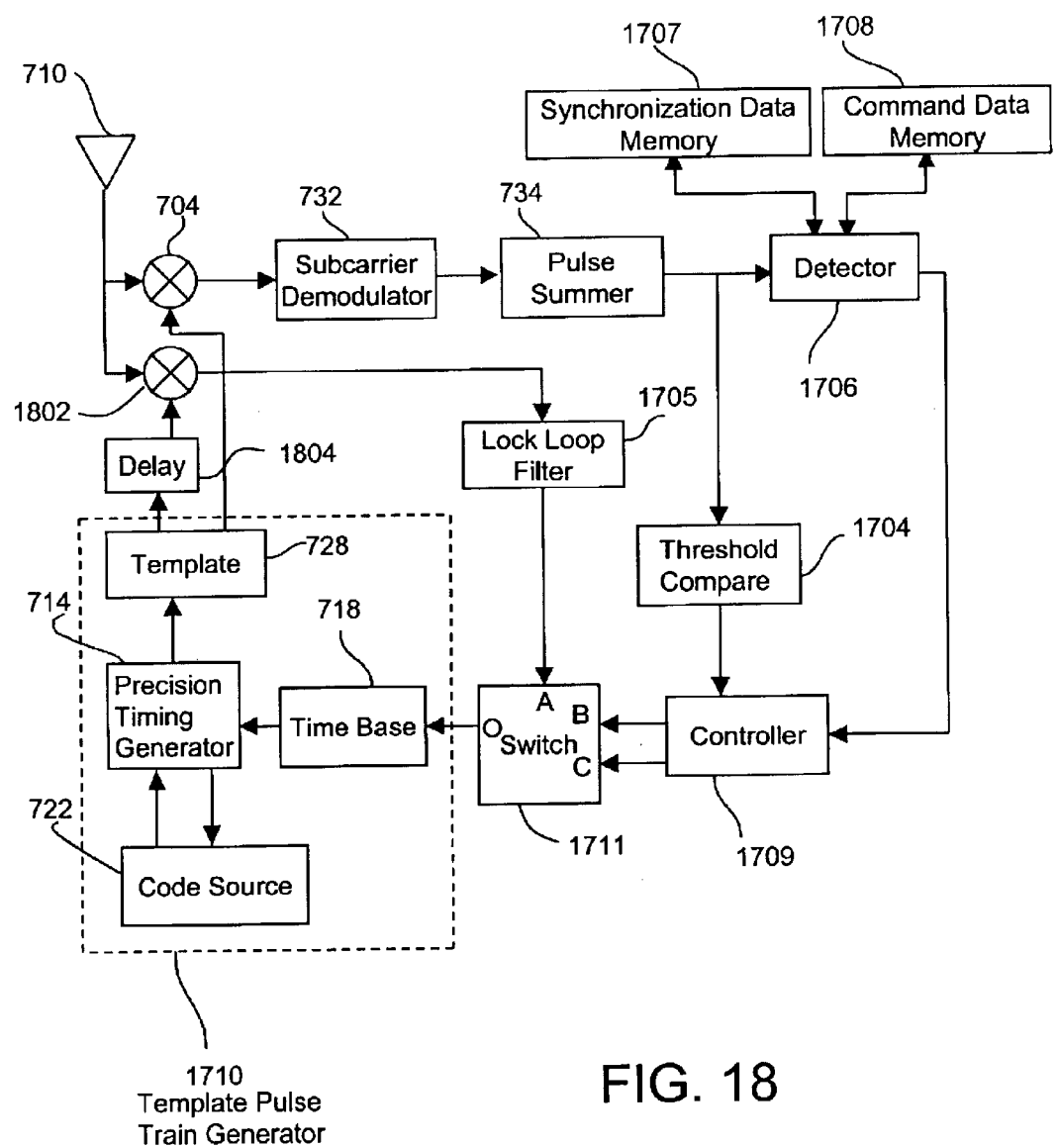
FIG. 18 illustrates a receiver utilizing two correlators to provide separate signals for tracking and data.

In an alternative embodiment, two correlators may be used to provide separate signals for tracking and data. FIG. 18 illustrates a receiver utilizing two correlators to provide separate signals for tracking and data. Referring to FIG. 18, the received signal from the antenna is coupled to a data path and a tracking path. The data path comprising correlator 704 and additional blocks coupled thereto. The tracking path comprising correlator 1802, the lock loop filter 1705 and other blocks coupled thereto. The two correlators are fed template 728 signals separated in time by a delay 1804, which is typically about ¼ cycle of a sine wave at the center frequency of the UWB signal. The tracking path is configured to track on a zero crossing of the received signal thereby placing the data correlator in proper time position to receive a maximum on the received signal.

The template generator 728, the precision timing generator 714, the code source 722, and the adjustable time base 718 implement a template pulse train generator 1710. Other techniques for implementing the template pulse train generator 1710 can be used within the scope of the invention.

The cross-correlator 710 performs the function in block 3 of FIG. 9. The cross-correlator 710 combines a received impulse radio signal from the antenna 704 and a template pulse train from the template pulse train generator 1710.

The pulse summer 734 performs the function in block 4 of FIG. 9. In general, the pulse summer 734 produces an increasing ramp function 30 or decreasing ramp function 31 as in FIG. 12A when the template pulse train provided by the template pulse train generator 1710 aligns with the received impulse radio signal and otherwise produces a signal that is approximately equal to the summation of positive and negative random numbers or equal to a noise-like signal.

A threshold comparator 94 receives the output of the pulse summer 734 and performs the function of block 6 in FIG. 9. The output of the threshold comparator 1704 is provided to a controller 1709.

A lock loop filter 1705 receives the output from the cross-correlator 710. The lock loop filter performs the same function as the lock loop filter 742 in FIG. 7. In addition, the lock loop filter 1705 performs the function of block 7 in FIG. 9 and locks on the received impulse radio signal. The output of the lock loop filter 1705 is provided to the controller 1709.

A detector 1706 receives the output from the pulse summer 734. The detector 1706 performs the same function as detector 738 in FIG. 7. In addition, the detector 1706 is coupled to a synchronization data memory 1707 and a command data memory 1708. The detector 1706 is used to perform the synchronization check in block 10 using the synchronization data memory 1707 and the command check in block 12 using the command data memory 1708.

The controller 1709 receives the outputs from the threshold comparator 1704, the lock loop filter 1705, and the detector 1706. The controller 1709 performs the quick check in block 8. In addition, the controller oversees the operation of the threshold comparator 1704, the lock loop filter 1705, and the detector 1706.

As an option, the synchronization data memory 1707 can be coupled to the controller 1709, instead of to the detector 1706. With this option, the controller 1709 performs the synchronization check in block 10 using the synchronization data memory 1707.

As an option, the command data memory 1708 can be coupled to the controller 1709, instead of to the detector 1706. With this option, the controller 1709 performs the command check in block 12 using the command data memory 1708.

It should be understood that the system can be configured to include additional sets of blocks 710, 734, 1704, 1706 and 1709 that would enable multiple functions of blocks 2–6 of FIG. 9 to be performed in parallel. For instance, if there were four sets of blocks 710, 734, 1704, 1706 and 1709, then during the same time period four different shifted template pulse trains can be compared to the received impulse radio signal.

The system for FIG. 17 can be implemented with, for example, the following: circuitry; software and a microprocessor, microcontroller, or similar device or devices; and any combination thereof.

The invention has been described as using counters, for example in FIGS. 14 and 15B. As those skilled in the art will recognize, other techniques can be used for counting in addition to those specifically discussed here, and these other techniques are included within the scope of the invention.

The invention has been described as using a single correlator 710. As an option, the invention can be used with multiple correlators, vector modulation, flip modulation, and/or flip with shift modulation, such as has been previously described. With multiple correlators, one or more correlators can be used to detect data, and one or more correlators can be used to lock and acquire a received impulse signal, thereby decreasing the lock and acquisition period. With various modulation techniques, such as vector modulation, flip modulation, and/or flip with shift modulation, additional data states can be used, thereby increasing data speed.

The invention has been described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method for detecting an impulse radio signal, said method comprising the steps of:
    receiving the impulse radio signal;
    obtaining a template pulse train shifted by an offset; and
        locking onto the impulse radio signal when there is a substantial match between the template pulse train and the received impulse radio signal.

2. The method as in claim 1, further comprising the steps of:
    shifting the template pulse train by an offset when there fails to be a substantial match between the template pulse train and the received impulse radio signal; and
    locking onto any part of the impulse radio signal when there is a substantial match between the shifted template pulse train and the received impulse radio signal.

3. The method as in claim 1, wherein the offset is determined in accordance with a scanning process.

4. The method as in claim 3, wherein the scanning process comprises one of a fine step scanning process, a coarse step scanning process, a reverse N-ary scanning process, a frame step scanning process, a random offset scanning process, a pseudo noise offset scanning process, and a mixed binary scanning process.

5. The method as in claim 4, wherein said scanning process is optimized to avoid the shifting of the template pulse train to a backward scanning position if it is possible to shift the template pulse train to a forward scanning position.

6. The method as in claim 3, wherein said scanning process is performed using one or more receiving blocks.

7. The method as in claim 1, wherein a code which defines the template pulse train is shifted in a cyclic manner relative to the offset.

8. A method for detecting an impulse radio signal, said method comprising the steps of:
    (a) obtaining a received impulse radio signal;
    (b) obtaining a template pulse train;
    (c) comparing the template pulse train and the received impulse radio signal;
    (d) locking onto the received impulse radio signal if the comparison result meets an acceptance criterion; otherwise
    (e) obtaining a template pulse train shifted by an offset in accordance with a scanning process and repeating step (c) using the shifted template pulse train and the received impulse radio signal.

9. The method as in claim 8, wherein meeting the acceptance criterion comprises passing a threshold check.

10. The method as in claim 8, wherein said scanning process comprises one of a fine step scanning process, a coarse step scanning process, a reverse N-ary scanning process, a frame step scanning process, a random offset scanning process, a pseudo noise offset scanning process, and a mixed binary scanning process.

11. The method as in claim 8, wherein said scanning process is optimized to avoid the shifting of the template pulse train to a backward scanning position if it is possible to shift the template pulse train to a forward scanning position.

12. The method of claim 8, wherein a scan position sequence order is optimized to minimize the total amount of delay time required during the scanning process.

13. The method of claim 12, wherein the scan position sequence order is determined by setting each scan position of each scan resolution level to an available scan position that is forward of the previous scan position.

14. The method of claim 8, wherein said scanning process is performed using a single receiving block.

15. The method of claim 8, wherein said scanning process is performed using two or more receiving blocks.

16. The method of claim 8, wherein said scanning process is determined in part based on an environment measurement.

17. The method of claim 8, wherein said scanning process is varied using one of an exclusive or-ing operation, a ones complement operation, a twos complement operation, and a sequence order reversing operation.

18. The method of claim 8, wherein the comparison result is determined by comparing an established threshold to a summation result produced by correlating each pulse of the template pulse train with the received impulse radio signal to produce correlation results and integrating the correlation results.

19. The method of claim 8, wherein shifting the template pulse train by an offset comprises delaying the template pulse train.

20. The method of claim 8, wherein the template pulse train is compared to a first portion of a first pulse train of the received impulse radio signal and to a second portion of a second pulse train of the received impulse radio signal in accordance with a received pulse train boundary based on a scan position, the second pulse train of the received impulse radio signal immediately following the first pulse train of the received impulse radio signal.

21. The method of claim 20, wherein a code that specifies pulse characteristics of the received impulse radio signal is subdivided into a first code portion and a second code portion based on the scan position, the second code portion corresponding to the first portion of the first pulse train of the received impulse radio signal and the first code portion corresponding to the second code portion of the second pulse train of the received impulse radio signal, the second code portion defining the template pulse train from the start of a code period to a scan position, and the first code portion defining the template pulse train from the scan position to the end of the code period, said code period being defined relative to an initial time reference.

22. The method of claim 20, wherein the received pulse train boundary is a bit boundary.

23. The method of claim 22, wherein energy captured from one of the first portion of the first pulse train of the received impulse radio signal and the second portion of the second pulse train of the received impulse radio signal is inverted.

24. The method as in claim 8, further comprising the step of:
(f) performing, in parallel, steps (c) and (e) so as to decrease the time required to lock onto any part of the multipath impulse radio signal.

25. The method as in claim 8, wherein comparing the template pulse train and the received impulse radio signal comprises correlating and summing the product of the template pulse train and the received impulse radio signal to obtain the comparison result.

26. The method as in claim 8, further comprising:
(h) performing a quick check using the template pulse train and additional received impulse radio signal.

27. The method as in claim 8, further comprising the step of:
(i) performing a synchronization check of additional received impulse radio signal.

28. The method as in claim 8, further comprising the step of:
(j) performing a command check of command data of the received impulse radio signal; and
(k) acquiring the received impulse radio signal if the command data passes the command check.

29. A receiver for detecting an impulse radio signal, comprising:
an antenna for receiving the impulse radio signal;
a generator for generating a template pulse train; and
a controller and lock loop for comparing the template pulse train and the impulse radio signal and locking onto the impulse radio signal if the comparison result passes a threshold check; otherwise generating another template pulse train shifted by an offset in accordance with a scanning process and repeating the comparing step using the shifted template pulse train and the impulse radio signal.

30. The receiver as in claim 29, wherein said scanning process comprises one of a fine step scanning process, a coarse step scanning process, a reverse N-ary scanning process, a frame step scanning process, a random offset scanning process, a pseudo noise offset scanning process, and a mixed binary scanning process.

31. The receiver as in claim 29, wherein said scanning process is optimized to avoid when possible the shifting of the template pulse train to a backward scanning position if it is possible to shift the template pulse train to a forward scanning position.

32. The receiver as in claim 29, wherein a code which defines the template pulse train is shifted in a cyclic manner relative to the offset.

33. A method for detecting an impulse radio signal, said method comprising the steps of:
shifting a template pulse train by an offset in accordance with a scanning process, the scanning process defining a sequence of scan positions;
obtaining a received impulse radio signal;
comparing the template pulse train to a first portion of a first pulse train of the received impulse radio signal and to a second portion of a second pulse train of the received impulse radio signal in accordance with a received pulse train boundary based on one of the scan positions, the second pulse train of the received impulse radio signal immediately following the first pulse train of the received impulse radio signal; and
locking on the received impulse radio signal when a comparison result meets an acceptance criterion; otherwise
shifting the template pulse train by another offset in accordance with the scanning process and then repeating the comparing step.

34. A method for detecting an impulse radio signal, said method comprising the steps of:
shifting a template pulse train by an offset based on an environment measurement;
obtaining a received impulse radio signal;
comparing the template pulse train and the received impulse radio signal; and
locking on the received impulse radio signal when a comparison result meets an acceptance criterion; otherwise
shifting the template pulse train by another offset in accordance with the scanning process and then repeating the comparing step.

* * * * *